(12) United States Patent
Garlepp et al.

(10) Patent No.: US 7,035,611 B2
(45) Date of Patent: Apr. 25, 2006

(54) APPARATUS AND METHOD FOR FRONT-END CIRCUITRY IN RADIO-FREQUENCY APPARATUS

(75) Inventors: Eric R. Garlepp, Austin, TX (US); Donald A. Kerth, Austin, TX (US); Richard T. Behrens, Lafayette, CO (US); Jeffrey W. Scott, Austin, TX (US); G. Diwakar Vishakhadatta, Autin, TX (US); G. Tyson Tuttle, Austin, TX (US); Vishnu S. Srinivasan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 250 days.

(21) Appl. No.: 10/079,057

(22) Filed: Feb. 19, 2002

(65) Prior Publication Data

US 2003/0017809 A1   Jan. 23, 2003

Related U.S. Application Data

(63) Continuation-in-part of application No. 09/821,342, filed on Mar. 29, 2001.

(60) Provisional application No. 60/348,820, filed on Jan. 14, 2002, provisional application No. 60/333,908, filed on Nov. 28, 2001, provisional application No. 60/273,119, filed on Mar. 2, 2001, provisional application No. 60/261,506, filed on Jan. 12, 2001.

(51) Int. Cl.
   *H04B 1/06*   (2006.01)
(52) U.S. Cl. ............... 455/269; 343/703; 333/124
(58) Field of Classification Search ............ 455/209, 455/323, 313, 333, 339, 269, 307; 343/702, 343/713, 703; 375/216; 333/124
See application file for complete search history.

(56) References Cited

U.S. PATENT DOCUMENTS

| | | | |
|---|---|---|---|
| 4,070,632 A | 1/1978 | Tuttle | |
| 4,236,252 A | 11/1980 | Kominami et al. | |
| 4,468,790 A | 8/1984 | Hofelt | |
| 4,562,591 A | 12/1985 | Stikvoort | |
| 4,584,659 A | 4/1986 | Stikvoort | |
| 4,604,720 A | 8/1986 | Stikvoort | |
| 4,623,926 A | 11/1986 | Sakamoto | |

(Continued)

FOREIGN PATENT DOCUMENTS

EP   0643477 A2   3/1995

(Continued)

OTHER PUBLICATIONS

Wolff et al. "Microwave Engineering and System Applications", Published by John Wiley & Son, Inc. in 1988, p. 242.*

(Continued)

*Primary Examiner*—Quochien B. Vuong
*Assistant Examiner*—Sanh Phu
(74) *Attorney, Agent, or Firm*—O'Keefe, Egan & Peterman, LLP

(57) ABSTRACT

A radio-frequency (RF) apparatus includes front-end circuitry. The front-end circuitry includes a filter circuitry and an impedance matching circuitry. The filter circuitry has a differential output that has an output impedance. The filter circuitry filters signals outside a signal band of interest. The impedance matching network has a differential input coupled to the output of the filter circuitry. The impedance matching network also has a differential output coupled to a signal processing circuitry. The signal processing circuitry has an input impedance. The impedance matching network matches the input impedance of the signal processing circuitry to the output impedance of the filter circuitry.

72 Claims, 33 Drawing Sheets

U.S. PATENT DOCUMENTS

| | | | |
|---|---|---|---|
| 4,627,021 | A | 12/1986 | Persoon et al. |
| 4,680,588 | A | 7/1987 | Cantwell |
| 4,692,737 | A | 9/1987 | Stikvoort et al. |
| 4,713,563 | A | 12/1987 | Marshall et al. |
| 4,797,845 | A | 1/1989 | Stikvoort |
| 4,857,928 | A | 8/1989 | Gailus et al. |
| 4,912,729 | A | 3/1990 | Van Rens et al. |
| 4,989,074 | A | 1/1991 | Matsumoto |
| 5,050,192 | A | 9/1991 | Nawata |
| 5,083,304 | A | 1/1992 | Cahill |
| 5,124,705 | A | 6/1992 | Voorman |
| 5,142,695 | A | 8/1992 | Roberts et al. |
| 5,157,343 | A | 10/1992 | Voorman |
| 5,170,500 | A * | 12/1992 | Broderick .................. 455/315 |
| 5,194,826 | A | 3/1993 | Huusko |
| 5,195,045 | A * | 3/1993 | Keane et al. ............... 702/107 |
| 5,235,410 | A | 8/1993 | Hurley |
| 5,241,310 | A | 8/1993 | Tiemann |
| 5,243,345 | A | 9/1993 | Naus et al. |
| 5,267,272 | A | 11/1993 | Cai et al. |
| 5,283,578 | A | 2/1994 | Ribner et al. |
| 5,341,135 | A | 8/1994 | Pearce |
| 5,345,406 | A | 9/1994 | Williams |
| 5,430,890 | A | 7/1995 | Vogt et al. |
| 5,442,353 | A | 8/1995 | Jackson |
| 5,451,948 | A | 9/1995 | Jekel |
| 5,469,475 | A | 11/1995 | Voorman |
| 5,500,645 | A | 3/1996 | Ribner et al. |
| 5,557,642 | A | 9/1996 | Williams |
| 5,712,628 | A | 1/1998 | Phillips et al. |
| 5,740,524 | A | 4/1998 | Pace et al. |
| 5,742,189 | A | 4/1998 | Yoshida et al. |
| 5,758,276 | A | 5/1998 | Shirakawa et al. |
| 5,764,171 | A | 6/1998 | Stikvoort |
| 5,828,955 | A | 10/1998 | Lipowski et al. |
| 5,859,878 | A | 1/1999 | Phillips et al. |
| 5,862,465 | A | 1/1999 | Ou |
| 5,883,553 | A * | 3/1999 | Tsumura ..................... 333/174 |
| 5,973,601 | A | 10/1999 | Campana |
| 6,002,925 | A | 12/1999 | Vu et al. |
| 6,035,186 | A | 3/2000 | Moore et al. |
| 6,075,979 | A | 6/2000 | Holtvoeth et al. |
| 6,148,048 | A | 11/2000 | Kerth et al. |
| 6,167,245 | A | 12/2000 | Welland |
| 6,177,872 | B1 * | 1/2001 | Kodukula et al. ....... 340/572.7 |
| 6,323,735 | B1 | 11/2001 | Welland et al. |
| 6,343,207 | B1 | 1/2002 | Hessel et al. |
| 6,539,066 | B1 | 3/2003 | Heinen |

FOREIGN PATENT DOCUMENTS

| | | |
|---|---|---|
| GB | 2233518 A | 1/1991 |
| WO | WO 99/22456 | 5/1999 |
| WO | WO 00/01074 | 1/2000 |
| WO | WO 00/11794 | 3/2000 |
| WO | WO 00/22735 | 4/2000 |

OTHER PUBLICATIONS

Stephen Jantzi et al., "Quadrature Bandpass ΔΣ Modulation for Digital Radio," IEEE Journal of Solid-State Circuits, vol. 32, No. 12, Dec. 1997, pp. 1935-1950.

Stephen Jantzi et al, "A Complex Bandpass ΔΣ Converter For Digital Radio," ISCAS, May/Jun. 1994, pp. 453-456.

"Analog Devices Delivers World's First Open Market GSM Direct Conversation Radio Chipset," Analog Devices Corporate Information Press Release, http:/contentanalog.com/pressrelease/prdisplay/0,1622,102,00.html, Sep. 13, 1999, pp. 1-4.

Data Sheet, CX74017, "RF Transceiver for Single, Dual, or Tri-Band GSM/GPRS Applications," Conexant, Jan. 2, 2001, pp. 1-16.

Jacques C. Rudell et al, "A 1.9-GHz Wide-Band IF Double Conversion CMOS Receiver for Cordless Telephone Applications," IEEE Journal of Solid-State Circuits, vol. 32, No. 12, Dec. 1997, pp. 2071-2088.

Jan Crols et al., "Low-IF Topologies for High-Performance Analog Front Ends of Fully Integrated Receivers," IEEE Transactions on Circuits and Systems-II: Analog and Digital Signal Processing, vol. 45, No. 3, Mar. 1998, pp. 269-282.

Jacques C. Rudell et al., "Recent Developments In High Integration Multi-Standard CMOS Transceiver for Personal Communication Systems," invited paper at the 1998 International Symposium on Low Power Electronics, Monterey, California, 6 pgs.

Asad Abidi, "CMOS Wireless Transceivers: The New Wave," IEEE Communications Magazine, Aug. 1999, pp. 119-124.

Data Sheet, UAA3535HL, "Low Power GSM/DCS/PCS Multi-band Transceiver," Philips Semiconductors, Feb. 17, 2000, pp. 1-24.

Stephen Jantzi et al., "FP 13.5: A Quadrature Bandpass ΔΣ Modulator for Digital Radio," Digest of Technical Papers, 1997 IEEE International Solid-State Circuits Conference, First Edition, Feb. 1997, pp. 216-217, 460.

S. A. Jantzi et al., "The Effects of Mismatch In Complex Bandpass ΔΣ Modulators," IEEE, 1996, pp. 227-230.

Qiuting Huang, "CMOS RF Design-The Low Power Dimension," IEEE 2000 Custom Integrated Circuits Conference, pp. 161-166.

Paolo Orsatti et al., "A 20-mA-Receive, 55-mA-Transmit, Single-Chip GSM Transceiver in 0.25-μm CMOS," IEEE Journal of Solid-State Circuits, vol. 34, No. 12, Dec. 1999, pp. 1869-1880.

Qiuting Huang et al., "The Impact of Scaling Down to Deep Submicron on CMOS RF Circuits," IEEE Journal of Solid-State Circuits, vol. 33, No. 7, Jul. 1998, pp. 1023-1036.

Behzad Razavi, "Design Considerations for Direct-Conversion Receivers," IEEE Transactions on Circuits and Systems-II: Analog and Digital Signal Processing, vol. 44, No. 6, Jun. 1997, pp. 428-435.

Farbod Behbahani et al., "CMOS Mixers and Polyphase Filters for Large Image Rejection," IEEE Journal of Solid-State Circuits, vol. 36, No. 6, Jun. 2001, pp. 873-887.

Jan Crols et al., "A Single-Chip 900 MHz CMOS Receiver Front-End With A High Performance Low-IF Topology," IEEE Journal of Solid-State Circuits, vol. 30, No. 12, Dec. 1995, pp. 1483-1492.

Analog Devices, Single-Chip Direct-Conversion GSM/GPRS/EDGE RFIC, Othello One, www.analog.com, 2 pgs.

Analog Devices, AD6523/AD6524, GSM Direct Conversion Radio Chip Set, www.analog.com, 2 pgs.

Analog Devices, GSM 3 V Transceiver IF Subsystem, AD6432, www.analog.com, pp. 1-20.

Hitachi, "RF Transceiver IC For GSM And PCN Dual Band Cellular Systems," HD155121F, ADE-207-265(Z), 1st Edition, Nov. 1998, pp. 1-56.

Analog Devices, AD7002 Specification, LC2MOS, GSM Baseband I/O Port, Rev. B, 1997, pp. 1-16.

Analog Devices, AD20msp415, GSM/DCS1800/PCS1900, Baseband Processing Chipset, Rev. O, 1997, pp. 1-7.

Kwentus et al., "A Single-Chip Universal Digital Satellite Receiver With 480-MHz IF Input," IEEE Journal of Solid-State Circuits, vol. 34, No. 11, Nov. 1999, pp. 1634-1646.

Minnis et al., "A Low-If Polyphase Receiver For GSM Using Log-Domain Signal Processing," IEEE Radio Frequency Integrated Circuits Symposium, 2000, pp. 83-86.

Atkinson et al., "A Novel Approach To Direct Conversion RF Receivers For TDMA Applications," Analog Devices, 1999, pp. 1-5.

Crochiere et al., "Optimum FIR Digital Filter Implementations For Decimation, Interpolation, And Narrow-Band Filtering," IEEE Transactions On Acoustics, Speech, And Signal Processing, vol. ASSP-23, No. 5, Oct. 1975, pp. 444-456.

Hogenauer, "An Economical Class Of Digital Filters For Decimation And Interpolation," IEEE, 1981, pp. 155-162.

Brandt et al., "A Low-Power, Area-Efficient Digital Filter For Decimation And Interpolation," IEEE Journal Of Solid-State Circuits, vol. 29, No. 6, Jun. 1994, pp. 679-687.

Philips Semiconductors, "uaa3535-Low-Power GSM GPRS Triple-Band Near-Zero IF Transceiver," Oct. 1999, 4 pgs.

D'Avella et al., "An Adaptive MLSE Receiver For TDMA Digital Mobile Radio," IEEE Journal On Selected Areas In Communications, vol. 7, No. 1, Jan. 1989, pp. 122-129.

Razavi, "CMOS RF Receiver Design For Wireless LAN Applications," IEEE, 1999, pp. 275-280.

Lucent Technologies, "W3020 GSM Multiband RF Transceiver," Advance Data Sheet, Dec. 1999, pp. 1-44.

Lucent Technologies, "DSP1620 Digital Signal Processor," Data Sheet, Jun. 1998, pp. 1-178.

Steyaert et al., "A 2-V CMOS Cellular Transceiver Front-End," IEEE Journal of Solid-State Circuits, vol. 35, No. 12, Dec. 2000, pp. 1895-1907.

Paulus et al., "A CMOS IF Transceiver With Reduced Analog Complexity," IEEE Journal Of Solid-State Circuits, vol. 33, No. 12, Dec. 1998, pp. 2154-2159.

Analog Devices, "Analog Devices Delivers World's First Open Market GSM Direct Conversion Radio Chipset," Nov. 1999, 4 pgs.

"Digest Of Technical Papers," 1997 IEEE International Solid-State Circuits Conference, First Edition, Feb. 1997, 5 pgs.

RF Micro Devices, RF2968, Product Description, Blue Tooth Transceiver, Rev A19, pp. 11-199-11-222.

Texas Instruments, TRF6901, "Single Chip RF Transceiver," Mar. 2002, pp. 1-29.

Texas Instruments, TRF6900A, "Single Chip RF Transceiver," Sep. 2001, pp. 1-34.

Texas Instruments, TRF6900, Single Chip RF Transceiver, Oct. 1999, pp. 1-32.

Philips Semiconductor, "Bluetooth RF Transceiver," Data Sheet, UAA3558, Dec. 21, 2000, pp. 1-5.

Philips Semiconductor, "Image Reject 1 800 MHz Transceiver For DECT Applications," Data Sheet, UAA2067G, Oct. 22, 1996, pp. 1-24.

Philips Semiconductor, "Analog Cordless Telephone IC," Data Sheet, UAA2062, Aug. 10, 2000, pp. 1-40.

Philips Semiconductor, "900 MHz Analog Cordless Telephone IC," Data Sheet, UAA3515A, Dec. 12, 2001, pp. 1-44.

Philips Semiconductor, "Low Voltage IF I/Q Transceiver," Data Sheet, SA1638, Sep. 3, 1997, pp. 1-26.

Texas Instruments, "TCS2100 GPRS Chipset Solution," Product Bulletin, 2001, 4 pgs.

Fague, "Othello: A New Direct-Conversion Radio Chip Set Eliminates IF Stages," Analog Dialogue 33-10, 1999, pp. 1-3.

Analog Devices, AD6523/AD6524, "GSM Direct Conversion Radio Chip Set," 1999, 2 pgs.

Lucent Technologies, "Lucent CSP1089 GSM Conversion Signal Processor For Cellular Handset And Modem Applications," Product Brief, Feb. 2001, 2 pgs.

Lucent Technologies, "Lucent CSP1099 GSM Conversion Signal Processor For Cellular Handset And Modem Applications," Product Brief, Feb. 2001, 2 pgs.

Lucent Technologies, "Trident," Product Brief, Feb. 2001, 2 pgs.

Ericsson, "RF Transceiver Circuit For The Digital Enhanced Cordless Telecommunications (DECT) System," PBL40215, Jan. 2001, pp. 1-22.

Micro Linear, "ML2712 2.4GHz Transceiver," Datasheet, Aug. 2001, pp. 1-21.

Analog Devices, "GSM/GPRS/DCS1800.PCS1900 SoftFone Baseband Chipset," AD20msp430, 2000, 2 pgs.

RF Micro Devices, "Polaris Total Radio Solution," Press Release, 2002, 1 pg.

Tuttle, "Introduction To Wireless Receiver Design," Tutorial, 2002, pp. 2-58.

Rael et al., "Design Methodology Used In A Single-Chip CMOS 900 MHz Spread-Spectrum Wireless Transceiver," $35^{th}$ Design Automation Conference, Jun. 1998, 6 pgs.

Troster et al., "An Interpolative Bandpass Converter On A 1.2-μm BiCMOS Analog/Digital Array," IEEE Journal Of Solid-State Circuits, vol. 28, No. 4, Apr. 1993, pp. 471-477.

Schreier et al., "Decimation For Bandpass Sigma-Delta Analog-To-Digital Conversion," IEEE, 1990, pp. 1801-1804.

Shoaei et al., "Optimal (Bandpass) Continuous-Time $\Delta\Sigma$ Modulator," pp. 489-492.

Schreier et al., "Bandpass Sigma-Delta Modulation," Electronics Letters, vol. 25, No. 23, Nov. 9, 1989, pp. 1560-1561.

Jantzi et al., "Bandpass Sigma-Delta Analog-To-Digital Conversion," IEEE Transactions On Circuits And Systems, vol. 38, No. 11, Nov. 1991, pp. 1406-1409.

Crols et al., "An Analog Integrated Polyphase Filter For A High Performance Low-IF Receiver," Symposium On VLSI Circuits Digest Of Technical Papers, 1995, pp. 87-88.

Aziz et al., "Performance Of Complex Noise Transfer Functions In Bandpass And Multi Band Sigma Delta Systems," IEEE, 1995, pp;. 641-644.

Jantzi, "A Fourth-Order Bandpass Sigma-Delta Modulator," IEEE Journal Of Solid-State Circuits, vol. 28, No. 3, Mar. 1993, pp. 282-291.

Liu et al., "Switched-Capacitor Implementation Of Complex Filters," IEEE International Symposium On Circuits And Systems, vol. 3, 1986, 5 pgs.

Sedra et al., "Complex Analog Bandpass Filters Designed By Linearly Shifting Real Low-Pass Prototypes," IEEE International Symposium On Circuits And Systems, vol. 3, 1985, 5 pgs.

Thurston et al., "Bandpass Implementation Of The Sigma-Delta A-D Conversion Technique," International Conference On Analogue To Digital And Digital To Analogue Conversion, Sep. 1991, 7 pgs.

Rudell, et al., *"Second Generation Multi-Standard Monolithic CMOS RF Transceiver,"* University of California, Berkeley, Slides 1 through 9 (Jun. 1996).

Cho, et al., *"Multi-Standard Monolithic CMOS RF Transceiver,"* University of California, Berkeley, Slides 1 through 26 (Jun. 1996).

Copending U.S. Appl. No. 09/821,342, filed Mar. 29, 2001, "Partitioned Radio-Frequency Apparatus And Associated Method" (SilA:072).
Copending U.S. Appl. No. 09/821,340, filed Mar. 29, 2001, "Digital Interface In Radio-Frequency Apparatus And Associated Methods" (SilA:073).
Copending U.S. Appl. No. 10/075,094, filed Feb. 13, 2002, "Radio-Frequency Communication Apparatus And Associated Methods" (Sila:074).
Copending U.S. Appl. No. 10/075,098, filed Feb. 13, 2002, "Apparatus And Methods For Generating Radio Frequencies In Communication Circuitry" (Sila:075).
Copending U.S. Appl. No. 10/075,122, filed Feb. 12, 2002, "Digital Architecture For Radio-Frequency Apparatus And Associated Methods" (Sila:078).
Copending U.S. Appl. No. 10/083,633, filed Feb. 26, 2002, "Apparatus And Methods For Calibrating Signal-Processing Circuitry" (Sila:080).
Copending U.S. Appl. No. 10/081,121, filed Feb. 22, 2002, "Calibrated Low-Moise Current And Voltage References And Associated Methods" (Sila:095).
Copending U.S. Appl. No. 10/074,591, filed Feb. 13, 2002, "Apparatus For Generating Multiple Radio Frequencies In Communication Circuitry And Associated Methods" (Sila:096).
Copending U.S. Appl. No. 10/075,099, filed Feb. 12, 2002, "Notch Filter For DC Offset Reduction In Radio-Frequency Apparatus And Associated Methods" (Sila:097).
Copending U.S. Appl. No. 10/074,676, filed Feb. 12, 2002, "DC Offset Reduction In Radio-Frequency Apparatus And Associated Methods" (Sila:098).
Copending U.S. Appl. No. 10/079,058, filed Feb. 19, 2002, "Apparatus And Methods For Output Buffer Circuitry With Constant Output Power In Radio-Frequency Circuitry" (Sila:099).
Copending U.S. Appl. No. 10/081,730, filed Feb. 22, 2002, "Method And Apparatus For Synthesizing High-Frequency Signals For Wireless Communications" (Sila:106).
Copending U.S. Appl. No. 10/079,057, filed Feb. 19, 2002, "Apparatus And Method For Front-End Circuitry In Radio-Frequency Apparatus" (Sila:107).
Allen, "Complex Analog Filters Obtained From Shifted Lowpass Prototypes," Sep. 1985, 118 pgs.
Motorola Communications Semiconductor Product Division, "A 1.9 GHz Chipset For PCS Applications," Microwave Journal, No. 6, Jun. 1995, 3 pgs.
Search Report for PCT/US02/00896; Oct. 4, 2002; 7 pgs.
Copending U.S. Appl. No. 09/708,339, filed Nov. 8, 2000, "Method And Apparatus For Operating A PLL With A Phase Detector/Sample Hold Circuit For Synthesizing High-Frequency Signals For Wireless Communications" (Sila:035C1).
Copending U.S. Appl. No. 09/999,702, filed Oct. 31, 2001, "Method And Apparatus For Synthesizing Dual Band High-Frequency Signals For Wireless Communications" (Sila:060C1).
Search Report for PCT/US02/00895; Nov. 11, 2002; 6 pgs.

* cited by examiner

FIG. 24 - Prior Art

APPARATUS AND METHOD FOR FRONT-END CIRCUITRY IN RADIO-FREQUENCY APPARATUS

CROSS-REFERENCE TO RELATED APPLICATIONS

This patent application is a continuation-in-part of U.S. patent application Ser. No. 09/821,342, titled "Partitioned Radio-Frequency Apparatus and Associated Methods," and filed on Mar. 29, 2001. This patent application claims priority to Provisional U.S. Patent Application Ser. No. 60/261,506, filed on Jan. 12, 2001; and Provisional U.S. Patent Application Ser. No. 60/273,119, titled "Partitioned RF Apparatus with Digital Interface and Associated Methods," filed on Mar. 2, 2001. Furthermore, this patent application claims priority to, and incorporates by reference, Provisional U.S. Patent Application Ser. No. 60/333,908, titled "Apparatus and Methods for Front-End Networks and Interfaces in RF Circuitry," filed on Nov. 28, 2001; and Provisional U.S. Patent Application Ser. No. 60/348,820, titled "Apparatus and Methods for Front-End Networks and Interfaces in RF Circuitry," filed on Jan. 14, 2002.

Furthermore, this patent application incorporates by reference the following patent documents: U.S. patent application Ser. No. 10/075,122, titled "Digital Architecture for Radio-Frequency Apparatus and Associated Methods"; U.S. patent application Ser. No. 10/075,099, titled "Notch Filter for DC Offset Reduction in Radio-Frequency Apparatus and Associated Methods"; U.S. patent application Ser. No. 10/074,676, titled "DC Offset Reduction in Radio-Frequency Apparatus and Associated Methods"; U.S. patent application Ser. No. 10/075,094, titled "Radio-Frequency Communication Apparatus and Associated Methods"; U.S. patent application Ser. No. 10/075,098, titled "Apparatus and Methods for Generating Radio Frequencies in Communication Circuitry"; U.S. patent application Ser. No. 10/074,591, titled "Apparatus for Generating Multiple Radio Frequencies in Communication Circuitry and Associated Methods"; and U.S. patent application Ser. No. 10/079,058, titled "Apparatus and Methods for Output Buffer Circuitry with Constant Output Power in Radio-Frequency Circuitry."

TECHNICAL FIELD OF THE INVENTION

This invention relates to radio-frequency (RF) apparatus, such as receivers and transceivers. More particularly, the invention concerns front-end circuitry in RF apparatus.

BACKGROUND

The proliferation and popularity of mobile radio and telephony applications has led to market demand for communication systems with low cost, low power, and small form-factor radio-frequency (RF) transceivers. As a result, recent research has focused on providing monolithic transceivers using low-cost complementary metal-oxide semiconductor (CMOS) technology. One aspect of research efforts has focused on providing an RF transceiver within a single integrated circuit (IC). The integration of transceiver circuits is not a trivial problem, as it must take into account the requirements of the transceiver's circuitry and the communication standards governing the transceiver's operation.

From the perspective of the transceiver's circuitry, RF transceivers typically include sensitive components susceptible to noise and interference with one another and with external sources. Integrating the transceiver's circuitry into one integrated circuit may exacerbate interference among the various blocks of the transceiver's circuitry. Moreover, communication standards governing RF transceiver operation outline a set of requirements for noise, inter-modulation, blocking performance, output power, and spectral emission of the transceiver. Unfortunately, no technique for addressing all of the above issues in high-performance RF receivers or transceivers, for example, RF transceivers used in cellular and telephony applications, has been developed. A need therefore exists for techniques of partitioning and integrating RF receivers or transceivers that would provide low-cost, low form-factor RF transceivers for high-performance applications, for example, in cellular handsets.

A further aspect of RF apparatus, such as RF transceivers and receivers, relates to the front-end circuitry of the RF apparatus. Typically, the front-end circuitry of modem RF apparatus includes a filter circuitry and a low-noise amplifier (LNA) circuitry. The output impedance of the filter circuitry often differs from the input impedance of the LNA circuitry. Proper transfer of signals between the filter circuitry an the LNA circuitry and the performance of the front-end circuitry, however, depends in part on the matching of the output impedance of the filter circuitry to the input impedance of the LNA circuitry. A need therefore exists for a matching network suitable for use in the front-end circuitry of modem RF apparatus, such as a cellular telephone handset chipset implemented in complementary metal oxide semiconductor (CMOS).

SUMMARY OF THE INVENTION

This invention relates to front-end circuitry in RF apparatus, such as RF receivers and RF transceivers. More specifically, the inventive concepts solve the problems of providing impedance matching in the front-end circuitry of RF apparatus. In one embodiment, an RF apparatus includes front-end circuitry. The front-end circuitry includes a filter circuitry and an impedance matching circuitry. The filter circuitry has a differential output that has an output impedance. The filter circuitry filters signals outside a signal band of interest. The impedance matching network has a differential input coupled to the output of the filter circuitry. The impedance matching network also has a differential output coupled to a signal processing circuitry. The signal processing circuitry has an input impedance. The impedance matching network matches the input impedance of the signal processing circuitry to the output impedance of the filter circuitry.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

DETAILED DESCRIPTION

This invention in part contemplates partitioning RF apparatus so as to provide highly integrated, high-performance, low-cost, and low form-factor RF solutions. One may use RF apparatus according to the invention in high-performance communication systems. More particularly, the invention in part relates to partitioning RF receiver or transceiver circuitry in a way that minimizes, reduces, or overcomes interference effects among the various blocks of the RF receiver or transceiver, while simultaneously satisfying the requirements of the standards that govern RF receiver or transceiver performance. Those standards include the Global System for Mobile (GSM) communication, Personal Communication Services (PCS), Digital Cellular System (DCS), Enhanced Data for GSM Evolution (EDGE), and General Packet Radio Services (GPRS). RF receiver or transceiver circuitry partitioned according to the invention therefore overcomes interference effects that would be present in highly integrated RF receivers or transceivers while meeting the requirements of the governing standards at low cost and with a low form-factor. The description of the invention refers to circuit partition and circuit block interchangeably.

Figure 1:
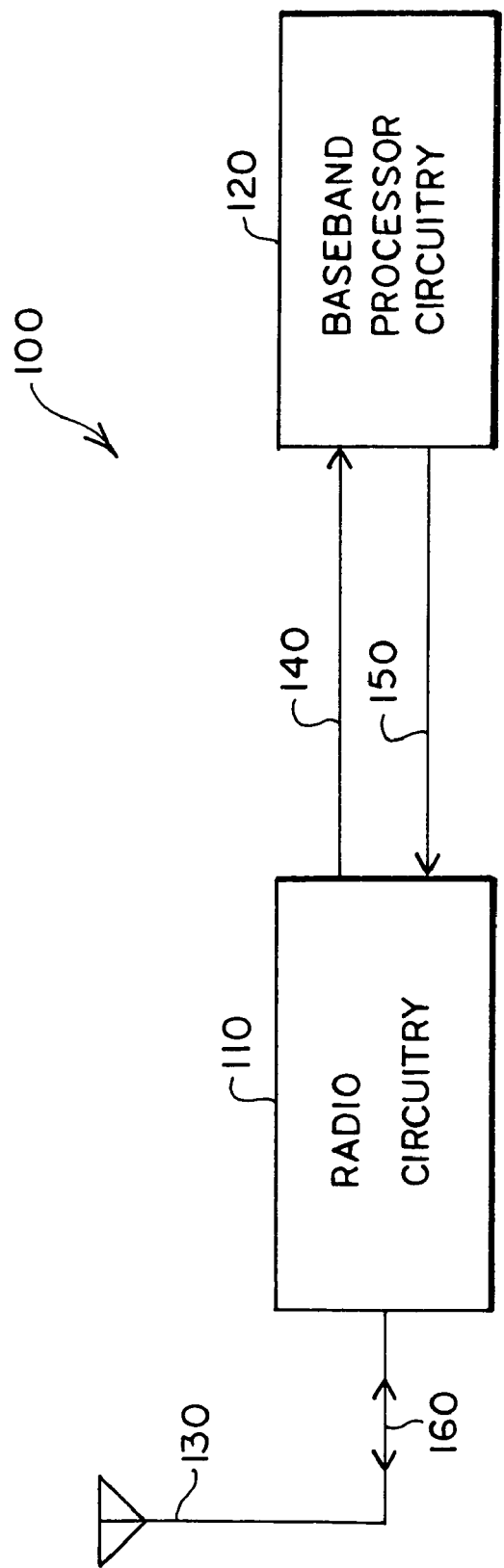
FIG. 1 illustrates the block diagram of an RF transceiver that includes radio circuitry that operates in conjunction with a baseband processor circuitry.

FIG. 1 shows the general block diagram of an RF transceiver circuitry 100 according to the invention. The RF transceiver circuitry 100 includes radio circuitry 110 that couples to an antenna 130 via a bi-directional signal path 160. The radio circuitry 110 provides an RF transmit signal to the antenna 130 via the bi-directional signal path 160 when the transceiver is in transmit mode. When in the receive mode, the radio circuitry 110 receives an RF signal from the antenna 130 via the bi-directional signal path 160.

The radio circuitry 110 also couples to a baseband processor circuitry 120. The baseband processor circuitry 120 may comprise a digital-signal processor (DSP). Alternatively, or in addition to the DSP, the baseband processor circuitry 120 may comprise other types of signal processor, as persons skilled in the art understand. The radio circuitry 110 processes the RF signals received from the antenna 130 and provides receive signals 140 to the baseband processor circuitry 120. In addition, the radio circuitry 110 accepts transmit input signals 150 from the baseband processor 120 and provides the RF transmit signals to the antenna 130.

Figure 2A:
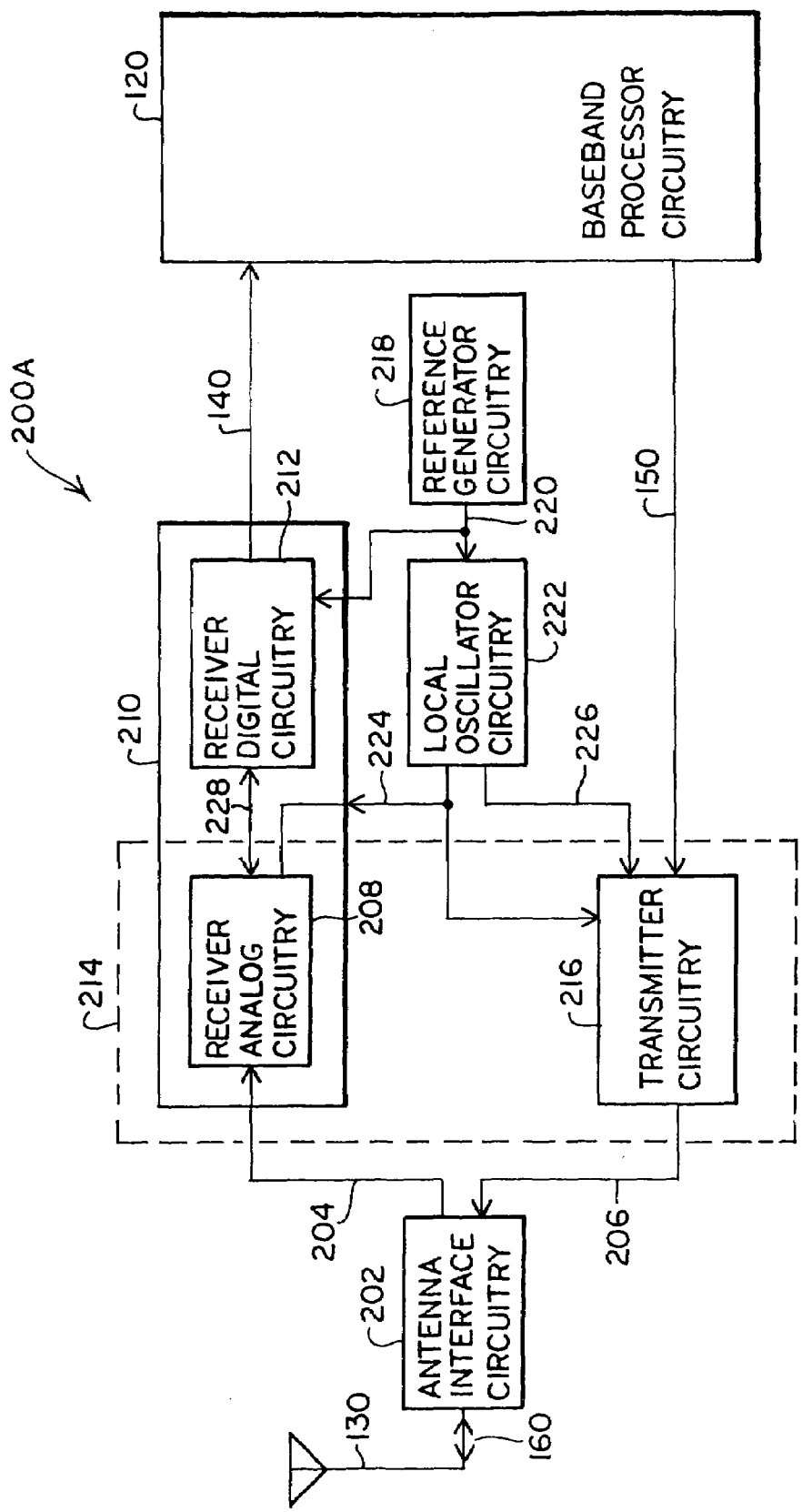
FIG. 2A shows RF transceiver circuitry partitioned according to the invention.

FIGS. 2A–2D show various embodiments of RF transceiver circuitry partitioned according to the invention. FIG. 3 and its accompanying description below make clear the considerations that lead to the partitioning of the RF transceiver circuitry as shown in FIGS. 2A–2D. FIG. 2A illustrates an embodiment 200A of an RF transceiver circuitry partitioned according to the invention. In addition to the elements described in connection with FIG. 1, the RF transceiver 200A includes antenna interface circuitry 202, receiver circuitry 210, transmitter circuitry 216, reference generator circuitry 218, and local oscillator circuitry 222.

The reference generator circuitry 218 produces a reference signal 220 and provides that signal to the local oscillator circuitry 222 and to receiver digital circuitry 212. The reference signal 220 preferably comprises a clock signal, although it may include other signals, as desired. The local oscillator circuitry 222 produces an RF local oscillator signal 224, which it provides to receiver analog circuitry 208 and to the transmitter circuitry 216. The local oscillator circuitry 222 also produces a transmitter intermediate-frequency (IF) local oscillator signal 226 and provides that signal to the transmitter circuitry 216. Note that, in RF transceivers according to the invention, the receiver analog circuitry 208 generally comprises mostly analog circuitry in addition to some digital or mixed-mode circuitry, for example, analog-to-digital converter (ADC) circuitry and circuitry to provide an interface between the receiver analog circuitry and the receiver digital circuitry, as described below.

The antenna interface circuitry 202 facilitates communication between the antenna 130 and the rest of the RF transceiver. Although not shown explicitly, the antenna interface circuitry 202 may include a transmit/receive mode switch, RF filters, and other transceiver front-end circuitry, as persons skilled in the art understand. In the receive mode, the antenna interface circuitry 202 provides RF receive signals 204 to the receiver analog circuitry 208. The receiver analog circuitry 208 uses the RF local oscillator signal 224 to process (e.g., down-convert) the RF receive signals 204 and produce a processed analog signal. The receiver analog circuitry 208 converts the processed analog signal to digital format and supplies the resulting digital receive signals 228 to the receiver digital circuitry 212. The receiver digital circuitry 212 further processes the digital receive signals 228 and provides the resulting receive signals 140 to the baseband processor circuitry 120.

In the transmit mode, the baseband processor circuitry 120 provides transmit input signals 150 to the transmitter circuitry 216. The transmitter circuitry 216 uses the RF local oscillator signal 224 and the transmitter IF local oscillator signal 226 to process the transmit input signals 150 and to provide the resulting transmit RF signal 206 to the antenna interface circuitry 202. The antenna interface circuitry 202 may process the transmit RF signal further, as desired, and provide the resulting signal to the antenna 130 for propagation into a transmission medium.

The embodiment 200A in FIG. 2A comprises a first circuit partition, or circuit block, 214 that includes the receiver analog circuitry 208 and the transmitter circuitry 216. The embodiment 200A also includes a second circuit partition, or circuit block, that includes the receiver digital circuitry 212. The embodiment 200A further includes a third circuit partition, or circuit block, that comprises the local oscillator circuitry 222. The first circuit partition 214, the second circuit partition 212, and the third circuit partition 222 are partitioned from one another so that interference effects among the circuit partitions tend to be reduced. The first, second, and third circuit partitions preferably each reside within an integrated circuit device. In other words, preferably the receiver analog circuitry 208 and the transmitter circuitry 216 reside within an integrated circuit device, the receiver digital circuitry 212 resides within another integrated circuit device, and the local oscillator circuitry 222 resides within a third integrated circuit device.

Figure 2B:
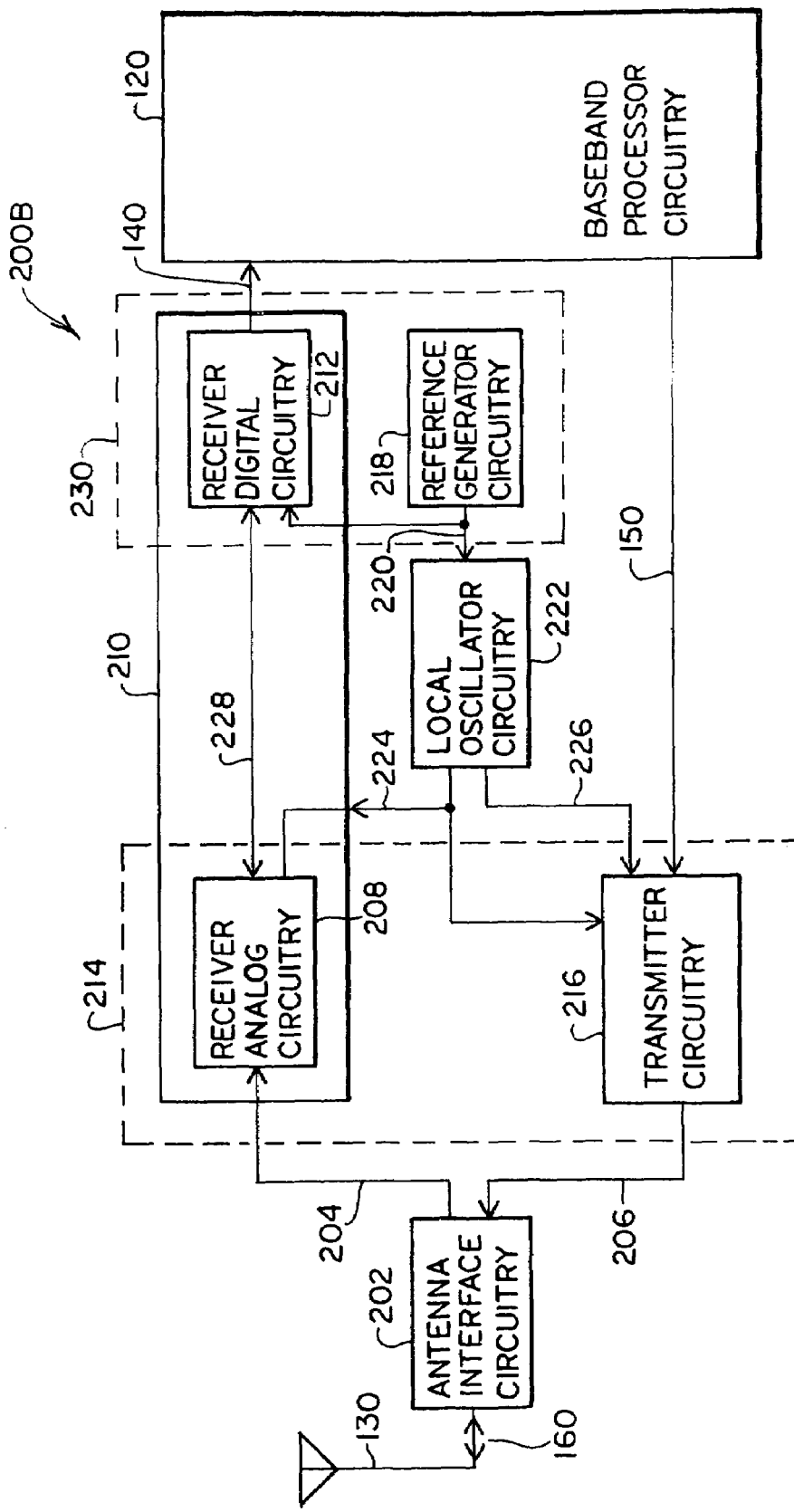
FIG. 2B depicts another embodiment of RF transceiver circuitry partitioned according to the invention, in which the reference generator circuitry resides within the same circuit partition, or circuit block, as does the receiver digital circuitry.
Figure 3:
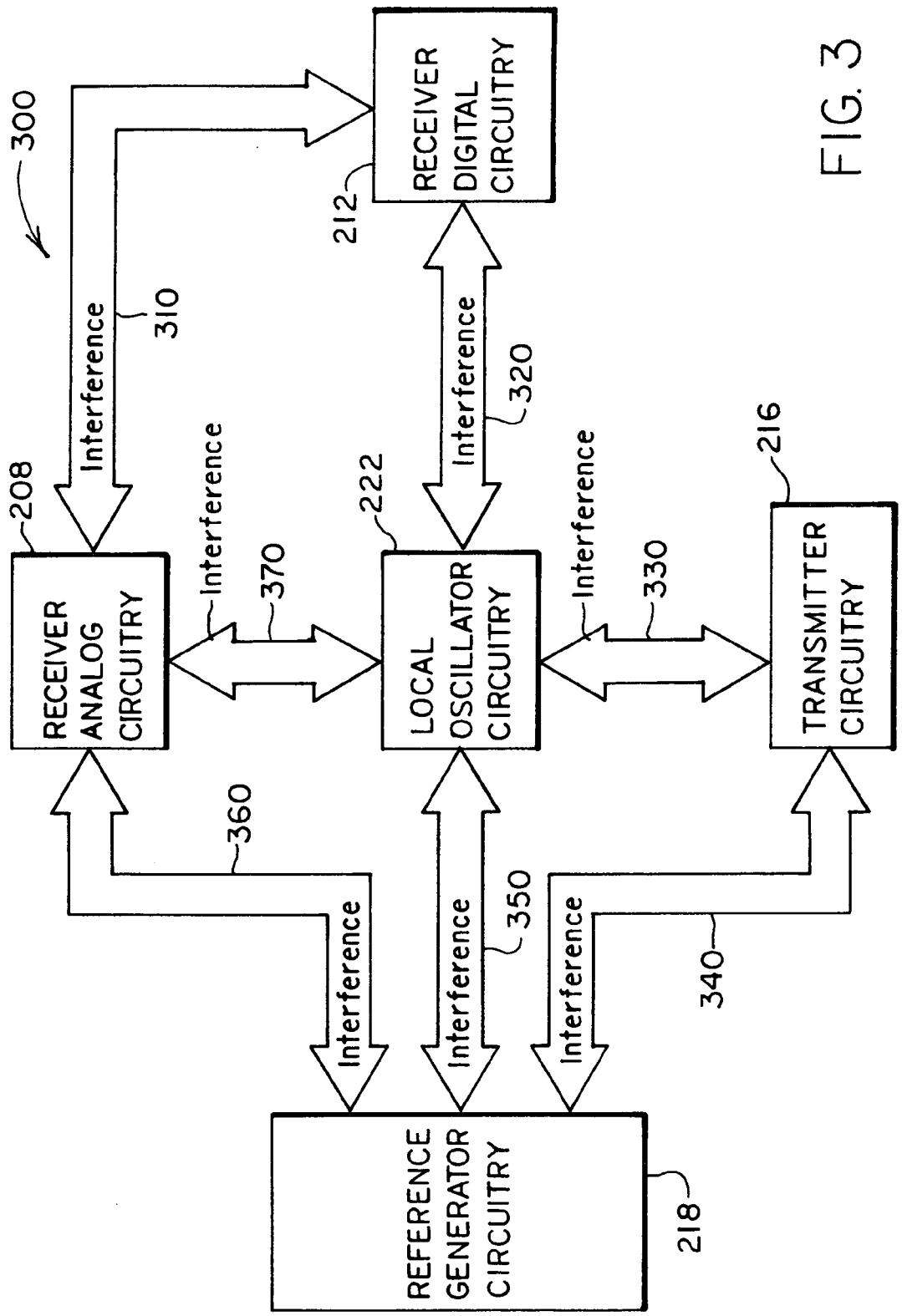
FIG. 3 illustrates interference mechanisms among the various blocks of an RF transceiver, which the embodiments of the invention in FIGS. 2A–2D, depicting RF transceivers partitioned according to the invention, seek to overcome, reduce, or minimize.

FIG. 2B shows an embodiment 200B of an RF transceiver circuitry partitioned according to the invention. The embodiment 200B has the same circuit topology as that of embodiment 200A in FIG. 2A. The partitioning of embodiment 200B, however, differs from the partitioning of embodiment 200A. Like embodiment 200A, embodiment 200B has three circuit partitions, or circuit blocks. The first and the third circuit partitions in embodiment 200B are similar to the first and third circuit partitions in embodiment 200A. The second circuit partition 230 in embodiment 200B, however, includes the reference signal generator 218 in addition to the receiver digital circuitry 212. As in embodiment 200A, embodiment 200B is partitioned so that interference effects among the three circuit partitions tend to be reduced.

Figure 2C:
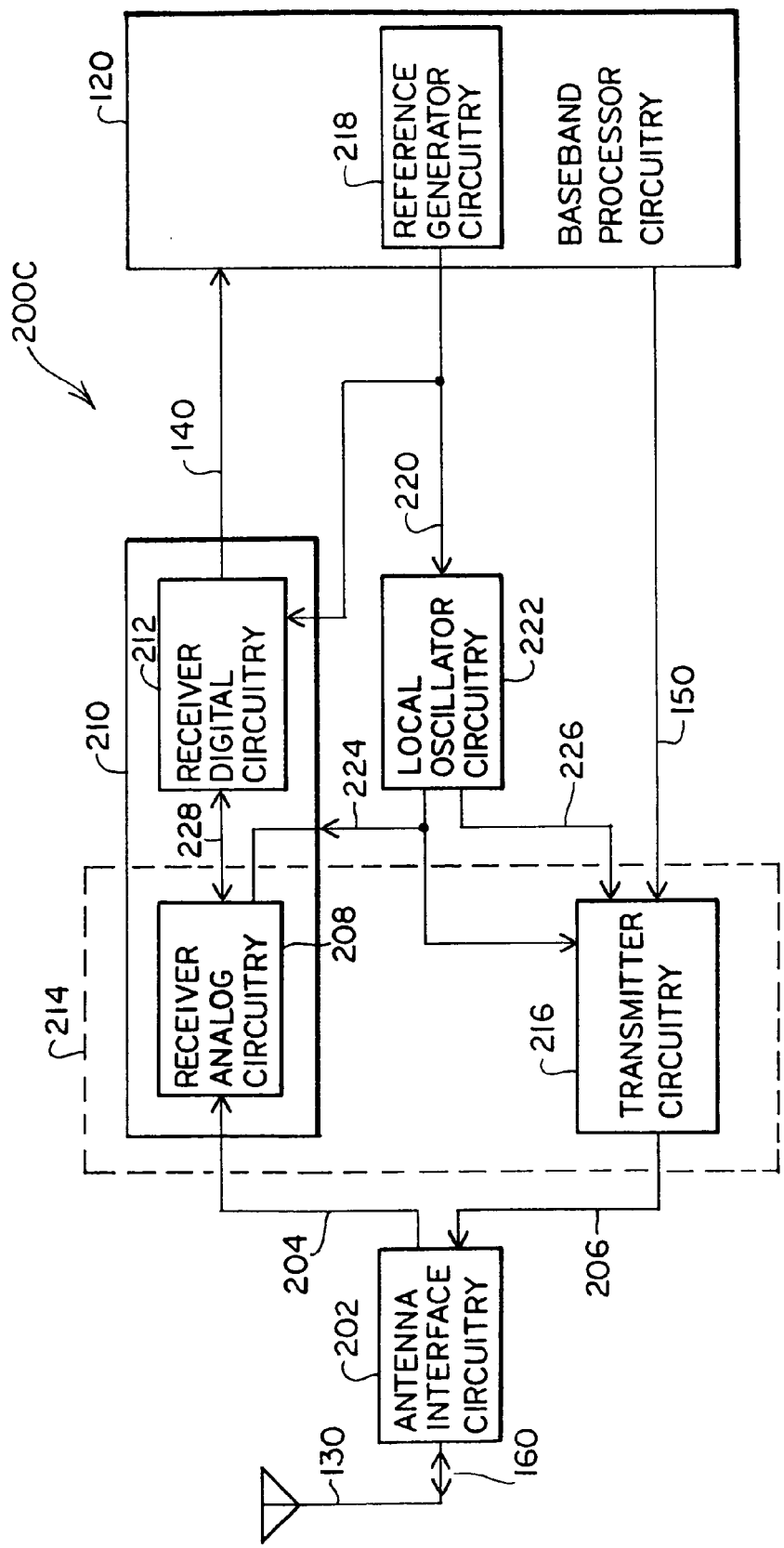
FIG. 2C illustrates yet another embodiment of RF transceiver circuitry partitioned according to invention, in which the reference generator circuitry resides within the baseband processor circuitry.

FIG. 2C illustrates an embodiment 200C, which constitutes a variation of embodiment 200A in FIG. 2A. Embodiment 200C shows that one may place the reference signal generator 218 within the baseband processor circuitry 120, as desired. Placing the reference signal generator 218 within the baseband processor circuitry 120 obviates the need for either discrete reference signal generator circuitry 218 or an additional integrated circuit or module that includes the reference signal generator 218. Embodiment 200C has the same partitioning as embodiment 200A, and operates in a similar manner.

Note that FIGS. 2A–2C show the receiver circuitry 210 as a block to facilitate the description of the embodiments shown in those figures. In other words, the block containing the receiver circuitry 210 in FIGS. 2A–2C constitutes a conceptual depiction of the receiver circuitry within the RF transceiver shown in FIGS. 2A–2C, not a circuit partition or circuit block.

Figure 2D:
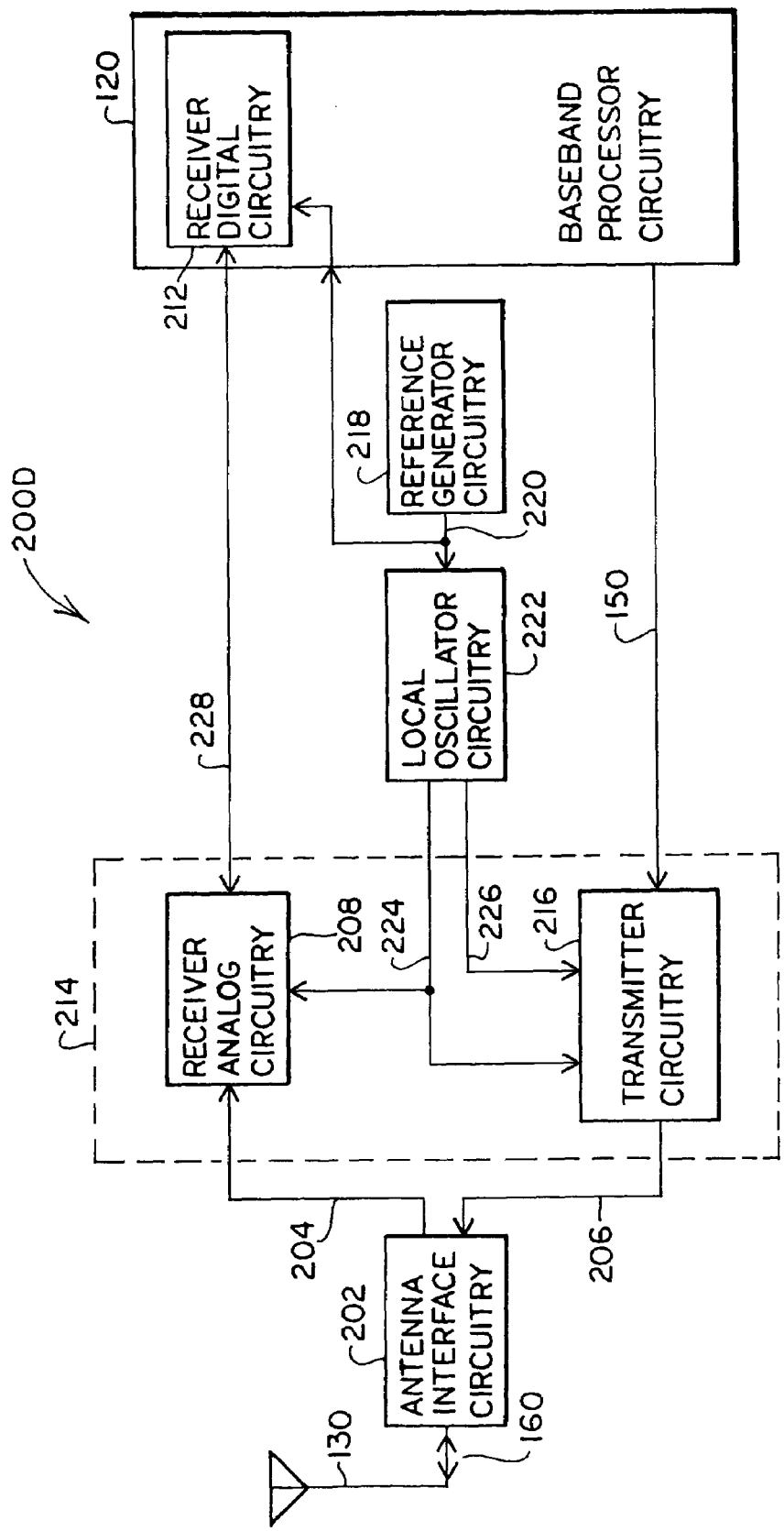
FIG. 2D shows another embodiment of RF transceiver circuitry partitioned according to the invention, in which the receiver digital circuitry resides within the baseband processor circuitry.

FIG. 2D shows an embodiment 200D of an RF transceiver partitioned according to the invention. The RF transceiver in FIG. 2D operates similarly to the transceiver shown in FIG. 2A. The embodiment 200D, however, accomplishes additional economy by including the receiver digital circuitry 212 within the baseband processor circuitry 120. As one alternative, one may integrate the entire receiver digital circuitry 212 on the same integrated circuit device that includes the baseband processor circuitry 120. Note that one may use software (or firmware), hardware, or a combination of software (or firmware) and hardware to realize the functions of the receiver digital circuitry 212 within the baseband processor circuitry 120, as persons skilled in the art who have the benefit of the description of the invention understand. Note also that, similar to the embodiment 200C in FIG. 2C, the baseband processor circuitry 120 in embodiment 200D may also include the reference signal generator 218, as desired.

The partitioning of embodiment 200D involves two circuit partitions, or circuit blocks. The first circuit partition 214 includes the receiver analog circuitry 208 and the transmitter circuitry 216. The second circuit partition includes the local oscillator circuitry 222. The first and second circuit partitions are partitioned so that interference effects between them tend to be reduced.

FIG. 3 shows the mechanisms that may lead to interference among the various blocks or components in a typical RF transceiver, for example, the transceiver shown in FIG. 2A. Note that the paths with arrows in FIG. 3 represent interference mechanisms among the blocks within the transceiver, rather than desired signal paths. One interference mechanism results from the reference signal 220 (see FIGS. 2A–2D), which preferably comprises a clock signal. In the preferred embodiments, the reference generator circuitry produces a clock signal that may have a frequency of 13 MHz (GSM clock frequency) or 26 MHz. If the reference generator produces a 26 MHz clock signal, RF transceivers according to the invention preferably divide that signal by two to produce a 13 MHz master system clock. The clock signal typically includes voltage pulses that have many Fourier series harmonics. The Fourier series harmonics extend to many multiples of the clock signal frequency. Those harmonics may interfere with the receiver analog circuitry 208 (e.g., the low-noise amplifier, or LNA), the local oscillator circuitry 222 (e.g., the synthesizer circuitry), and the transmitter circuitry 216 (e.g., the transmitter's voltage-controlled oscillator, or VCO). FIG. 3 shows these sources of interference as interference mechanisms 360, 350, and 340.

The receiver digital circuitry 212 uses the output of the reference generator circuitry 218, which preferably comprises a clock signal. Interference mechanism 310 exists because of the sensitivity of the receiver analog circuitry 208 to the digital switching noise and harmonics present in the receiver digital circuitry 212. Interference mechanism 310 may also exist because of the digital signals (for example, clock signals) that the receiver digital circuitry 212 communicates to the receiver analog circuitry 208. Similarly, the digital switching noise and harmonics in the receiver digital circuitry 212 may interfere with the local oscillator circuitry 222, giving rise to interference mechanism 320 in FIG. 3.

The local oscillator circuitry 222 typically uses an inductor in an inductive-capacitive (LC) resonance tank (not shown explicitly in the figures). The resonance tank may circulate relatively large currents. Those currents may couple to the sensitive circuitry within the transmitter circuitry 216 (e.g., the transmitter's VCO), thus giving rise to interference mechanism 330. Similarly, the relatively large currents circulating within the resonance tank of the local oscillator circuitry 222 may saturate sensitive components within the receiver analog circuitry 208 (e.g., the LNA circuitry). FIG. 3 depicts this interference source as interference mechanism 370.

The timing of the transmit mode and receive mode in the GSM specifications help to mitigate potential interference between the transceiver's receive-path circuitry and its transmit-path circuitry. The GSM specifications use time-division duplexing (TDD). According to the TDD protocol, the transceiver deactivates the transmit-path circuitry while in the receive mode of operation, and vice-versa. Consequently, FIG. 3 does not show potential interference mechanisms between the transmitter circuitry 216 and either the receiver digital circuitry 212 or the receiver analog circuitry 208.

As FIG. 3 illustrates, interference mechanisms exist between the local oscillator circuitry 222 and each of the other blocks or components in the RF transceiver. Thus, to reduce interference effects, RF transceivers according to the invention preferably partition the local oscillator circuitry 222 separately from the other transceiver blocks shown in FIG. 3. Note, however, that in some circumstances one may include parts or all of the local oscillator circuitry within the same circuit partition (for example, circuit partition 214 in FIGS. 2A–2D) that includes the receiver analog circuitry and the transmitter circuitry, as desired. Typically, a voltage-controlled oscillator (VCO) within the local oscillator circuitry causes interference with other sensitive circuit blocks (for example, the receiver analog circuitry) through undesired coupling mechanisms. If those coupling mechanisms can be mitigated to the extent that the performance characteristics of the RF transceiver are acceptable in a given application, then one may include the local oscillator circuitry within the same circuit partition as the receiver analog circuitry and the transmitter circuitry. Alternatively, if the VCO circuitry causes unacceptable levels of interference, one may include other parts of the local oscillator circuitry within the circuit partition that includes the receiver analog circuitry and the transmitter circuitry, but exclude the VCO circuitry from that circuit partition.

To reduce the effects of interference mechanism 310, RF transceivers according to the invention partition the receiver analog circuitry 208 separately from the receiver digital circuitry 212. Because of the mutually exclusive operation of the transmitter circuitry 216 and the receiver analog circuitry 208 according to GSM specifications, the transmitter circuitry 216 and the receiver analog circuitry 208 may reside within the same circuit partition, or circuit block. Placing the transmitter circuitry 216 and the receiver analog circuitry 208 within the same circuit partition results in a more integrated RF transceiver overall. The RF transceivers shown in FIGS. 2A–2D employ partitioning techniques that take advantage of the above analysis of the interference mechanisms among the various transceiver components. To reduce interference effects among the various circuit partitions or circuit blocks even further, RF transceivers according to the invention also use differential signals to couple the circuit partitions or circuit blocks to one another.

Figure 4:
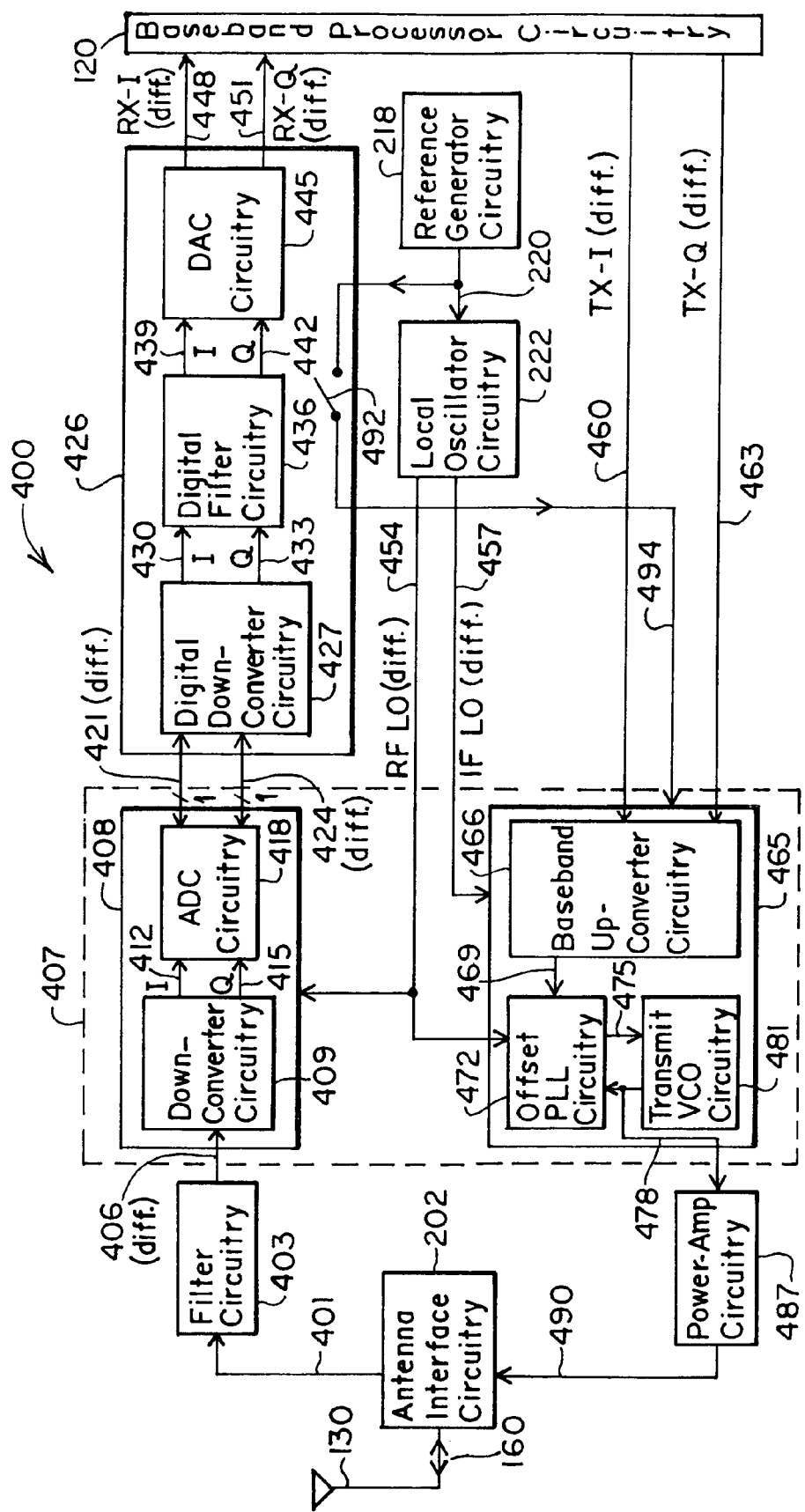
FIG. 4 shows a more detailed block diagram of RF transceiver circuitry partitioned according to the invention.

FIG. 4 shows a more detailed block diagram of an embodiment 400 of an RF transceiver partitioned according to the invention. The transceiver includes receiver analog circuitry 408, receiver digital circuitry 426, and transmitter circuitry 465. In the receive mode, the antenna interface circuitry 202 provides an RF signal 401 to a filter circuitry 403. The filter circuitry 403 provides a filtered RF signal 406 to the receiver analog circuitry 408. The receiver analog circuitry 408 includes down-converter (i.e., mixer) circuitry 409 and analog-to-digital converter (ADC) circuitry 418.

The down-converter circuitry 409 mixes the filtered RF signal 406 with an RF local oscillator signal 454, received from the local oscillator circuitry 222. The down-converter circuitry 409 provides an in-phase analog down-converted signal 412 (i.e., I-channel signal) and a quadrature analog down-converted signal 415 (i.e., Q-channel signal) to the ADC circuitry 418.

The ADC circuitry 418 converts the in-phase analog down-converted signal 412 and the quadrature analog down-converted signal 415 into a one-bit in-phase digital receive signal 421 and a one-bit quadrature digital receive signal 424. (Note that FIGS. 4–8 illustrate signal flow, rather than specific circuit implementations; for more details of the circuit implementation, for example, more details of the circuitry relating to the one-bit in-phase digital receive signal 421 and the one-bit quadrature digital receive signal 424, see FIGS. 9–14.) Thus, The ADC circuitry 418 provides the one-bit in-phase digital receive signal 421 and the one-bit quadrature digital receive signal 424 to the receiver digital circuitry 426. As described below, rather than, or in addition to, providing the one-bit in-phase and quadrature digital receive signals to the receiver digital circuitry 426, the digital interface between the receiver analog circuitry 408 and the receiver digital circuitry 426 may communicate various other signals. By way of illustration, those signals may include reference signals (e.g., clock signals), control signals, logic signals, hand-shaking signals, data signals, status signals, information signals, flag signals, and/or configuration signals. Moreover, the signals may constitute single-ended or differential signals, as desired. Thus, the interface provides a flexible communication mechanism between the receiver analog circuitry and the receiver digital circuitry.

The receiver digital circuitry 426 includes digital down-converter circuitry 427, digital filter circuitry 436, and digital-to-analog converter (DAC) circuitry 445. The digital down-converter circuitry 427 accepts the one-bit in-phase digital receive signal 421 and the one-bit quadrature digital receive signal 424 from the receiver analog circuitry 408. The digital down-converter circuitry 427 converts the received signals into a down-converted in-phase signal 430 and a down-converted quadrature signal 433 and provides those signals to the digital filter circuitry 436. The digital filter circuitry 436 preferably comprises an infinite impulse response (IIR) channel-select filter that performs various filtering operations on its input signals. The digital filter circuitry 436 preferably has programmable response characteristics. Note that, rather than using an IIR filter, one may use other types of filter (e.g., finite impulse-response, or FIR, filters) that provide fixed or programmable response characteristics, as desired.

The digital filter circuitry 436 provides a digital in-phase filtered signal 439 and a digital quadrature filtered signal 442 to the DAC circuitry 445. The DAC circuitry 445 converts the digital in-phase filtered signal 439 and the digital quadrature filtered signal 442 to an in-phase analog receive signal 448 and a quadrature analog receive signal 451, respectively. The baseband processor circuitry 120 accepts the in-phase analog receive signal 448 and the quadrature analog receive signal 451 for further processing.

The transmitter circuitry 465 comprises baseband up-converter circuitry 466, offset phase-lock-loop (PLL) circuitry 472, and transmit voltage-controlled oscillator (VCO) circuitry 481. The transmit VCO circuitry 481 typically has low-noise circuitry and is sensitive to external noise. For example, it may pick up interference from digital switching because of the high gain that results from the resonant LC-tank circuit within the transmit VCO circuitry 481. The baseband up-converter circuitry 466 accepts an intermediate frequency (IF) local oscillator signal 457 from the local oscillator circuitry 222. The baseband up-converter circuitry 466 mixes the IF local oscillator signal 457 with an analog in-phase transmit input signal 460 and an analog quadrature transmit input signal 463 and provides an up-converted IF signal 469 to the offset PLL circuitry 472.

The offset PLL circuitry 472 effectively filters the IF signal 469. In other words, the offset PLL circuitry 472 passes through it signals within its bandwidth but attenuates other signals. In this manner, the offset PLL circuitry 472 attenuates any spurious or noise signals outside its bandwidth, thus reducing the requirement for filtering at the antenna 130, and reducing system cost, insertion loss, and power consumption. The offset PLL circuitry 472 forms a feedback loop with the transmit VCO circuitry 481 via an offset PLL output signal 475 and a transmit VCO output signal 478. The transmit VCO circuitry 481 preferably has a constant-amplitude output signal.

The offset PLL circuitry 472 uses a mixer (not shown explicitly in FIG. 4) to mix the RF local oscillator signal 454 with the transmit VCO output signal 478. Power amplifier circuitry 487 accepts the transmit VCO output signal 478, and provides an amplified RF signal 490 to the antenna interface circuitry 202. The antenna interface circuitry 202 and the antenna 130 operate as described above. RF transceivers according to the invention preferably use transmitter circuitry 465 that comprises analog circuitry, as shown in FIG. 4. Using such circuitry minimizes interference with the transmit VCO circuitry 481 and helps to meet emission specifications for the transmitter circuitry 465.

The receiver digital circuitry 426 also accepts the reference signal 220 from the reference generator circuitry 218. The reference signal 220 preferably comprises a clock signal. The receiver digital circuitry 426 provides to the transmitter circuitry 465 a switched reference signal 494 by using a switch 492. Thus, the switch 492 may selectively provide the reference signal 220 to the transmitter circuitry 465. Before the RF transceiver enters its transmit mode, the receiver digital circuitry 426 causes the switch 492 to close, thus providing the switched reference signal 494 to the transmitter circuitry 465.

The transmitter circuitry 465 uses the switched reference signal 494 to calibrate or adjust some of its components. For example, the transmitter circuitry 465 may use the switched reference signal 494 to calibrate some of its components, such as the transmit VCO circuitry 481, for example, as described in commonly owned U.S. Pat. No. 6,137,372, incorporated by reference here in its entirety. The transmitter circuitry 465 may also use the switched reference signal 494 to adjust a voltage regulator within its output circuitry so as to transmit at known levels of RF radiation or power.

While the transmitter circuitry 465 calibrates and adjusts its components, the analog circuitry within the transmitter circuitry 465 powers up and begins to settle. When the transmitter circuitry 465 has finished calibrating its internal circuitry, the receiver digital circuitry 426 causes the switch 492 to open, thus inhibiting the supply of the reference signal 220 to the transmitter circuitry 465. At this point, the transmitter circuitry may power up the power amplifier circuitry 487 within the transmitter circuitry 465. The RF transceiver subsequently enters the transmit mode of operation and proceeds to transmit.

Note that FIG. 4 depicts the switch 492 as a simple switch for conceptual, schematic purposes. One may use a variety of devices to realize the function of the controlled switch 492, for example, semiconductor switches, gates, or the like, as persons skilled in the art who have the benefit of the disclosure of the invention understand. Note also that, although FIG. 4 shows the switch 492 as residing within the receiver digital circuitry 426, one may locate the switch in other locations, as desired. Placing the switch 492 within the receiver digital circuitry 426 helps to confine to the receiver digital circuitry 426 the harmonics that result from the switching circuitry.

The embodiment 400 in FIG. 4 comprises a first circuit partition 407, or circuit block, that includes the receiver analog circuitry 408 and the transmitter circuitry 465. The embodiment 400 also includes a second circuit partition, or circuit block, that includes the receiver digital circuitry 426. Finally, the embodiment 400 includes a third circuit partition, or circuit block, that comprises the local oscillator circuitry 222. The first circuit partition 407, the second circuit partition, and the third circuit partition are partitioned from one another so that interference effects among the circuit partitions tend to be reduced. That arrangement tends to reduce the interference effects among the circuit partitions by relying on the analysis of interference effects provided above in connection with FIG. 3. Preferably, the first, second, and third circuit partitions each reside within an integrated circuit device. To further reduce interference effects among the circuit partitions, the embodiment 400 in FIG. 4 uses differential signals wherever possible. The notation "(diff.)" adjacent to signal lines or reference numerals in FIG. 4 denotes the use of differential lines to propagate the annotated signals.

Note that the embodiment 400 shown in FIG. 4 uses an analog-digital-analog signal path in its receiver section. In other words, the ADC circuitry 418 converts analog signals into digital signals for further processing, and later conversion back into analog signals by the DAC circuitry 445. RF transceivers according to the invention use this particular signal path for the following reasons. First, the ADC circuitry 418 obviates the need for propagating signals from the receiver analog circuitry 408 to the receiver digital circuitry 426 over an analog interface with a relatively high dynamic range. The digital interface comprising the one-bit in-phase digital receive signal 421 and the one-bit quadrature digital receive signal 424 is less susceptible to the effects of noise and interference than would be an analog interface with a relatively high dynamic range.

Second, the RF transceiver in FIG. 4 uses the DAC circuitry 445 to maintain compatibility with interfaces commonly used to communicate with baseband processor circuitry in RF transceivers. According to those interfaces, the baseband processor accepts analog, rather than digital, signals from the receive path circuitry within the RF transceiver. In an RF transceiver that meets the specifications of those interfaces, the receiver digital circuitry 426 would provide analog signals to the baseband processor circuitry 120. The receiver digital circuitry 426 uses the DAC circuitry 445 to provide analog signals (i.e., the in-phase analog receive signal 448 and the quadrature analog receive signal 451) to the baseband processor circuitry 120. The DAC circuitry 445 allows programming the common-mode level and the full-scale voltage, which may vary among different baseband processor circuitries.

Third, compared to an analog solution, the analog-digital-analog signal path may result in reduced circuit size and area (for example, the area occupied within an integrated circuit device), thus lower cost. Fourth, the digital circuitry provides better repeatability, relative ease of testing, and more robust operation than its analog counterpart. Fifth, the digital circuitry has less dependence on supply voltage variation, temperature changes, and the like, than does comparable analog circuitry.

Sixth, the baseband processor circuitry 120 typically includes programmable digital circuitry, and may subsume the functionality of the digital circuitry within the receiver digital circuitry 426, if desired. Seventh, the digital circuitry allows more precise signal processing, for example, filtering, of signals within the receive path. Eighth, the digital circuitry allows more power-efficient signal processing. Finally, the digital circuitry allows the use of readily programmable DAC circuitry and PGA circuitry that provide for more flexible processing of the signals within the receive path. To benefit from the analog-digital-analog signal path, RF transceivers according to the invention use a low-IF signal (for example, 100 KHz for GSM applications) in their receive path circuitry, as using higher IF frequencies may lead to higher performance demands on the ADC and DAC circuitry within that path. The low-IF architecture also eases image-rejection requirements, and allows on-chip integration of the digital filter circuitry 436. Moreover, RF transceivers according to the invention use the digital down-converter circuitry 427 and the digital filter circuitry 436 to implement a digital-IF path in the receive signal path. The digital-IF architecture facilitates the implementation of the digital interface between the receiver digital circuitry 426 and the receiver analog circuitry 408.

If the receiver digital circuitry 426 need not be compatible with the common analog interface to baseband processors, one may remove the DAC circuitry 445 and use a digital interface to the baseband processor circuitry 120, as desired. In fact, similar to the RF transceiver shown in FIG. 2D, one may realize the function of the receiver digital circuitry 426 within the baseband processor circuitry 120, using hardware, software, or a combination of hardware and software. In that case, the RF transceiver would include two circuit partitions, or circuit blocks. The first circuit partition, or circuit block, 407 would include the receiver analog circuitry 408 and the transmitter circuitry 465. A second circuit partition, or circuit block, would comprise the local oscillator circuitry 222. Note also that, similar to the RF transceiver shown in FIG. 2C, one may include within the baseband processor circuitry 120 the functionality of the reference generator circuitry 218, as desired.

Figure 5:
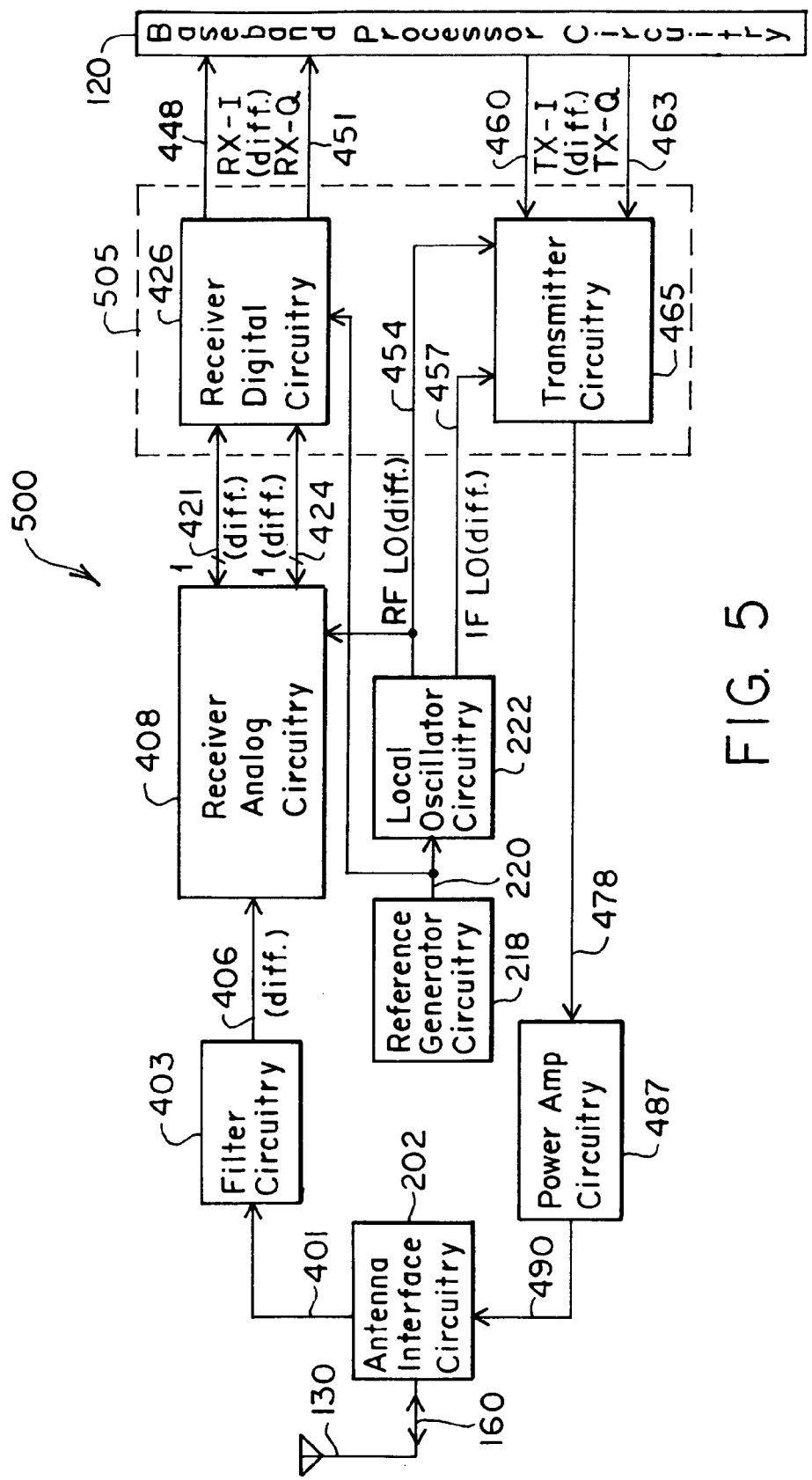
FIG. 5 illustrates an alternative technique for partitioning RF transceiver circuitry.
Figure 6:
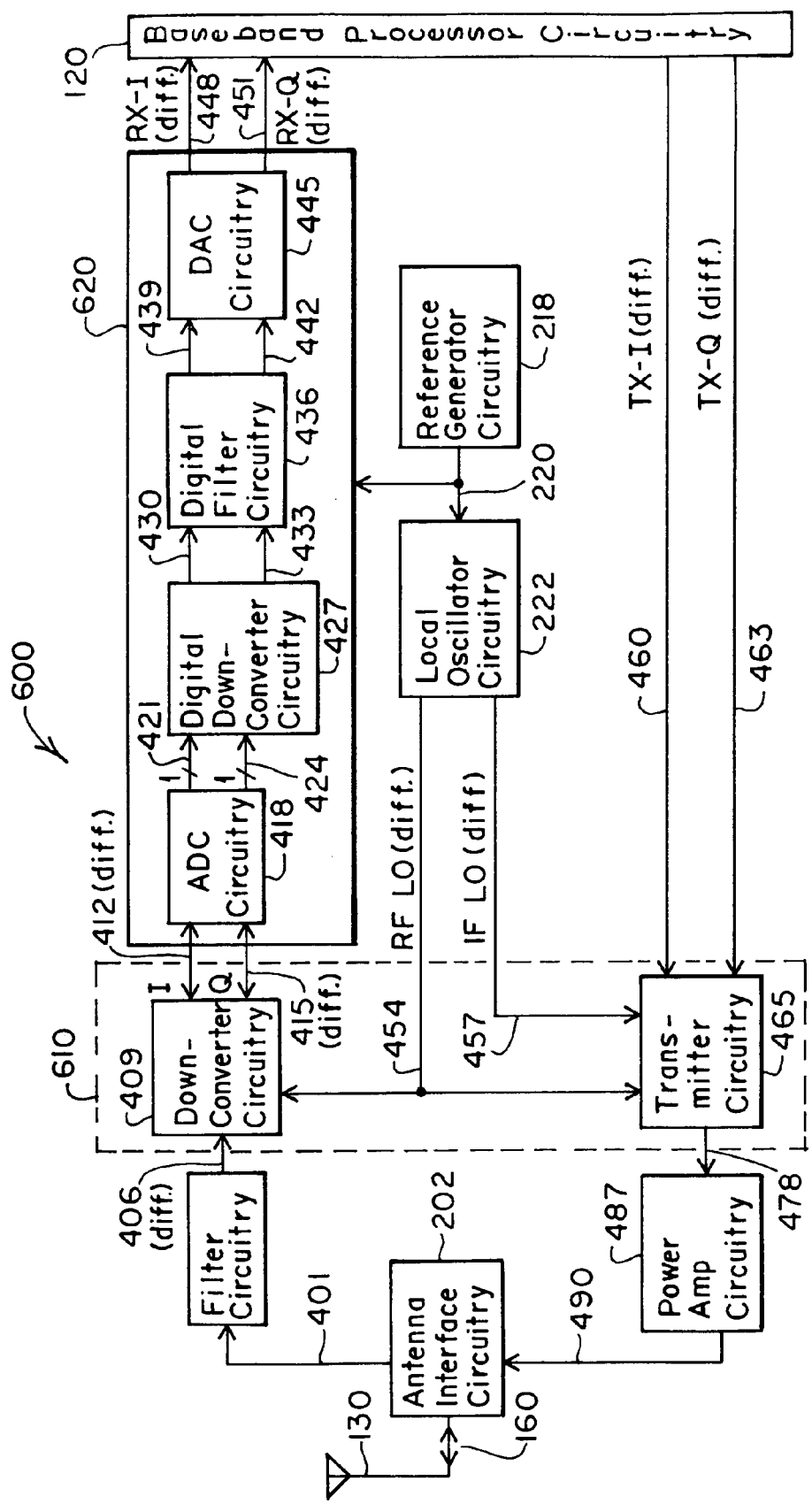
FIG. 6 shows yet another alternative technique for partitioning RF transceiver circuitry.

One may partition the RF transceiver shown in FIG. 4 in other ways. FIGS. 5 and 6 illustrate alternative partitioning of the RF transceiver of FIG. 4. FIG. 5 shows an embodiment 500 of an RF transceiver that includes three circuit partitions, or circuit blocks. A first circuit partition includes the receiver analog circuitry 408. A second circuit partition 505 includes the receiver digital circuitry 426 and the transmitter circuitry 465. As noted above, the GSM specifications provide for alternate operation of RF transceivers in receive and transmit modes. The partitioning shown in FIG. 5 takes advantage of the GSM specifications by including the receiver digital circuitry 426 and the transmitter circuitry 465 within the second circuit partition 505. A third circuit partition includes the local oscillator circuitry 222. Preferably, the first, second, and third circuit partitions each reside within an integrated circuit device. Similar to embodiment 400 in FIG. 4, the embodiment 500 in FIG. 5 uses differential signals wherever possible to further reduce interference effects among the circuit partitions.

FIG. 6 shows another alternative partitioning of an RF transceiver. FIG. 6 shows an embodiment 600 of an RF transceiver that includes three circuit partitions, or circuit blocks. A first circuit partition 610 includes part of the receiver analog circuitry, i.e., the down-converter circuitry 409, together with the transmitter circuitry 465. A second circuit partition 620 includes the ADC circuitry 418, together with the receiver digital circuitry, i.e., the digital down-converter circuitry 427, the digital filter circuitry 436, and the DAC circuitry 445. A third circuit partition includes the local oscillator circuitry 222. Preferably, the first, second, and third circuit partitions each reside within an integrated circuit device. Similar to embodiment 400 in FIG. 4, the embodiment 600 in FIG. 6 uses differential signals wherever possible to further reduce interference effects among the circuit partitions.

Figure 7:
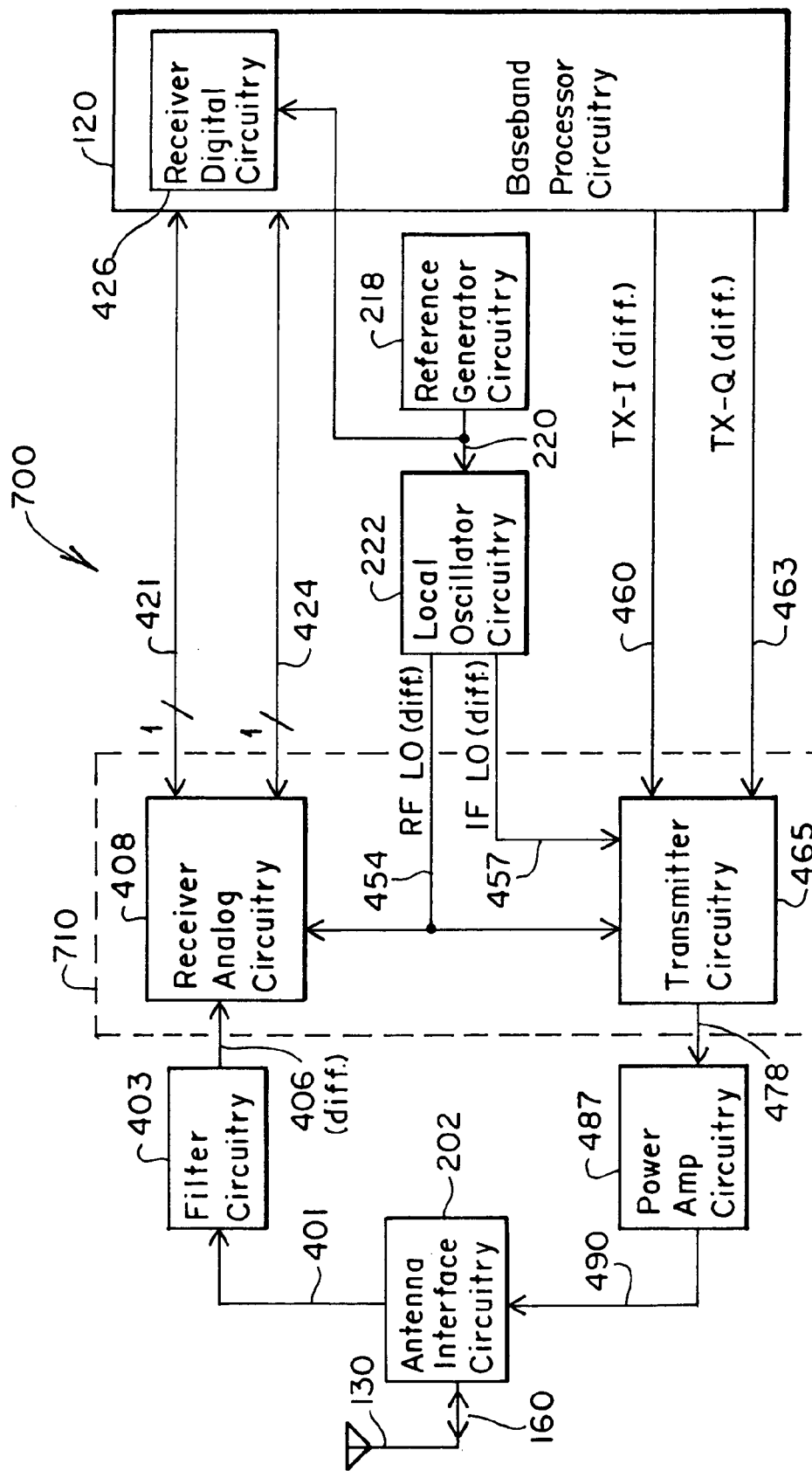
FIG. 7 depicts a more detailed block diagram of RF transceiver circuitry partitioned according to the invention, in which the receiver digital circuitry resides within the baseband processor circuitry.

FIG. 7 shows a variation of the RF transceiver shown in FIG. 4. FIG. 7 illustrates an embodiment 700 of an RF transceiver partitioned according to the invention. Note that, for the sake of clarity, FIG. 7 does not explicitly show the details of the receiver analog circuitry 408, the transmitter circuitry 465, and the receiver digital circuitry 426. The receiver analog circuitry 408, the transmitter circuitry 465, and the receiver digital circuitry 426 include circuitry similar to those shown in their corresponding counterparts in FIG. 4. Similar to the RF transceiver shown in FIG. 2D, the embodiment 700 in FIG. 7 shows an RF transceiver in which the baseband processor 120 includes the function of the receiver digital circuitry 426. The baseband processor circuitry 120 may realize the function of the receiver digital circuitry 426 using hardware, software, or a combination of hardware and software.

Because the embodiment 700 includes the function of the receiver digital circuitry 426 within the baseband processor circuitry 120, it includes two circuit partitions, or circuit blocks. A first circuit partition 710 includes the receiver analog circuitry 408 and the transmitter circuitry 465. A second circuit partition comprises the local oscillator circuitry 222. Note also that, similar to the RF transceiver shown in FIG. 2C, one may also include within the baseband processor circuitry 120 the functionality of the reference generator circuitry 218, as desired.

Figure 8:
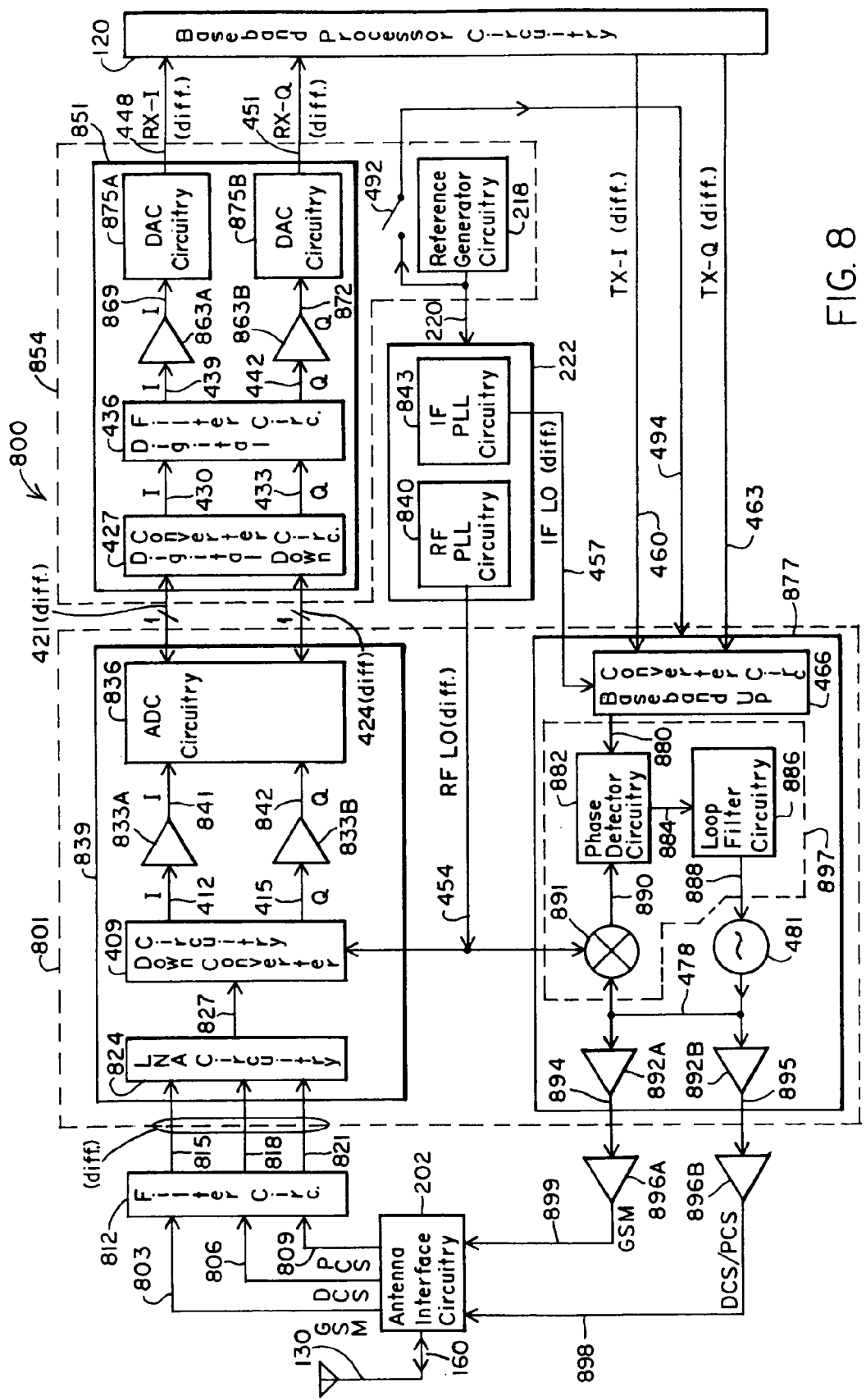
FIG. 8 illustrates a more detailed block diagram of a multi-band RF transceiver circuitry partitioned according to the invention.

FIG. 8 shows an embodiment 800 of a multi-band RF transceiver, partitioned according to the invention. Preferably, the RF transceiver in FIG. 8 operates within the GSM (925 to 960 MHz for reception and 880–915 MHz for transmission), PCS (1930 to 1990 MHz for reception and 1850–1910 MHz for transmission), and DCS (1805 to 1880 MHz for reception and 1710–1785 MHz for transmission) bands. Like the RF transceiver in FIG. 4, the RF transceiver in FIG. 8 uses a low-IF architecture. The embodiment 800 includes receiver analog circuitry 839, receiver digital circuitry 851, transmitter circuitry 877, local oscillator circuitry 222, and reference generator circuitry 218. The local oscillator circuitry 222 includes RF phase-lock loop (PLL) circuitry 840 and intermediate-frequency (IF) PLL circuitry 843. The RF PLL circuitry 840 produces the RF local oscillator, or RF LO, signal 454, whereas the IF PLL circuitry 843 produces the IF local oscillator, or IF LO, signal 457.

Table 1 below shows the preferred frequencies for the RF local oscillator signal 454 during the receive mode:

TABLE 1

| Band | RF Local Oscillator Frequency (MHz) |
| --- | --- |
| GSM | 1849.8–1919.8 |
| DCS | 1804.9–1879.9 |
| PCS | 1929.9–1989.9 |

TABLE 1-continued

| Band | RF Local Oscillator Frequency (MHz) |
| --- | --- |
| All Bands | 1804.9–1989.9 |

Table 2 below lists the preferred frequencies for the RF local oscillator signal 454 during the transmit mode:

TABLE 2

| Band | RF Local Oscillator Frequency (MHz) |
| --- | --- |
| GSM | 1279–1314 |
| DCS | 1327–1402 |
| PCS | 1423–1483 |
| All Bands | 1279–1483 |

During the receive mode, the IF local oscillator signal 457 is preferably turned off. In preferred embodiments, during the transmit mode, the IF local oscillator signal 457 preferably has a frequency between 383 MHz and 427 MHz. Note, however, that one may use other frequencies for the RF and IF local oscillator signals 454 and 457, as desired.

The reference generator 218 provides a reference signal 220 that preferably comprises a clock signal, although one may use other signals, as persons skilled in the art who have the benefit of the description of the invention understand. Moreover, the transmitter circuitry 877 preferably uses high-side injection for the GSM band and low-side injection for the DCS and PCS bands.

The receive path circuitry operates as follows. Filter circuitry 812 accepts a GSM RF signal 803, a DCS RF signal 806, and a PCS RF signal 809 from the antenna interface circuitry 202. The filter circuitry 812 preferably contains a surface-acoustic-wave (SAW) filter for each of the three bands, although one may use other types and numbers of filters, as desired. The filter circuitry 812 provides a filtered GSM RF signal 815, a filtered DCS RF signal 818, and a filtered PCS RF signal 821 to low-noise amplifier (LNA) circuitry 824. The LNA circuitry 824 preferably has programmable gain, and in part provides for programmable gain in the receive path circuitry.

The LNA circuitry 824 provides an amplified RF signal 827 to down-converter circuitry 409. In exemplary embodiments according to the invention, amplified RF signal 827 includes multiple signal lines, which may be differential signal lines, to accommodate the GSM, DCS, and PCS bands. Note that, rather than using the LNA circuitry with a real output, one may use an LNA circuitry that has complex outputs (in-phase and quadrature outputs), together with a poly-phase filter circuitry. The combination of the complex LNA circuitry and the poly-phase filter circuitry provides better image rejection, albeit with a somewhat higher loss. Thus, the choice of using the complex LNA circuitry and the poly-phase filter circuitry depends on a trade-off between image rejection and loss in the poly-phase filter circuitry.

The down-converter circuitry 409 mixes the amplified RF signal 827 with the RF local oscillator signal 454, which it receives from the RF PLL circuitry 840. The down-converter circuitry 409 produces the in-phase analog down-converted signal 412 and the quadrature in-phase analog down-converted signal 415. The down-converter circuitry 409 provides the in-phase analog down-converted signal 412 and the quadrature in-phase analog down-converted signal 415 to a pair of programmable-gain amplifiers (PGAs) 833A and 833B.

The PGA 833A and PGA 833B in part allow for programming the gain of the receive path. The PGA 833A and the PGA 833B supply an analog in-phase amplified signal 841 and an analog quadrature amplified signal 842 to complex ADC circuitry 836 (i.e., both I and Q inputs will affect both I and Q outputs). The ADC circuitry 836 converts the analog in-phase amplified signal 841 into a one-bit in-phase digital receive signal 421. Likewise, the ADC circuitry 836 converts the analog quadrature amplifier signal 842 into a one-bit quadrature digital receive signal 424.

Note that RF transceivers and receivers according to the invention preferably use a one-bit digital interface. One may, however, use a variety of other interfaces, as persons skilled in the art who have the benefit of the description of the invention understand. For example, one may use a multi-bit interface or a parallel interface. Moreover, as described below, rather than, or in addition to, providing the one-bit in-phase and quadrature digital receive signals to the receiver digital circuitry 851, the digital interface between the receiver analog circuitry 839 and the receiver digital circuitry 851 may communicate various other signals. By way of illustration, those signals may include reference signals (e.g., clock signals), control signals, logic signals, hand-shaking signals, data signals, status signals, information signals, flag signals, and/or configuration signals. Furthermore, the signals may constitute single-ended or differential signals, as desired. Thus, the interface provides a flexible communication mechanism between the receiver analog circuitry and the receiver digital circuitry.

The receiver digital circuitry 851 accepts the one-bit in-phase digital receive signal 421 and the one-bit quadrature digital receive signal 424, and provides them to the digital down-converter circuitry 427. The digital down-converter circuitry 427 converts the received signals into a down-converted in-phase signal 430 and a down-converted quadrature signal 433 and provides those signals to the digital filter circuitry 436. The digital filter circuitry 436 preferably comprises an IIR channel-select filter that performs filtering operations on its input signals. Note, however, that one may use other types of filters, for example, FIR filters, as desired.

The digital filter circuitry 436 provides the digital in-phase filtered signal 439 to a digital PGA 863A and the digital quadrature filtered signal 442 to a digital PGA 863B. The digital PGA 863A and PGA 863B in part allow for programming the gain of the receive path circuitry. The digital PGA 863A supplies an amplified digital in-phase signal 869 to DAC circuitry 875A, whereas the digital PGA 863B supplies an amplified digital quadrature signal 872 to DAC circuitry 875B. The DAC circuitry 875A converts the amplified digital in-phase signal 869 to the in-phase analog receive signal 448. The DAC circuitry 875B converts the amplified digital quadrature signal 872 signal into the quadrature analog receive signal 451. The baseband processor circuitry 120 accepts the in-phase analog receive signal 448 and the quadrature analog receive signal 451 for further processing, as desired.

Note that the digital circuit blocks shown in the receiver digital circuitry 851 depict mainly the conceptual functions and signal flow. The actual digital-circuit implementation may or may not contain separately identifiable hardware for the various functional blocks. For example, one may re-use (in time, for instance, by using multiplexing) the same digital circuitry to implement both digital PGA 863A and digital PGA 863B, as desired.

Note also that, similar to the RF transceiver in FIG. 4, the RF transceiver in FIG. 8 features a digital-IF architecture. The digital-IF architecture facilitates the implementation of the one-bit digital interface between the receiver digital circuitry 426 and the receiver analog circuitry 408. Moreover, the digital-IF architecture allows digital (rather than analog) IF-filtering, thus providing all of the advantages of digital filtering.

The transmitter circuitry 877 comprises baseband up-converter circuitry 466, transmit VCO circuitry 481, a pair of transmitter output buffers 892A and 892B, and offset PLL circuitry 897. The offset PLL circuitry 897 includes offset mixer circuitry 891, phase detector circuitry 882, and loop filter circuitry 886. The baseband up-converter circuitry 466 accepts the analog in-phase transmit input signal 460 and the analog quadrature transmit input signal 463, mixes those signals with the IF local oscillator signal 457, and provides a transmit IF signal 880 to the offset PLL circuitry 897. The offset PLL circuitry 897 uses the transmit IF signal 880 as a reference signal. The transmit IF signal 880 preferably comprises a modulated single-sideband IF signal but, as persons skilled in the art who have the benefit of the description of the invention understand, one may use other types of signal and modulation, as desired.

The offset mixer circuitry 891 in the offset PLL circuitry 897 mixes the transmit VCO output signal 478 with the RF local oscillator signal 454, and provides a mixed signal 890 to the phase detector circuitry 882. The phase detector circuitry 882 compares the mixed signal 890 to the transmit IF signal 880 and provides an offset PLL error signal 884 to the loop filter circuitry 886. The loop filter circuitry 886 in turn provides a filtered offset PLL signal 888 to the transmit VCO circuitry 481. Thus, the offset PLL circuitry 897 and the transmit VCO circuitry 481 operate in a feedback loop. Preferably, the output frequency of the transmit VCO circuitry 481 centers between the DCS and PCS bands, and its output is divided by two for the GSM band.

Transmitter output buffers 892A and 892B receive the transmit VCO output signal 478 and provide buffered transmit signals 894 and 895 to a pair of power amplifiers 896A and 896B. The power amplifiers 896A and 896B provide amplified RF signals 899 and 898, respectively, for transmission through antenna interface circuitry 202 and the antenna 130. Power amplifier 896A provides the RF signal 899 for the GSM band, whereas power amplifier 896B supplies the RF signal 898 for the DCS and PCS bands. Persons skilled in the art who have the benefit of the description of the invention, however, understand that one may use other arrangements of power amplifiers and frequency bands. Moreover, one may use RF filter circuitry within the output path of the transmitter circuitry 877, as desired.

The embodiment 800 comprises three circuit partitions, or circuit blocks. A first circuit partition 801 includes the receiver analog circuitry 839 and the transmitter circuitry 877. A second circuit partition 854 includes the receiver digital circuitry 851 and the reference generator circuitry 218. Finally, a third circuit partition comprises the local oscillator circuitry 222. The first circuit partition 801, the second circuit partition 854, and the third circuit partition are partitioned from one another so that interference effects among the circuit partitions tend to be reduced. That arrangement tends to reduce the interference effects among the circuit partitions because of the analysis of interference effects provided above in connection with FIG. 3. Preferably, the first, second, and third circuit partitions each reside within an integrated circuit device. To further reduce interference effects among the circuit partitions, the embodiment 800 in FIG. 8 uses differential signals wherever possible. The notation "(diff.)" adjacent to signal lines or reference numerals in FIG. 8 denotes the use of differential lines to propagate the annotated signals.

Note that, similar to the RF transceiver shown in FIG. 4 and described above, the embodiment 800 shown in FIG. 8 uses an analog-digital-analog signal path in its receiver section. The embodiment 800 uses this particular signal path for reasons similar to those described above in connection with the transceiver shown in FIG. 4.

Like the transceiver in FIG. 4, if the receiver digital circuitry 851 need not be compatible with the common analog interface to baseband processors, one may remove the DAC circuitry 875A and 875B, and use a digital interface to the baseband processor circuitry 120, as desired. In fact, similar to the RF transceiver shown in FIG. 2D, one may realize the function of the receiver digital circuitry 851 within the baseband processor circuitry 120, using hardware, software, or a combination of hardware and software. In that case, the RF transceiver would include two circuit partitions, or circuit blocks. The first circuit partition 801 would include the receiver analog circuitry 839 and the transmitter circuitry 877. A second circuit partition would comprise the local oscillator circuitry 222. Note also that, similar to the RF transceiver shown in FIG. 2C, in the embodiment 800, one may include within the baseband processor circuitry 120 the functionality of the reference generator circuitry 218, as desired.

Another aspect of the invention includes a configurable interface between the receiver digital circuitry and the receiver analog circuitry. Generally, one would seek to minimize digital switching activity within the receiver analog circuitry. Digital switching activity within the receiver analog circuitry would potentially interfere with the sensitive analog RF circuitry, for example, LNAs, or mixers. As described above, the receiver analog circuitry includes analog-to-digital circuitry (ADC), which preferably comprises sigma-delta-type ADCs. Sigma-delta ADCs typically use a clock signal at their output stages that generally has a pulse shape and, thus, contains high-frequency Fourier series harmonics. Moreover, the ADC circuitry itself produces digital outputs that the receiver digital circuitry uses. The digital switching present at the outputs of the ADC circuitry may also interfere with sensitive analog circuitry within the receiver analog circuitry.

Figure 9A:
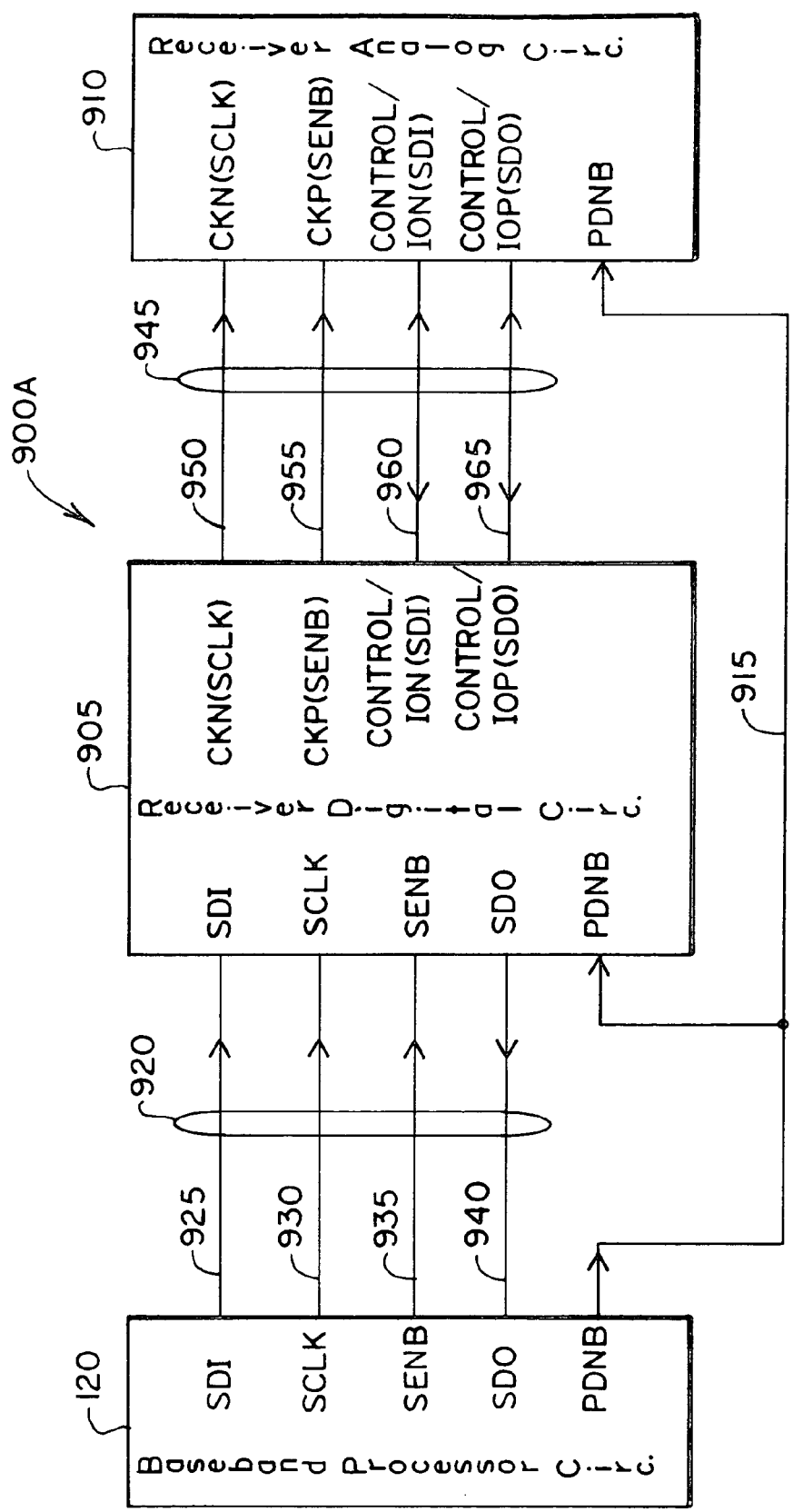
FIG. 9A shows a block diagram of an embodiment of the interface between the receiver digital circuitry and receiver analog circuitry in an RF transceiver according to the invention.

The invention contemplates providing RF apparatus according to the invention, for example, receivers and transceivers, that include an interface circuitry to minimize or reduce the effects of interference from digital circuitry within the RF apparatus. FIG. 9A shows an embodiment 900A of an interface between the receiver digital circuitry 905 and the receiver analog circuitry 910. The interface includes configurable interface signal lines 945. The baseband processor circuitry 120 in the transceiver of FIG. 9A communicates configuration, status, and setup information with both the receiver digital circuitry 905 and the receiver analog circuitry 910. In the preferred embodiments of RF transceivers according to the invention, the baseband processor circuitry 120 communicates with the receiver digital circuitry 905 and the receiver analog circuitry 910 by sending configuration data to read and write registers included within the receiver digital circuitry 905 and the receiver analog circuitry 910.

The receiver digital circuitry 905 communicates with the baseband processor circuitry 120 through a set of serial interface signal lines 920. The serial interface signal lines 920 preferably include a serial data-in (SDI) signal line 925, a serial clock (SCLK) signal line 930, a serial interface enable (SENB) signal line 935, and a serial data-out (SDO) signal line 940. The transceiver circuitry and the baseband processor circuitry 120 preferably hold all of the serial interface signal lines 920 at static levels during the transmit and receive modes of operation. The serial interface preferably uses a 22-bit serial control word that comprises 6 address bits and 16 data bits. Note, however, that one may use other serial interfaces, parallel interfaces, or other types of interfaces, that incorporate different numbers of signal lines, different types and sizes of signals, or both, as desired. Note also that, the SENB signal is preferably an active-low logic signal, although one may use a normal (i.e., an active-high) logic signal by making circuit modifications, as persons skilled in the art understand.

The receiver digital circuitry 905 communicates with the receiver analog circuitry 910 via configurable interface signal lines 945. Interface signal lines 945 preferably include four configurable signal lines 950, 955, 960, and 965, although one may use other numbers of configurable signal lines, as desired, depending on a particular application. In addition to supplying the serial interface signals 920, the baseband processor circuitry 120 provides a control signal 915, shown as a power-down (PDNB) signal in FIG. 9A, to both the receiver digital circuitry 905 and the receiver analog circuitry 910. The receiver digital circuitry 905 and the receiver analog circuitry 910 preferably use the power-down (PDNB) signal as the control signal 915 to configure the functionality of the interface signal lines 945. In other words, the functionality of the interface signal lines 945 depends on the state of the control signal 915. Also, the initialization of the circuitry within the receive path and the transmit path of the transceiver occurs upon the rising edge of the PDNB signal. Note that the PDNB signal is preferably an active-low logic signal, although one may use a normal (i.e., an active-high) logic signal, as persons skilled in the art would understand. Note also that, rather than using the PDNB signal, one may use other signals to control the configuration of the interface signal lines 945, as desired.

In the power-down or serial interface mode (i.e., the control signal 915 (for example, PDNB) is in the logic low state), interface signal line 950 provides the serial clock (SCLK) and interface signal line 955 supplies the serial interface enable signal (SENB). Furthermore, interface signal line 960 provides the serial data-in signal (SDI), whereas interface signal line 965 supplies the serial data-out (SDO) signal. One may devise other embodiments according to the invention in which, during this mode of operation, the transceiver may also perform circuit calibration and adjustment procedures, as desired (for example, the values of various transceiver components may vary over time or among transceivers produced in different manufacturing batches. The transceiver may calibrate and adjust its circuitry to take those variations into account and provide higher performance).

In the normal receive mode of operation (i.e., the control signal, PDNB, is in the logic-high state), interface signal line 950 provides a negative clock signal (CKN) and interface signal line 955 supplies the positive clock signal (CKP). Furthermore, interface signal line 960 provides a negative data signal (ION), whereas interface signal line 965 supplies a positive data signal (IOP).

In preferred embodiments of the invention, the CKN and CKP signals together form a differential clock signal that the receiver digital circuitry 905 provides to the receiver analog circuitry 910. The receiver analog circuitry 910 may provide the clock signal to the transmitter circuitry within the RF transceiver in order to facilitate calibration and adjustment of circuitry, as described above. During the receive mode, the receiver analog circuitry 910 provides the ION and IOP signals to the receiver digital circuitry 905. The ION and IOP signals preferably form a differential data signal. As noted above, the transceiver disables the transmitter circuitry during the receive mode of operation.

In preferred embodiments according to the invention, clock signals CKN and CKP are turned off when the transmitter circuitry is transmitting signals. During the transmit mode, interface signal lines 960 and 965 preferably provide two logic signals from the receiver digital circuitry 905 to the receiver analog circuitry 910. The signal lines may provide input/output signals to communicate data, status, information, flag, and configuration signals between the receiver digital circuitry 905 and the receiver analog circuitry 910, as desired. Preferably, the logic signals control the output buffer of the transmit VCO circuitry. Note that, rather than configuring interface signal lines 960 and 965 as logic signal lines, one may configure them in other ways, for example, analog signal lines, differential analog or digital signal lines, etc., as desired. Furthermore, the interface signal lines 960 and 965 may provide signals from the receiver digital circuitry 905 to the receiver analog circuitry 910, or vice-versa, as desired.

In addition to using differential signals, RF transceivers according to the invention preferably take other measures to reduce interference effects among the various transceiver circuits. Signals CKN, CKP, ION, and IOP may constitute voltage signals, as desired. Depending on the application, the signals CKN, CKP, ION, and IOP (or logic signals in the transmit mode) may have low voltage swings (for example, voltage swings smaller than the supply voltage) to reduce the magnitude and effects of interference because of the voltage switching on those signals.

In preferred embodiments according to the invention, signals CKN, CKP, ION, and IOP constitute current, rather than voltage, signals. Moreover, to help reduce the effects of interference even further, RF transceivers according to the invention preferably use band-limited signals. RF transceivers according to the invention preferably use filtering to remove some of the higher frequency harmonics from those signals to produce band-limited current signals.

Table 3 below summarizes the preferred functionality of the configurable interface signal lines 950, 955, 960, and 965 as a function of the state of the control signal 915 (for example, PDNB):

TABLE 3

| Signal Line | Control = 0 | Control = 1 (During Reception) | Control = 1 (During Transmission) |
|---|---|---|---|
| 950 | SCLK | CKN | (CKN off) |
| 955 | SENB | CKP | (CKP off) |
| 960 | SDI | ION | Logic Signal |
| 965 | SDO | IOP | Logic Signal |

Using configurable interface signal lines 945 in the interface between the receiver digital circuitry 905 and the receiver analog circuitry 910 allows using the same physical connections (e.g., pins on an integrated-circuit device or electrical connectors on a module) to accomplish different functionality. Thus, the configurable interface between the receiver digital circuitry 905 and the receiver analog circuitry 910 makes available the physical electrical connections available for other uses, for example, providing ground pins or connectors around sensitive analog signal pins or connectors to help shield those signals from RF interference. Moreover, the configurable interface between the receiver digital circuitry 905 and the receiver analog circuitry 910 reduces packaging size, cost, and complexity.

Figure 9B:
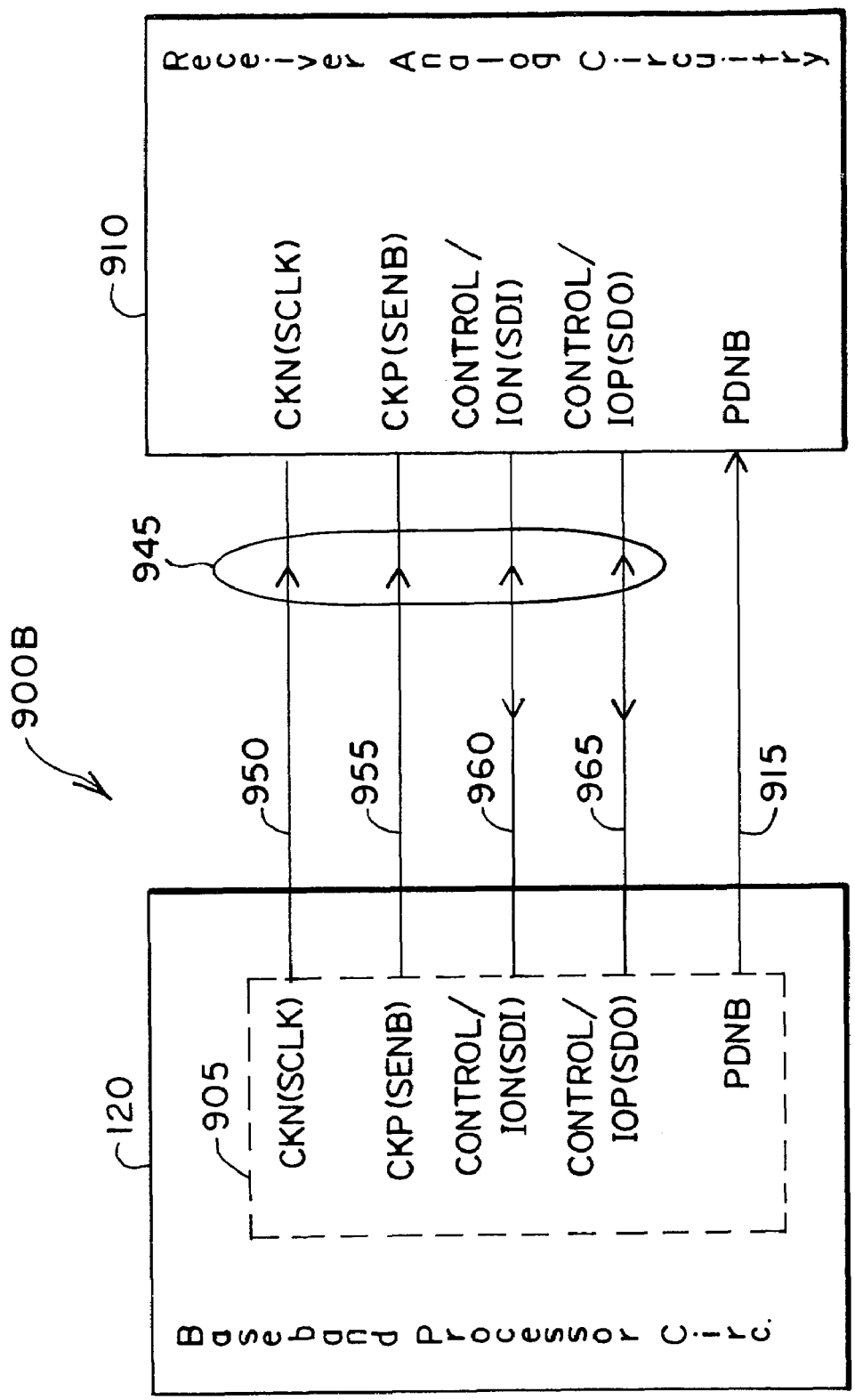
FIG. 9B depicts a block diagram of another embodiment of the interface between the baseband processor circuitry and the receiver analog circuitry in an RF transceiver according to the invention, in which the receiver digital circuitry resides within the baseband processor circuitry.

FIG. 9B shows an embodiment 900B that includes a configurable interface according to the invention. Here, the baseband processor circuitry 120 subsumes the functionality of the receiver digital circuitry 905. The baseband processor circuitry 120 realizes the functionality of the receiver digital circuitry 905, using hardware, software, or both, as desired. Because the baseband processor circuitry 120 has subsumed the receiver digital circuitry 905, the baseband processor circuitry 120 may communicate with the receiver analog circuitry 910 using configurable interface signal lines 945, depending on the state of the control signal 915 (e.g., the PDNB signal). The configurable interface signal lines 945 perform the same functions described above in connection with FIG. 9A, depending on the state of the control signal 915. As noted above, one may reconfigure the interface signal lines 960 and 965 during transmit mode to implement desired functionality, for example, logic signals.

Figure 10:
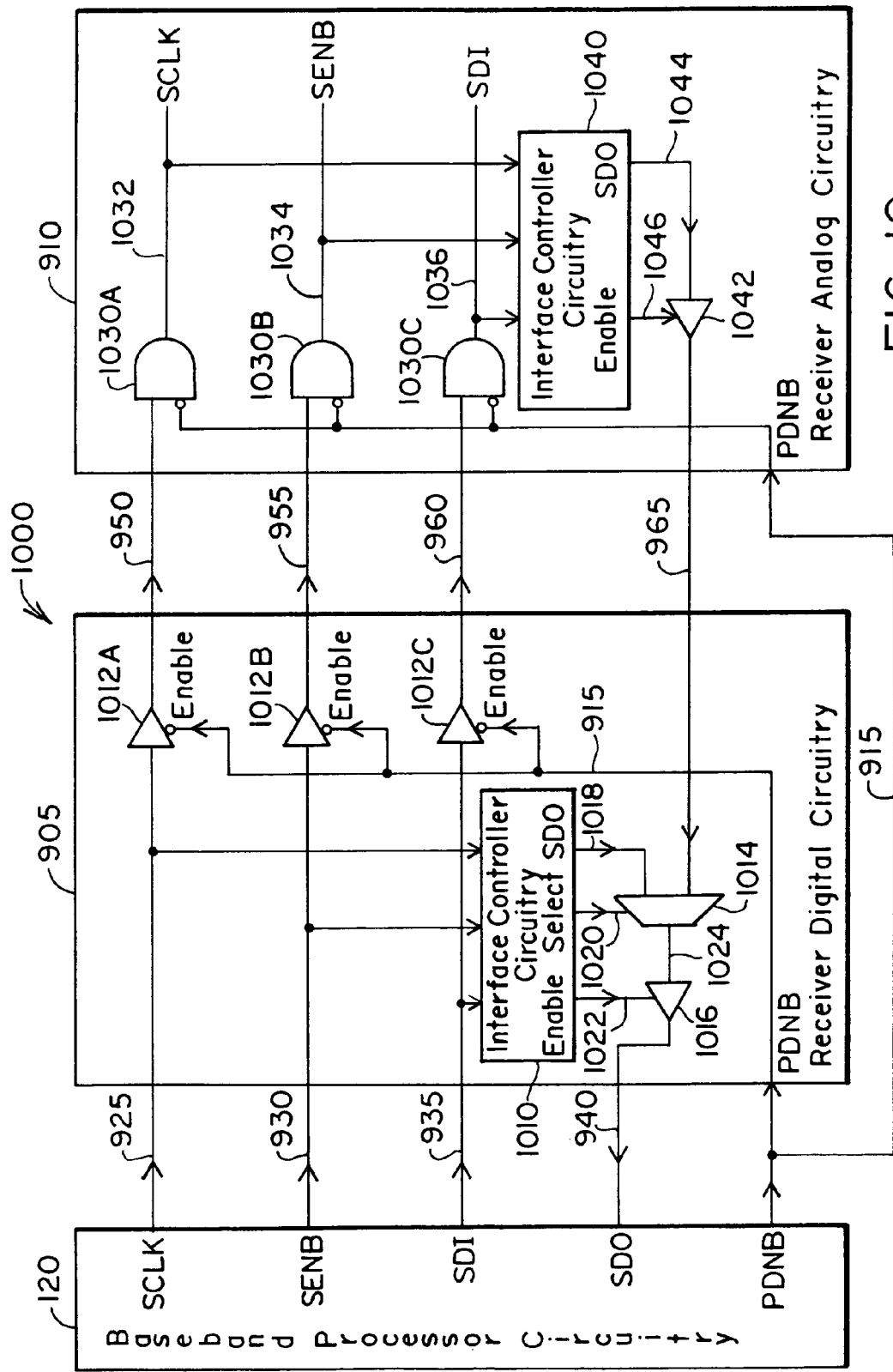
FIG. 10 illustrates a more detailed block diagram of the interface between the receiver analog circuitry and the receiver digital circuitry, with the interface configured as a serial interface.

FIG. 10 shows a conceptual block diagram of an embodiment 1000 of a configurable interface according to the invention within an RF transceiver in the power-down or serial interface mode (i.e., the control signal 915 is in a logic-low state). A logic low state on the control signal 915 enables the driver circuitry 1012A, 1012B, and 1012C, thus providing the configurable serial interface signal lines 950, 955, and 960 to the receiver analog circuitry 910. Similarly, the logic low state on the control signal 915 causes the AND gates 1030A, 1030B, and 1030C to provide configurable interface signal lines 950, 955, and 960 to other circuitry within the receiver analog circuitry 910. The outputs of the AND gates 1030A, 1030B, and 1030C comprise a gated SCLK signal 1032, a gated SENB signal 1034, and a gated SDI signal 1036, respectively.

Interface controller circuitry 1040 accepts as inputs the gated SCLK signal 1032, the gated SENB signal 1034, and the gated SDI signal 1036. The interface controller circuitry 1040 resides within the receiver analog circuitry 910 and produces a receiver analog circuitry SDO signal 1044 and an enable signal 1046. By controlling tri-state driver circuitry 1042, the enable signal 1046 controls the provision of the receiver analog circuitry SDO signal 1044 to the receiver digital circuitry 905 via the configurable interface signal line 965.

Interface controller circuitry 1010 within the receiver digital circuitry 905 accepts the SCLK signal 925, the SENB signal 930, and the SDI signal 935 from the baseband processor circuitry 120. By decoding those signals, the interface controller circuitry 1010 determines whether the baseband processor circuitry 120 intends to communicate with the receiver digital circuitry 905 (e.g., the baseband processor circuitry 120 attempts to read a status or control register present on the receiver digital circuitry 905). If so, the interface controller circuitry 1010 provides the SCLK signal 925, the SENB signal 930, and the SDI signal 935 to other circuitry (not shown explicitly) within the receiver digital circuitry 905 for further processing.

Interface controller circuitry 1010 provides as output signals a receiver digital circuitry SDO signal 1018, a select signal 1020, and an enable signal 1022. The receiver digital circuitry SDO signal 1018 represents the serial data-out signal for the receiver digital circuitry 905, i.e., the serial data-out signal that the receiver digital circuitry 905 seeks to provide to the baseband processor circuitry 120. The interface controller circuitry 1010 supplies the select signal 1020 to multiplexer circuitry 1014. The multiplexer circuitry 1014 uses that signal to selectively provide as the multiplexer circuitry output signal 1024 either the receiver digital circuitry SDO signal 1018 or the receiver analog circuitry SDO signal 1044, which it receives through configurable interface signal line 965. Tri-state driver circuitry 1016 provides the multiplexer circuitry output signal 1024 to the baseband processor circuitry 120 under the control of the enable signal 1022.

Tri-state driver circuitry 1012A, 1012B, and 1012C use an inverted version of the control signal 915 as their enable signals. Thus, a logic high value on the control signal 915 disables the driver circuitry 1012A, 1012B, and 1012C, thus disabling the serial interface between the receiver digital circuitry 905 and the receiver analog circuitry 910. Similarly, AND gates 1030A, 1030B, and 1030C use an inverted version of the control signal 915 to gate interface signal lines 950, 955, and 960. In other words, a logic high value on the control signal 915 inhibits logic switching at the outputs of AND gates 1030A, 1030B, and 1030C, which reside on the receiver analog circuitry 910.

Figure 11A:
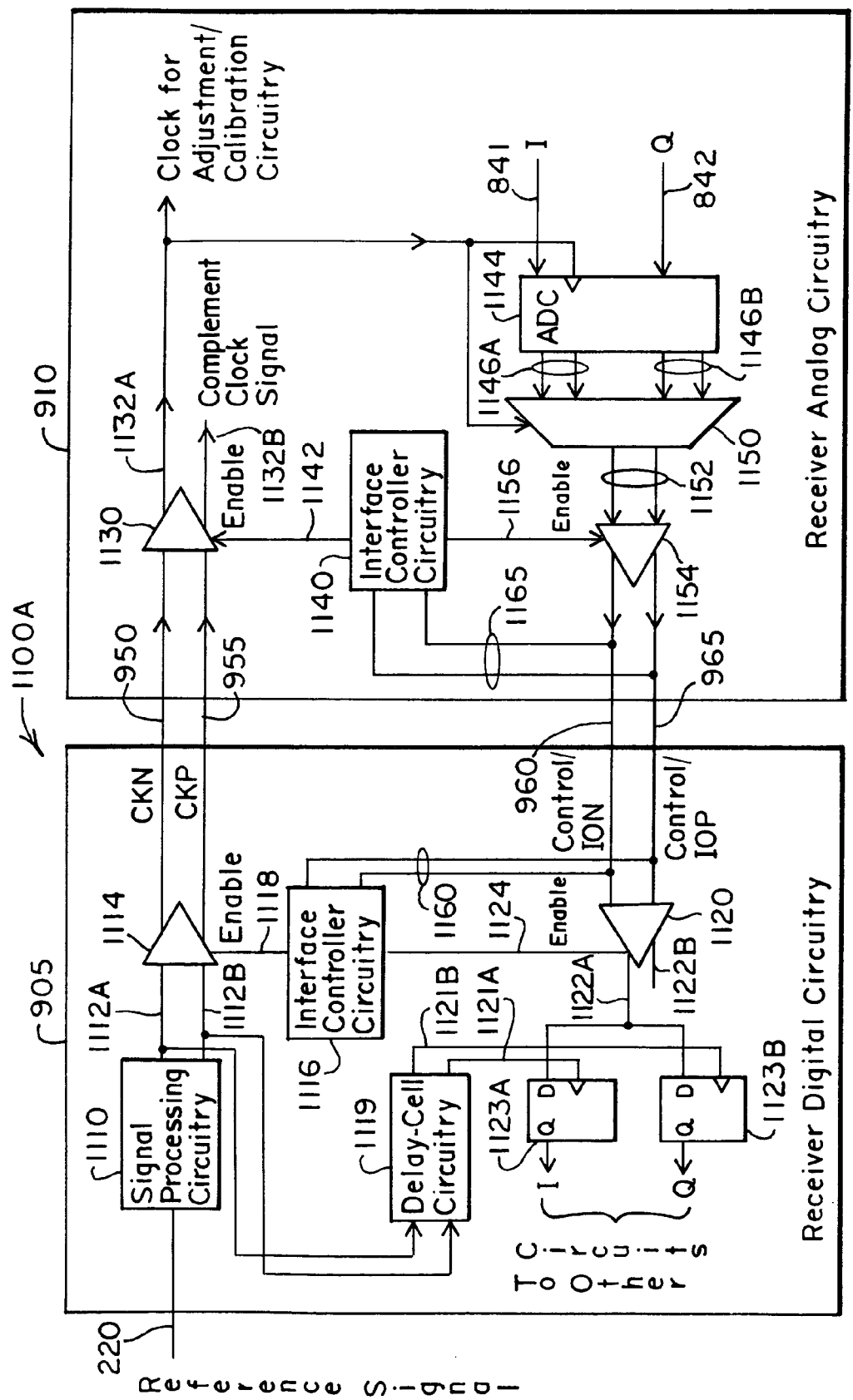
FIG. 11A shows a more detailed block diagram of an embodiment of the interface between the receiver analog circuitry and the receiver digital circuitry, with the interface configured as a data and clock signal interface.

FIG. 11A shows a conceptual block diagram of an embodiment 1100A of a configurable interface according to the invention, in an RF transceiver operating in the normal receive mode of operation (i.e., the control signal 915 is in a logic-high state). As noted above, in this mode, the receiver digital circuitry 905 provides a clock signal to the receiver analog circuitry 910 through the configurable interface signal lines 950 and 955. Configurable interface signal line 950 provides the CKN signal, whereas configurable interface signal line 955 supplies the CKP signal. Also in this mode, the receiver analog circuitry 910 provides a data signal to the receiver digital circuitry 905 through the configurable interface signal lines 960 and 965.

The receiver digital circuitry 905 provides the CKN and CKP signals to the receiver analog circuitry 910 by using clock driver circuitry 1114. The clock driver circuitry 1114 receives a clock signal 1112A and a complement clock signal 1112B from signal processing circuitry 1110. Signal processing circuitry 1110 receives the reference signal 220 and converts it to the clock signal 1112A and complement clock signal 1112B. Interface controller circuitry 1116 provides an enable signal 1118 that controls the provision of the CKN and CKP clock signals to the receiver analog circuitry 910 via the interface signal lines 950 and 955, respectively.

Receiver analog circuitry 910 includes clock receiver circuitry 1130 that receives the CKN and CKP clock signals and provides a clock signal 1132A and a complement clock signal 1132B. Interface controller circuitry 1140 within the receiver analog circuitry 910 provides an enable signal 1142 that controls the operation of the clock receiver circuitry 1130.

The clock signal 1132A clocks the ADC circuitry 1144, or other circuitry (for example, calibration circuitry), or both, as desired. Note that, rather than using the clock signal 1132A, one may use the complement clock signal 1132B, or both the clock signal 1132A and the complement clock signal 1132B, by making circuit modifications as persons skilled who have the benefit of the description of the invention understand. The ADC circuitry 1144 provides to multiplexer circuitry 1150 a one-bit differential in-phase digital signal 1146A and a one-bit differential quadrature digital signal 1146B. The multiplexer circuitry 1150 provides a one-bit differential digital output signal 1152 to data driver circuitry 1154. The output signal 1152 therefore constitutes multiplexed I-channel data and Q-channel data. The data driver circuitry 1154 supplies the differential data signal comprising ION and IOP to the receiver digital circuitry 905, using the configurable interface signal lines 960 and 965, respectively.

The clock signal 1132A also acts as the select signal of multiplexer circuitry 1150. On alternating edges of the clock signal 1132A, the multiplexer circuitry 1150 selects, and provides to, the data driver circuitry 1154 the one-bit differential in-phase digital signal 1146A (i.e., I-channel data) and the one-bit differential quadrature digital signal 1146B (i.e., Q-channel data). The interface controller circuitry 1140 supplies an enable signal 1156 to the data driver circuitry 1154 that controls the provision of the configurable interface signal 960 and the configurable interface signal 965 to the receiver digital circuitry 905 via the configurable interface signal lines 960 and 965.

The receiver digital circuitry 905 includes data receiver circuitry 1120. Data receiver circuitry 1120 accepts from the receiver analog circuitry 910 the signals provided via the configurable interface signal lines 960 and 965. The data receiver circuitry 1120 provides a pair of outputs 1122A and 1122B. An enable signal 1124, supplied by the interface controller circuitry 1116, controls the operation of the data receiver circuitry 1120.

The receiver digital circuitry 905 also includes a delay-cell circuitry 1119 that accepts as its inputs the clock signal 1112A and the complement clock signal 1112B. The delay-cell circuitry 1119 constitutes a delay-compensation circuit. In other words, ideally, the signal-propagation delay of the delay-cell circuitry 1119 compensates for the delays the signals experience as they propagate from the receiver digital circuitry 905 to the receiver analog circuitry 910, and back to the receiver digital circuitry 905.

The delay-cell circuitry 1119 provides as its outputs a clock signal 1121A and a complement clock signal 1121B. The clock signal 1121A and the complement clock signal 1121B clock a pair of D flip-flop circuitries 1123A and 1123B, respectively. The D flip-flop circuitries 1123A and 1123B latch the output 1122A of the data receiver circuitry 1120 alternately. In other words, the clock signal 1121A causes the latching of the I-channel data by the D flip-flop circuitry 1123A, whereas the complement clock signal 1121B causes the D flip-flop circuitry 1123B to latch the Q-channel data.

The output signals of the delay-cell circuitry 1119 help the receiver digital circuitry 905 to sample the I-channel data and the Q-channel data that it receives from the receiver analog circuitry 910. The receiver digital circuitry 905 receives multiplexed I-channel data and the Q-channel data through the ION signal 960 and the IOP signal 965. Thus, the D flip-flop circuitries 123A and 1123B perform a de-multiplexing function on the multiplexed I-channel data and Q-channel data.

In the normal receive or transmit modes, (i.e., the control signal 915 is in the logic-high state), interface signal line 950 provides the negative clock signal (CKN) and interface signal line 955 supplies the positive clock signal (CKP). In preferred embodiments of the invention, the CKN and CKP signals together form a differential clock signal that the receiver digital circuitry 905 provides to the receiver analog circuitry 910.

During the receive mode, interface signal line 960 provides the negative data signal (ION), whereas interface signal line 965 supplies the positive data signal (IOP). The ION and IOP signals preferably form a differential data signal.

In the transmit mode, the data signal may function as an input/output signal to communicate data, status, information, flag, and/or configuration signals between the receiver digital circuitry 905 and the receiver analog circuitry 910. Preferably, the interface signal lines 960 and 965 function as two logic signal lines in the transmit mode. As noted above, the transceiver disables the receiver circuitry during the transmit mode of operation. In RF transceivers partitioned according to the invention (see, e.g., FIGS. 2A–2D, 4, and 8), the clock receiver circuitry 1130 may provide the clock signal 1132A, the complement clock signal 1132B, or both, to transmitter circuitry (partitioned together with the receiver analog circuitry 910) for circuit calibration, circuit adjustment, and the like, as described above.

In the transmit mode, once circuit calibration and adjustment has concluded, however, the clock driver circuitry 1114 uses the enable signal 1118 to inhibit the propagation of the CKN and CKP clock signals to the receiver analog circuitry 910. In this manner, the clock driver circuitry 1114 performs the function of the switch 492 in FIGS. 4 and 8. Note that, during the normal transmit mode of operation, the ADC circuitry 1144 does not provide any data to the receiver digital circuitry 905 via the ION and IOP signals because, according to the TDD protocol, the receiver path circuitry is inactive during the normal transmit mode of operation. Instead, the receiver digital circuitry 905 provides control signals to the receiver analog circuitry 910 via interface signal lines 960 and 965.

During the transmit mode, the interface controller circuitry 1116 provides control signals via signal lines 1160 to the interface signal lines 960 and 965. The interface controller circuitry 1140 receives the control signals via signal lines 1165 and provides them to various blocks within the receiver analog circuitry, as desired. During the receive mode, the interface controller circuitry 1116 inhibits (e.g., high-impedance state) the signal lines 1160. Similarly, the interface controller circuitry 1140 inhibits the signal lines 1165 during the receive mode.

For the purpose of conceptual illustration, FIG. 11A shows the interface controller circuitry 1116 and the interface controller circuitry 1140 as two blocks of circuitry distinct from the interface controller circuitry 1010 and the interface controller circuitry 1040 in FIG. 10, respectively. One may combine the functionality of the interface controller circuitry 1116 with the functionality of the interface controller circuitry 1010, as desired. Likewise, one may combine the functionality of interface controller circuitry 1140 with the functionality of the interface controller circuitry 1040, as desired. Moreover, one may combine the functionality of the signal processing circuitries 1110 with the functionality of the interface controller circuitry 1116 and the interface controller circuitry 1140, respectively. Combining the functionality of those circuits depends on various design and implementation choices, as persons skilled in the art understand.

Figure 11B:
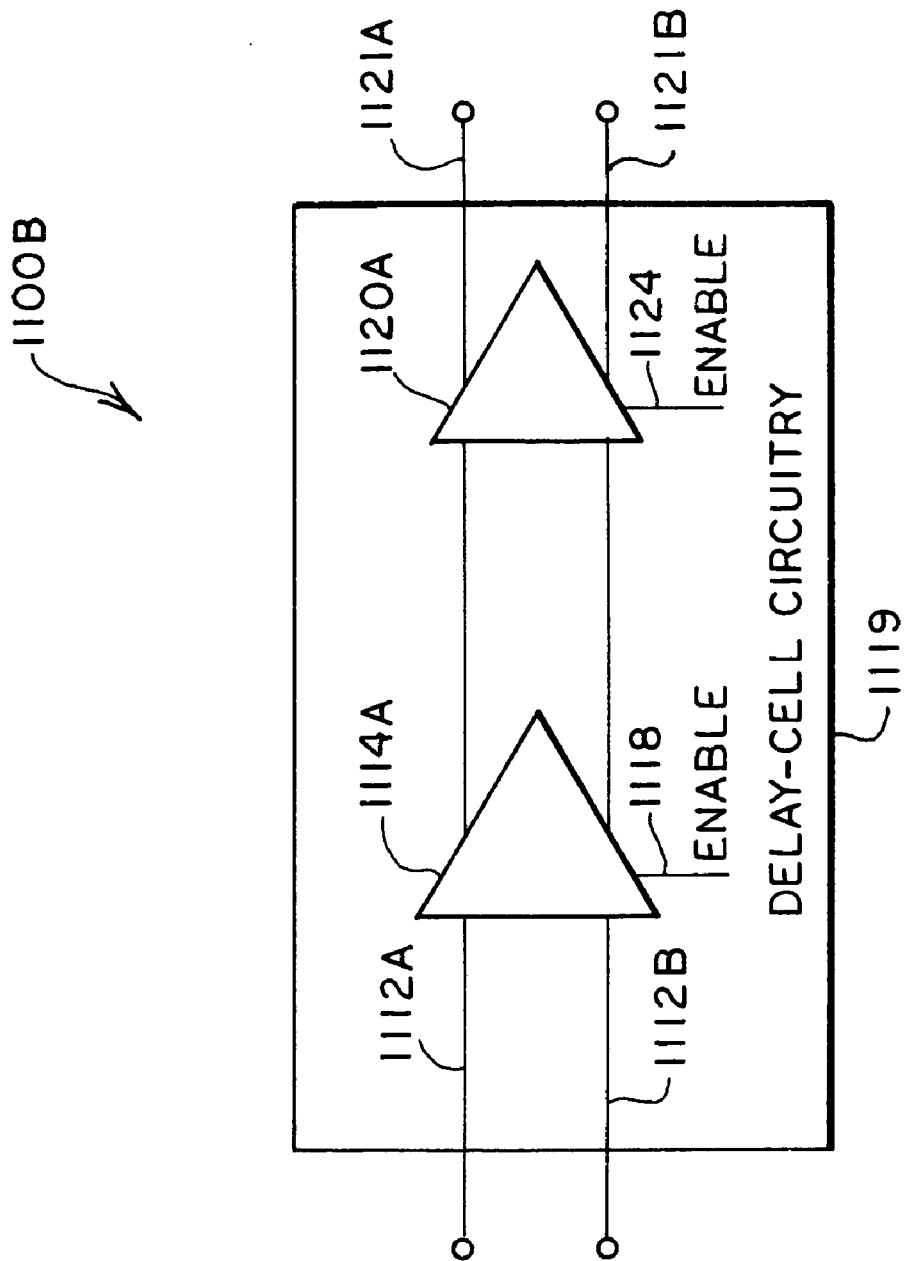
FIG. 11B illustrates a block diagram of an embodiment of a delay-cell circuitry that includes a clock driver circuitry in tandem with a clock receiver circuitry.

FIG. 11B illustrates a block diagram of a preferred embodiment 1100B of a delay-cell circuitry 1119 according to the invention. The delay-cell circuitry 1119 includes a replica of the clock driver circuitry 1114A in tandem with a replica of the data receiver circuitry 1120A. In other words, the block labeled "1114A" is a replica of the clock driver circuitry 1114, and the block labeled "1120A" is a replica of the data receiver circuitry 1120. (Note that the delay-cell circuitry 1119 may alternatively include a replica of the data driver circuitry 1154 in tandem with a replica of the clock receiver circuitry 1130.) The replica of the clock driver circuitry 1114A accepts the clock signal 1112A and the complement clock signal 1112B. The replica of the clock driver circuitry 1114A provides its outputs to the replica of the data receiver circuitry 1120A. The replica of the data receiver circuitry 1120A supplies the clock signal 1121A and the complement clock signal 1121B. The clock signal 1121A and the complement clock signal 1121B constitute the output signals of the delay-cell circuitry 1119. The delay-cell circuitry 1119 also receives as inputs enable signals 1118 and 1124 (note that FIG. 11A does not show those input signals for the sake of clarity). The enable signal 1118 couples to the replica of the clock driver circuitry 1114A, whereas the enable signal 1124 couples to the replica of the data receiver circuitry 1120A.

Note that FIG. 11B constitutes a conceptual block diagram of the delay-cell circuitry 1119. Rather than using distinct blocks 1114A and 1120A, one may alternatively use a single block that combines the functionality of those two blocks, as desired. Moreover, one may use a circuit that provides an adjustable, rather than fixed, delay, as desired. Note also that the embodiment 1100B of the delay-cell circuitry 1119 preferably compensates for the delay in the clock driver circuitry 1114 in FIG. 11A. In other words, the delay-cell circuitry 1119 preferably compensates sufficiently for the round-trip delay in the signals that travel from the receiver digital circuitry 905 to the receiver analog circuitry 910 and back to the receiver digital circuitry 905 to allow for accurate sampling in the receiver digital circuitry of the I-channel data and the Q-channel data. Note that in the embodiment 1100B, the replica of the clock driver circuitry 1114A mainly compensates for the round-trip delay, whereas the replica of the data receiver circuitry 1120A converts low-swing signals at the output of the replica of the clock driver circuitry 1114A into full-swing signals.

The receiver digital circuitry 905 and the receiver analog circuitry 910 preferably reside within separate integrated-circuit devices. Because those integrated-circuit devices typically result from separate semiconductor fabrication processes and manufacturing lines, their process parameters may not match closely. As a result, the preferred embodiment 1100B of the delay-cell circuitry 1119 does not compensate for the delay in the clock receiver circuitry 1130, the data driver circuitry 1154, and the data receiver circuitry 1120 in FIG. 11A.

Note, however, that if desired, the delay-cell circuitry 1119 may also compensate for the signal delays of the clock receiver circuitry 1130, the data driver circuitry 1154, and the data receiver circuitry 1120. Thus, in situations where one may match the process parameters of the receiver digital circuitry 905 and the receiver analog circuitry 910 relatively closely (for example, by using thick-film modules, silicon-on-insulator, etc.), the delay-cell circuitry 1119 may also compensate for the delays of other circuit blocks. As another alternative, one may use a delay-cell circuitry 1119 that provides an adjustable delay and then program the delay based on the delays in the receiver digital circuitry 905 and the receiver analog circuitry 910 (e.g., provide a matched set of receiver digital circuitry 905 and receiver analog circuitry 910), as persons skilled in the art who have the benefit of the description of the invention understand. Furthermore, rather than an open-loop arrangement, one may use a closed-loop feedback circuit implementation (e.g., by using a phase-locked loop circuitry) to control and compensate for the delay between the receiver analog circuitry 910 and the receiver digital circuitry 905, as desired.

Note that the digital circuit blocks shown in FIGS. 11A and 11B depict mainly the conceptual functions and signal flow. The actual circuit implementation may or may not contain separately identifiable hardware for the various functional blocks. For example, one may combine the functionality of various circuit blocks into one circuit block, as desired.

Figure 12:
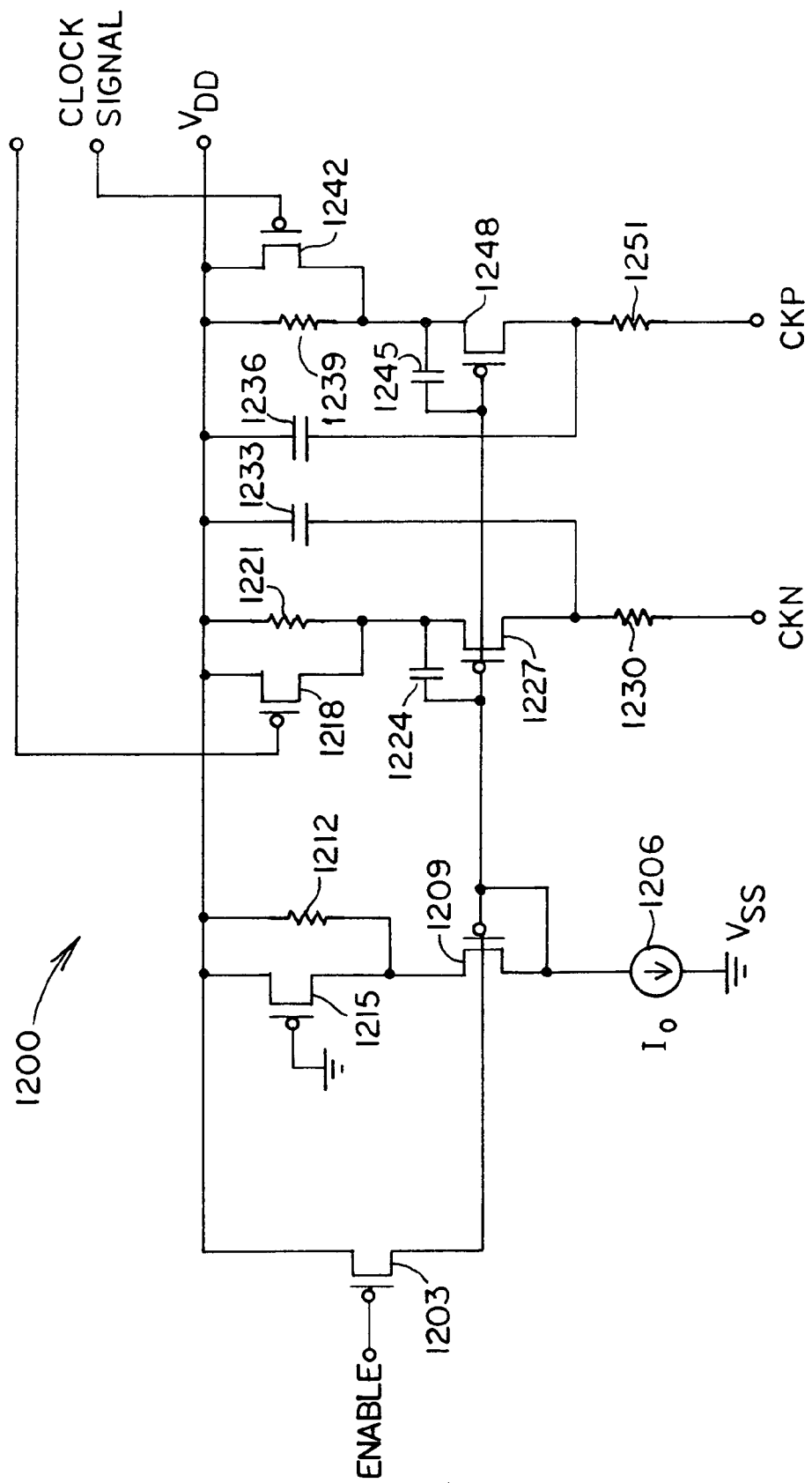
FIG. 12 depicts a schematic diagram of an embodiment of a signal-driver circuitry used to interface the receiver analog circuitry and the receiver digital circuitry according to the invention.

FIG. 12 shows a schematic diagram of a preferred embodiment 1200 of a signal-driver circuitry according to the invention. One may use the signal-driver circuitry as the clock driver circuitry 1114 and the data driver circuitry 1154 in FIG. 11A. In the latter case, the input signals to the signal-driver circuitry constitute the output signals 1152 and the enable signal 1156, whereas the output signals of the signal-receiver circuitry constitute the ION and IOP signals 960 and 965, respectively, in FIG. 11A.

The signal-driver circuitry in FIG. 12 constitutes two circuit legs. One circuit leg includes MOSFET devices 1218 and 1227 and resistor 1230. The second leg includes MOSFET devices 1242 and 1248 and resistor 1251. The input clock signal controls MOSFET devices 1218 and 1242. Current source 1206, MOSFET devices 1209 and 1215, and resistor 1212 provide biasing for the two circuit legs.

MOSFET devices 1227 and 1248 drive the CKN and CKP output terminals through resistors 1230 and 1251, respectively. Depending on the state of the clock signal, one leg of the signal-driver circuitry conducts more current than the other leg. Put another way, the signal-driver circuitry steers current from one leg to the other in response to the clock signal (i.e., in response to the clock signal, one leg of the circuit turns on and the other leg turns off, and vice-versa). As a result, the signal-driver circuitry provides a differential clock signal that includes current signals CKN and CKP.

If the enable signal is high, MOSFET device 1203 is off and therefore does not affect the operation of the rest of the circuit. In that case, a current $I_o$ flows through the current source 1206 and diode-connected MOSFET device 1209. The flow of current generates a voltage at the gate of MOSFET device 1209. MOSFET devices 1227 and 1248 share the same gate connection with MOSFET device 1209. Thus, MOSFET devices 1227 and 1248 have the same gate-source voltage, $V_{gs}$, as MOSFET device 1209 when the appropriate MOSFET devices are in the on state. MOSFET devices 1218 and 1242 cause current steering between the first and second circuit legs. Only one of the MOSFET devices 1218 and 1242 is in the on state during the operation of the circuit. Depending on which MOSFET device is in the on state, the mirroring current $I_O$ flows through the circuit leg that includes the device in the on state.

Resistors 1221 and 1239 provide a small trickle current to the circuit leg that includes the MOSFET device (i.e., MOSFET device 1218 or MOSFET device 1242) that is in the off state. The small trickle current prevents the diode-connected MOSFET devices in the signal receiver circuitry (see FIG. 13) from turning off completely. The trickle current helps to reduce the delay in changing the state of the circuit in response to transitions in the input clock signal. The trickle currents also help to reduce transient signals at the CKP and CKN terminals and, thus, reduce interference effects.

Capacitors 1224 and 1245 provide filtering so that when MOSFET device 1218 and MOSFET device 1242 switch states, the currents through the first and second circuit legs (CKN and CKP circuit legs) do not change rapidly. Thus, capacitors 1224 and 1245 reduce the high-frequency content in the currents flowing through the circuit legs into the CKN and CKP terminals. The reduced high-frequency (i.e., band-limited) content of the currents flowing through the CKN and CKP terminals helps reduce interference effects to other parts of the circuit, for example, the LNA circuitries, as described above. Capacitors 1233 and 1236 and resistors 1230 and 1251 help to further reduce the high-frequency content of the currents flowing through the CKN and CKP terminals. Thus, the circuit in FIG. 12 provides smooth steering of current between the two circuit legs and therefore reduces interference effects with other circuitry.

When the enable signal goes to the low state, MOSFET device 1203 turns on and causes MOSFET device 1209 to turn off. MOSFET devices 1227 and 1248 also turn off, and the circuit becomes disabled. Note that the enable signal may be derived from the power-down PDNB signal.

Figure 13A:
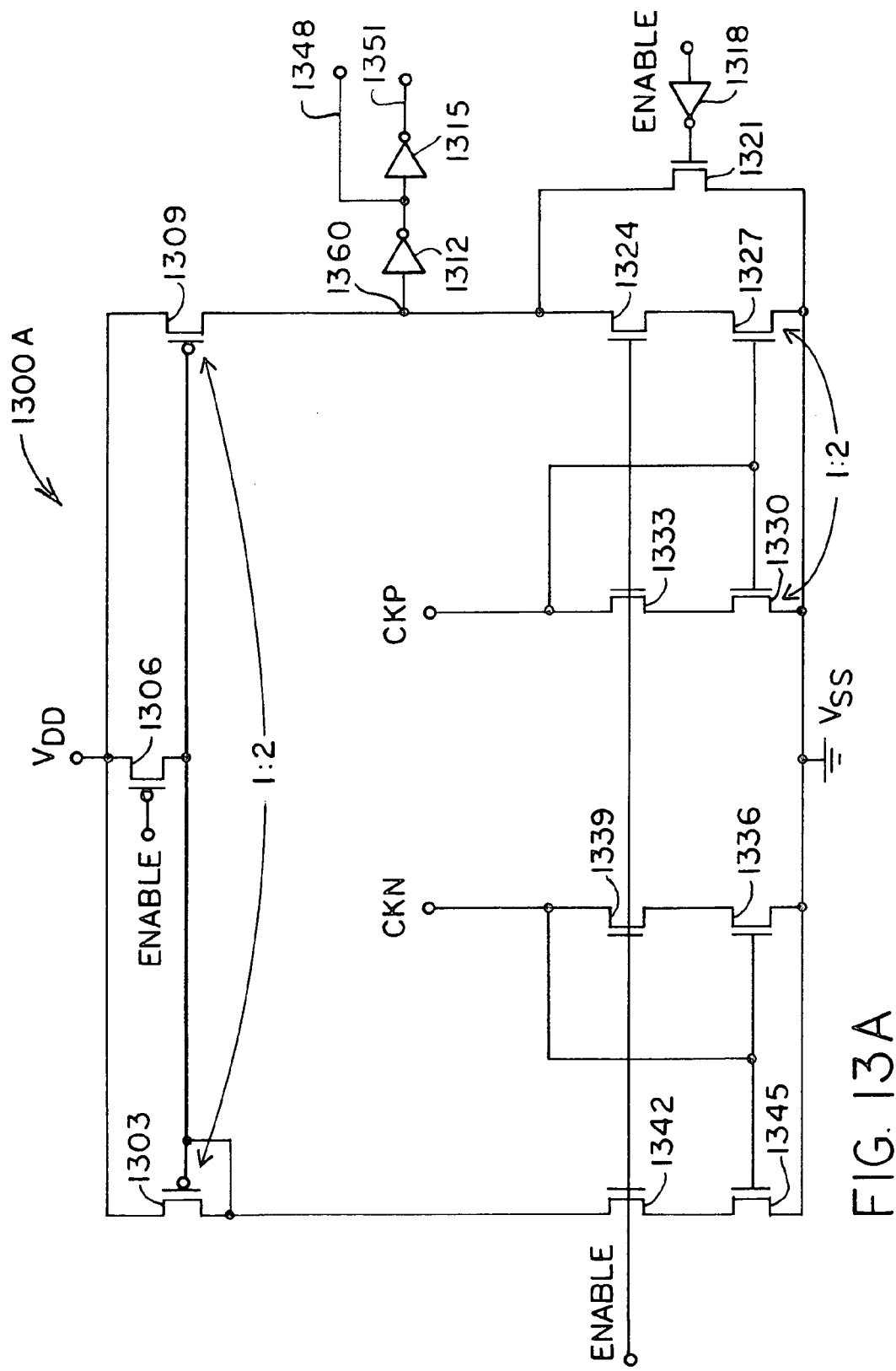
FIGS. 13A and 13B illustrate schematic diagrams of embodiments of signal-receiver circuitries used to interface the receiver analog circuitry and the receiver digital circuitry according to the invention.

FIG. 13A shows a schematic diagram of an exemplary embodiment 1300A of a signal-receiver circuitry according to the invention. One may use the signal-receiver circuitry as the clock receiver circuitry 1130 and the data receiver circuitry 1120 in FIG. 11A. In the latter case, the input signals to the signal-receiver circuitry constitute the ION and IOP signals 960 and 965 and the enable signal 1124, whereas the output signals constitute the signals at the outputs 1122A and 1122B, respectively, in FIG. 11A.

The signal receiver circuitry in FIG. 13A helps to convert differential input currents into CMOS logic signals. The signal-receiver circuitry in FIG. 13A constitutes two circuit legs. The first circuit leg includes MOSFET devices 1303, 1342, and 1345. The second leg includes MOSFET devices 1309, 1324, and 1327. Note that, preferably, the scaling of MOSFET devices 1303 and 1309 provides a current gain of 1:2 between them. Likewise, the scaling of MOSFET devices 1330 and 1327 preferably provides a current gain of 1:2 between them. The current gains help to reduce phase noise in the signal-receiver circuitry.

MOSFET devices 1339, 1342, 1333, and 1324 provide enable capability for the circuit. When the enable input is in the high state, MOSFET devices 1339, 1342, 1333, and 1324 are in the on state. MOSFET devices 1345 and 1336 are current mirrors, as are MOSFET devices 1303 and 1309. MOSFET devices 1330 and 1327 also constitute current mirrors.

The currents flowing through the CKN and CKP terminals mirror to the MOSFET devices 1327 and 1309. The actual current flowing through the second circuit leg depends on the currents that MOSFET device 1327 and MOSFET device 1309 try to conduct; the lower of the two currents determines the actual current that flows through the second circuit leg.

The difference between the currents that MOSFET device 1327 and MOSFET device 1309 try to conduct flows through the parasitic capacitance at node 1360. The current flow charges or discharges the capacitance at node 1360, thus making smaller the drain-source voltage ($V_{ds}$) of whichever of MOSFET devices 1327 and 1309 that seeks to carry the higher current. Ultimately, the lower of the currents that MOSFET devices 1327 and 1309 seek to conduct determines the current through the second leg of the circuit.

A pair of inverters 1312 and 1315 provide true and complement output signals 1351 and 1348, respectively. The signal receiver circuitry therefore converts differential input currents into CMOS logic output signals.

Figure 13B:
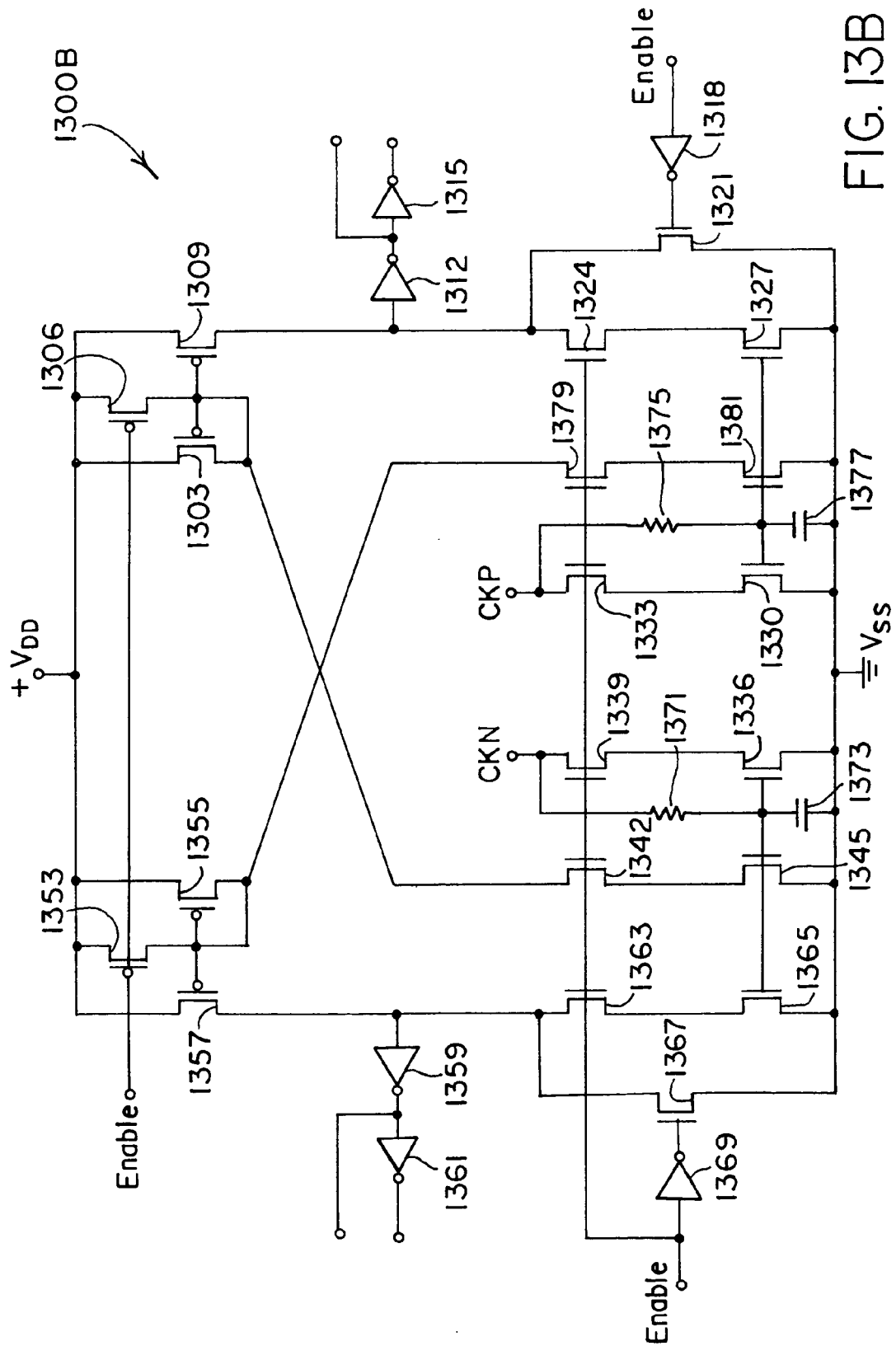

In exemplary embodiments of the invention, the signal receiver circuitry provides fully differential output signals. FIG. 13B shows an embodiment 1300B of such a signal receiver circuitry. One may use embodiment 1300B in a similar manner and application as embodiment 1300A, using the same input signals, as desired. Unlike embodiment 1300A, however, embodiment 1300B includes fully differential circuitry to generate fully differential output signals.

Embodiment 1300B includes the same devices as does embodiment 1300A, and the common devices operate in a similar manner. Furthermore, embodiment 1300B includes additional devices and components. Embodiment 1300B constitutes two circuit legs and replica of those circuit legs. The first circuit leg includes MOSFET devices 1303, 1342, and 1345. The replica of the first circuit leg includes devices 1355, 1379, and 1381. The second circuit leg includes MOSFET devices 1309, 1324, and 1327. The replica of the second circuit leg include devices 1357, 1363, and 1365. The scaling of MOSFET devices 1303 and 1309 provides a current gain of 1:2 between them, as does the scaling of MOSFET devices 1330 and 1327. Likewise, scaling of MOSFET devices 1355 and 1357 provides a current gain of 1:2 between them, as does the scaling of MOSFET devices 1336 and 1365. The current gains help to reduce phase noise in the signal-receiver circuitry.

Embodiment 1300B generally operates similarly to embodiment 1300A. Devices 1381, 1379, 1355, 1353, 1357, 1363, 1365, 1367, 1369, 1359, and 1361 perform the same functions as do devices 1345, 1342, 1303, 1306, 1309, 1324, 1327, 1321, 1318, 1312, and 1315, respectively. The enable function also operates similarly to embodiment 1300A. Resistors 1371 and 1375 and capacitors 1373 and 1377 filter the input clock (e.g., 13 MHz clock). Inverters 1312, 1315, 1361, and 1359 provide fully differential true and complement output signals.

Figure 14:
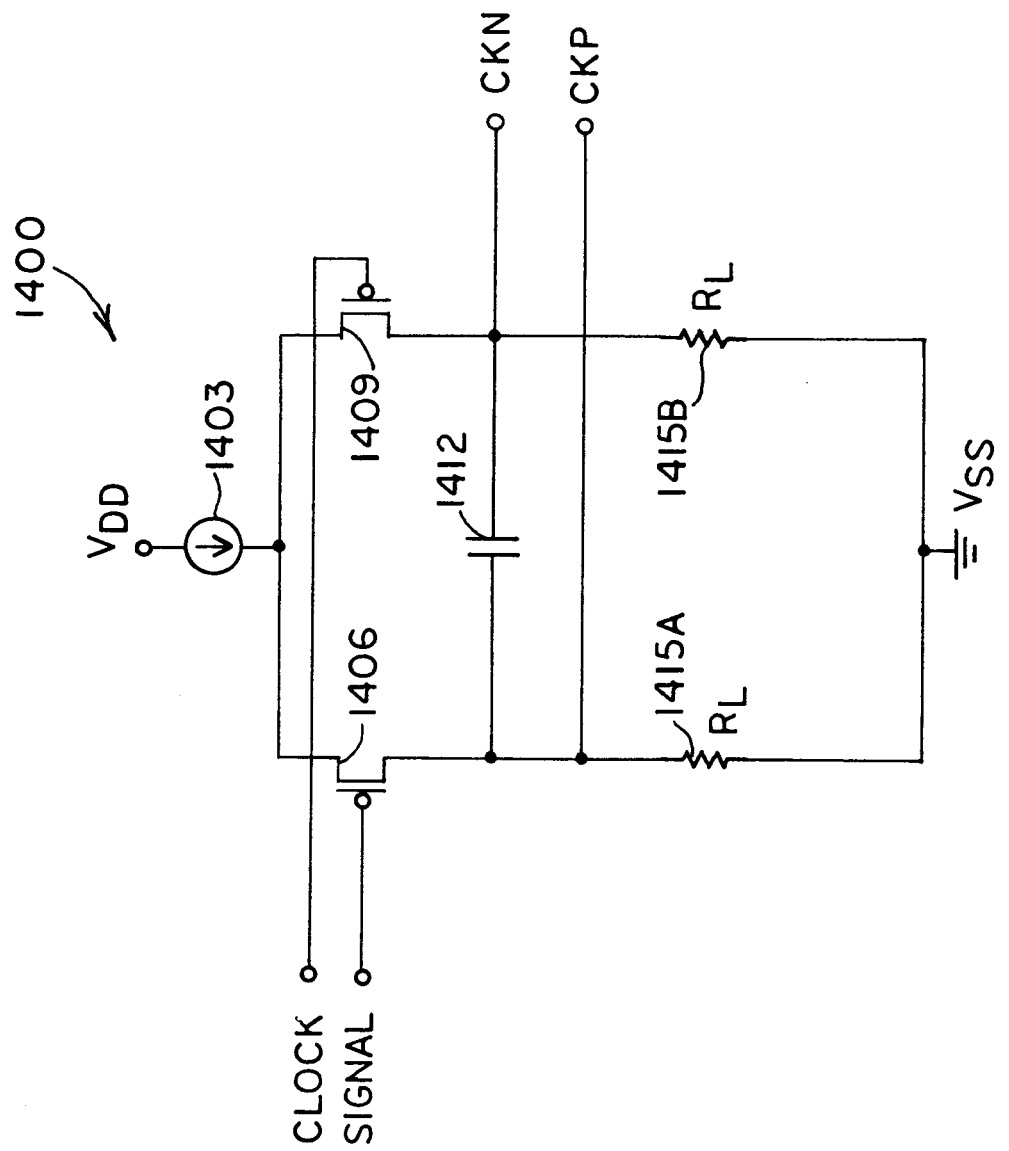
FIG. 14 shows a schematic diagram of another signal-driver circuitry that one may use to interface the receiver analog circuitry and the receiver digital circuitry according to the invention.

FIG. 14 shows an embodiment 1400 of an alternative signal-driver circuitry according to the invention. The signal-driver circuitry in FIG. 14 includes two circuit legs. The first circuit leg includes MOSFET device 1406 and resistor 1415A. The second circuit leg includes MOSFET device 1409 and resistor 1415B. A current source 1403 supplies current to the two circuit legs.

The input clock signal controls MOSFET devices 1406 and 1409. MOSFET devices 1406 and 1409 drive the CKP and CKN output terminals, respectively. Depending on the state of the clock signal, one leg of the signal-driver circuitry conducts current. Put another way, the signal-driver circuitry steers current from one leg to the other in response to the clock signal. As a result, the signal-driver circuitry provides a differential clock signal that includes signals CKN and CKP. Capacitor 1412 filters the output signals CKN and CKP. Put another way, capacitor 1412 provides band-limiting of the output signals CKN and CKP. Note that the current source 1403 supplies limited-amplitude signals by providing current through resistors 1415A and 1415B.

Note that the signal-driver circuitries (clock driver and data driver circuitries) according to the invention preferably provide current signals CKN and CKP. Similarly, signal-receiver circuitries (clock receiver and data receiver circuitries) according to the invention preferably receive current signals. As an alternative, one may use signal-driver circuitries that provide as their outputs voltage signals, as desired. One may also implement signal-receiver circuitries that receive voltage signals, rather than current signals. As noted above, depending on the application, one may limit the frequency contents of those voltage signals, for example, by filtering, as desired.

Generally, several techniques exist for limiting noise, for example, digital switching-noise, in the interface between the receiver analog circuitry and the receiver digital circuitry according to the invention. Those techniques include using differential signals, using band-limited signals, and using amplitude-limited signals. RF apparatus according to the invention may use any or all of those techniques, as desired. Furthermore, one may apply any or all of those techniques to interface circuitry that employs voltage or current signals, as persons of ordinary skill in the art who have the benefit of the description of the invention understand.

Note also that the RF transceiver embodiments according to the invention lend themselves to various choices of circuit implementation, as a person skilled in the art who have the benefit of the description of the invention understand. For example, as noted above, each of the circuit partitions, or circuit blocks, of RF transceivers partitioned according to the invention, resides preferably within an integrated circuit device. Persons skilled in the art, however, will appreciate that the circuit partitions, or circuit blocks, may alternatively reside within other substrates, carriers, or packaging arrangements. By way of illustration, other partitioning arrangements may use modules, thin-film modules, thick-film modules, isolated partitions on a single substrate, circuit-board partitions, and the like, as desired, consistent with the embodiments of the invention described here.

One aspect of the invention contemplates partitioning RF transceivers designed to operate within several communication channels (e.g., GSM, PCS, and DCS). Persons skilled in the art, however, will recognize that one may partition according to the invention RF transceivers designed to operate within one or more other channels, frequencies, or frequency bands, as desired.

Moreover, the partitioning of RF transceivers according to the invention preferably applies to RF apparatus (e.g., receivers or transceivers) with a low-IF, digital-IF architecture. Note, however, that one may apply the partitioning and interfacing concepts according to the invention to other RF receiver or transceiver architectures and configurations, as persons of ordinary skill in the art who have the benefit of the description of the invention understand. By way of illustration, one may use the partitioning and interface concepts according to the invention in RF apparatus that includes:

low-IF receiver circuitry;
  low-IF receiver circuitry and offset-PLL transmitter circuitry;
  low-IF receiver circuitry and direct up-conversion transmitter circuitry;
  direct-conversion receiver circuitry;
  direct-conversion receiver circuitry and offset-PLL transmitter circuitry; or
  direct-conversion receiver circuitry and direct up-conversion transmitter circuitry.

As an example of the flexibility of the partitioning concepts according to the invention, one may include the LO circuitry in one partition, the receiver digital circuitry in a second partition, and the transmitter up-converter circuitry and the receiver analog circuitry in a third partition. As another illustrative alternative, one may include the LO circuitry and the transmitter up-converter circuitry within one circuit partition, depending on the noise and interference characteristics and specifications for a particular implementation.

Note that, in a typical direct-conversion RF receiver or transceiver implementation, the receiver digital circuitry would not include the digital down-converter circuitry (the receiver analog circuitry, however, would be similar to the embodiments described above). Furthermore, in a typical direct up-conversion transmitter circuitry, one would remove the offset PLL circuitry and the transmit VCO circuitry from the transmitter circuitry. The LO circuitry would supply the RF LO signal to the up-conversion circuitry of the transmitter circuitry, rather than the offset-PLL circuitry. Also, in a direct up-conversion implementation, the LO circuitry typically does not provide an IF LO signal.

Furthermore, as noted above, one may use the partitioning and interface concepts according to the invention not only in RF transceivers, but also in RF receivers for high-performance applications. In such RF receivers, one may partition the receiver as shown in FIGS. 2A–2D and 4–8, and as described above. In other words, the RF receiver may have a first circuit partition that includes the receiver analog circuitry, and a second circuit partition that includes the receiver digital circuitry.

The RF receiver may also use the digital interface between the receiver analog circuitry and the receiver digital circuitry, as desired. By virtue of using the receiver analog circuitry and the receiver digital circuitry described above, the RF receiver features a low-IF, digital-IF architecture. In addition, as noted above with respect to RF transceivers according to the invention, depending on performance specifications and design goals, one may include all or part of the local oscillator circuitry within the circuit partition that includes the receiver analog circuitry, as desired. Partitioning RF receivers according to the invention tends to reduce the interference effects between the circuit partitions.

As noted above, although RF apparatus according to the invention use a serial interface between the receiver analog circuitry and the receiver digital circuitry, one may use other types of interface, for example, parallel interfaces, that incorporate different numbers of signal lines, different types and sizes of signals, or both, as desired. Moreover, the clock driver circuitries and the data driver circuitries may generally constitute signal-driver circuitries that one may use in a variety of digital interfaces between the receiver analog circuitry and the receiver digital circuitry according to the invention.

Likewise, the clock receiver circuitries and data receiver circuitries may generally constitute signal-receiver circuitries that one may use in a variety of digital interfaces between the receiver analog circuitry and the receiver digital circuitry according to the invention. In other words, one may use signal-driver circuitries and signal-receiver circuitries to implement a wide variety of digital interfaces, as persons of ordinary skill who have the benefit of the description of the invention understand.

Figure 15:
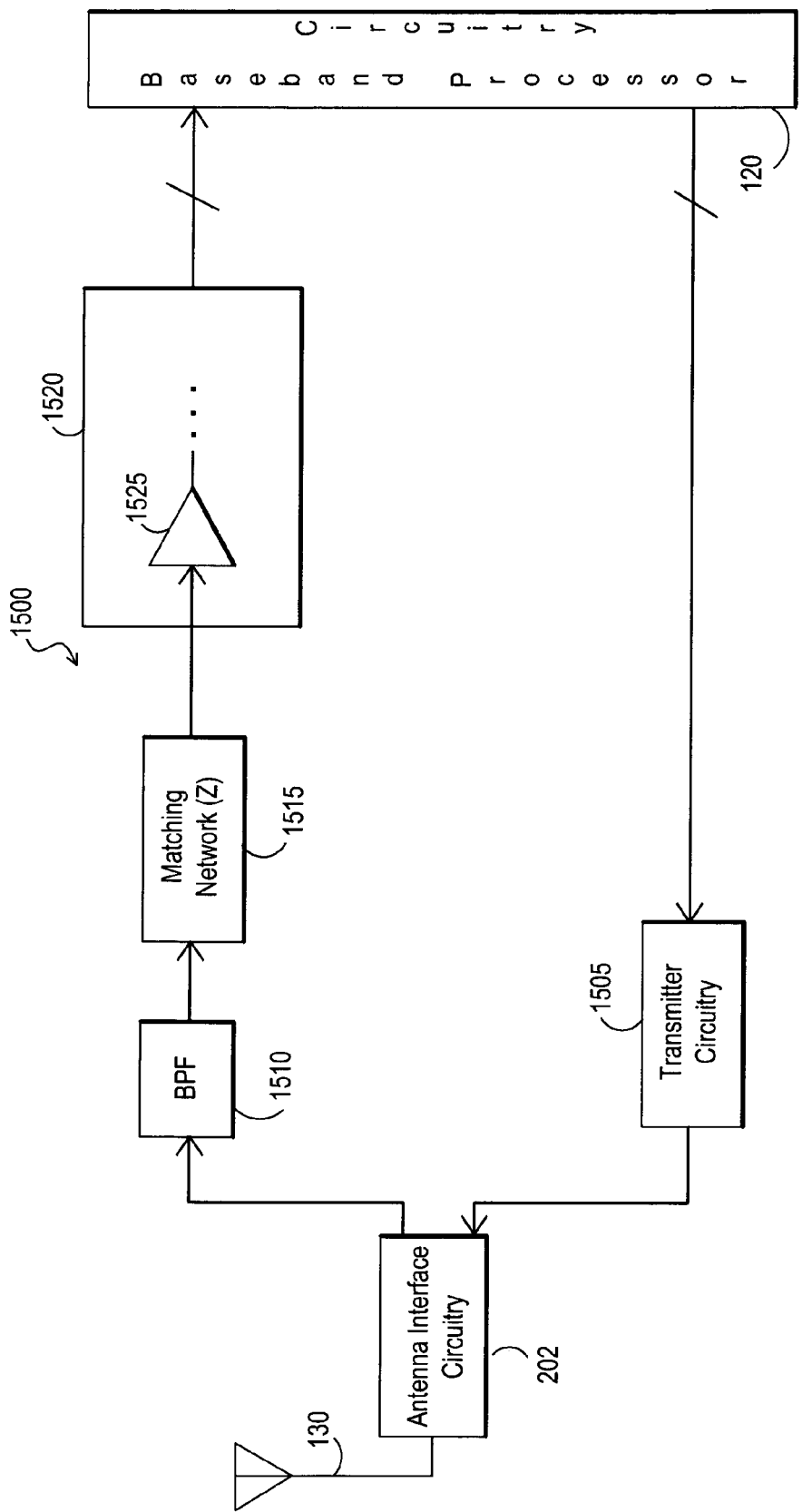
FIG. 15 depicts a block diagram of an exemplary embodiment of an RF transceiver according to the invention.

Another aspect of the invention relates to the front-end circuitry within the RF apparatus, such as shown in FIGS. 1–2, and 4–8. Referring, for example, to FIGS. 4–8, the front-end circuitry within the RF transceiver (or RF receivers or apparatus, generally) includes antenna interface circuitry and filter circuitry. FIG. 15 shows a block diagram of an embodiment 1500 of an RF transceiver according to the invention. Embodiment 1500 includes antenna 130, antenna interface 202, filter circuitry 1510 (BPF), matching network 1515, receiver circuitry 1520, baseband processor circuitry 120, and transmitter circuitry 1505.

The front-end circuitry in embodiment 1500 includes antenna interface circuitry 202, filter circuitry 1510, and matching network 1515 (Z). The front-end circuitry provides an interface between the antenna 130 and the receiver circuitry 1520. The front-end circuitry also interfaces transmitter circuitry 1505 to antenna 130. Matching network 1515 provides impedance matching between filter circuitry 1510 and LNA circuitry 1525 (or the input stage of receiver circuitry 1520) within receiver circuitry 1520 (or the input stage of receiver circuitry 1520 generally), as described below in detail.

Generally, the receiver circuitry 1520 and transmitter circuitry 1505 may constitute, respectively, any of the receiver and transmitter circuitries shown in the preceding figures and described above, as desired. Similarly, filter circuitry 1510 may constitute filter circuitry 403 in FIGS. 4–7 or filter circuitry 812 in FIG. 8, as desired. In exemplary embodiments, filter circuitry 1510 constitutes a band-pass filter that filters RF received by antenna 130 to attenuate undesired signals (i.e., signals outside a desired frequency band). Antenna 130, antenna interface circuitry 202, filter circuitry 1510, baseband processor circuitry 120, receiver circuitry 1520, and transmitter circuitry 1505 generally operate as described above in connection with other embodiments. Note that one may apply the partitioning concepts described above to embodiment 1500, as desired. Moreover, although FIG. 15 illustrates an RF transceiver, one may generally apply the inventive concepts described here to RF receivers as well.

Depending on design and performance specifications for a particular application, one may make a number of modifications or alterations to embodiment 1500, as desired. For example, one may include circuitry that provides multi-band operation by including multiple filter circuitries, matching networks, and LNA circuitries. One may also use a transmitter circuitry that has the capability of transmitting on multiple frequencies or within multiple frequency bands. Alternatively, one may use a plurality of transmitter circuitries that transmit on or within desired frequencies and frequency bands.

Figure 16:
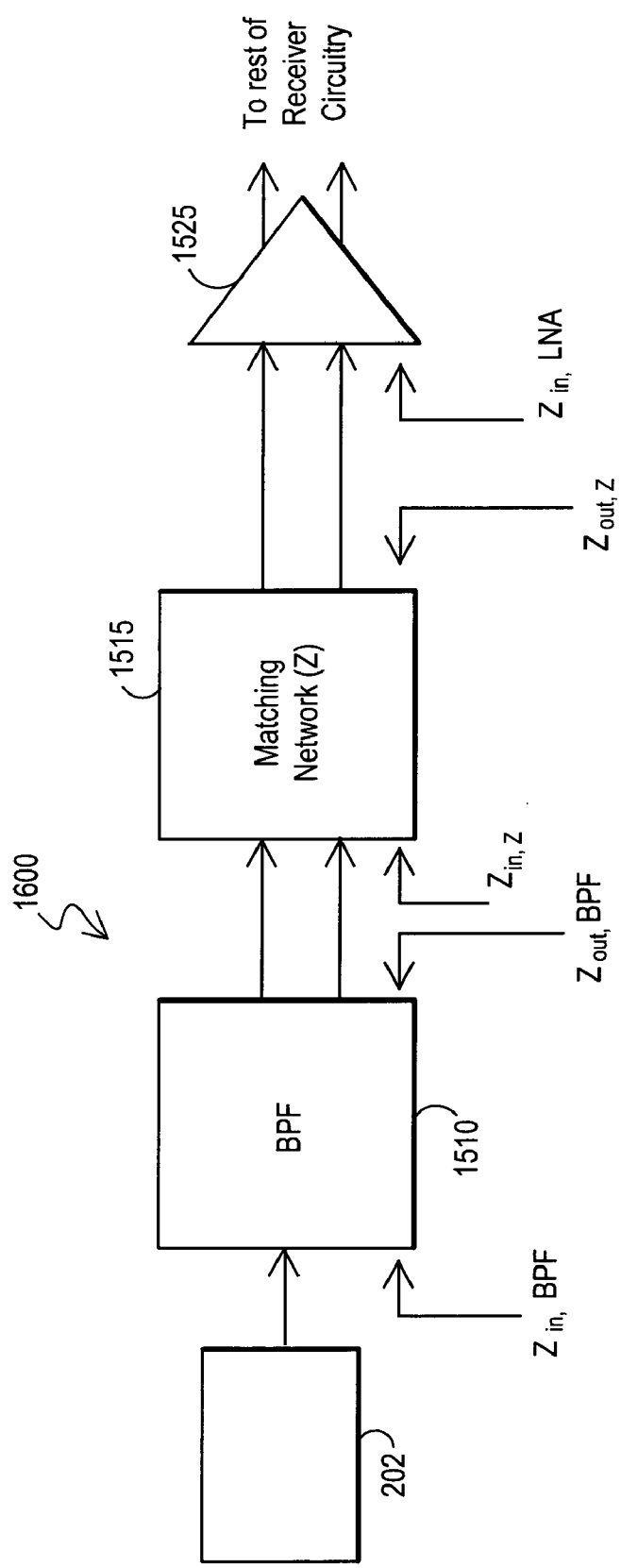
FIG. 16 illustrates an embodiment according to the invention that includes a filter circuitry with differential outputs.
Figure 17A:
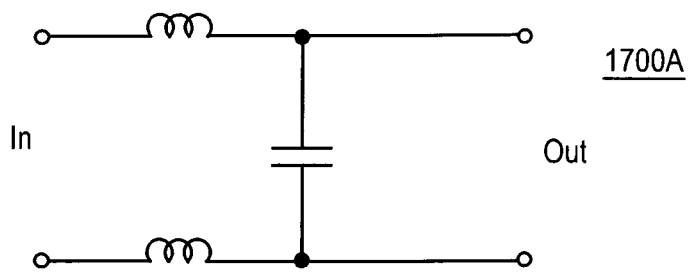
FIG. 17A shows a differential-L impedance transformation network for use in matching networks according to the invention.
Figure 17B:
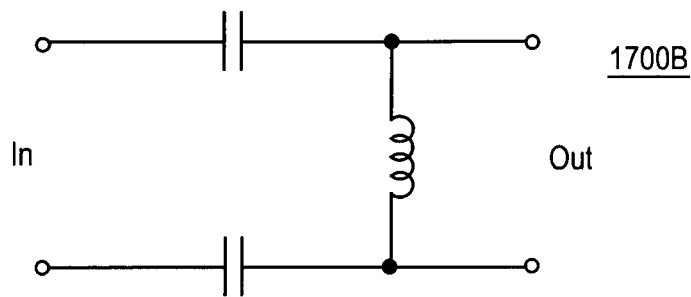
FIG. 17B illustrates a second differential-L impedance transformation network for use in matching networks according to the invention.
Figure 17C:
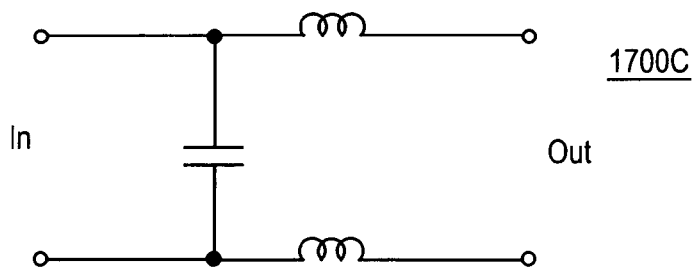
FIG. 17C depicts a third differential-L impedance transformation network for use in matching networks according to the invention.
Figure 17D:
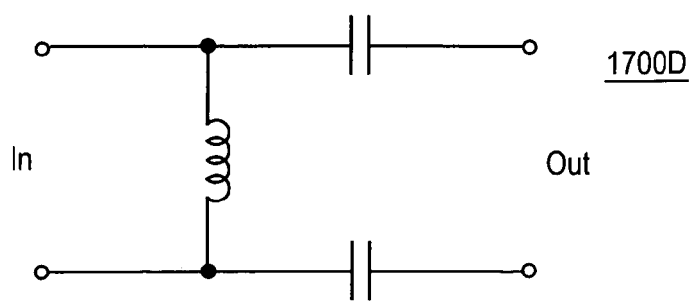
FIG. 17D shows a fourth differential-L impedance transformation network for use in matching networks according to the invention.

Furthermore, one or more of the filter circuitry 1510, the matching network 1515, LNA circuitry 1525 may have differential inputs and/or outputs, as desired. As one example, FIG. 16 shows an embodiment 1600 according to the invention that includes filter circuitry 1510. Filter circuitry 1510 has differential outputs, and may have single-ended or differential inputs, as desired. In addition, matching network 1515 has both differential inputs and outputs. Similarly, LNA circuitry 1525 includes differential inputs and outputs. Note that one may include in embodiments 1500 and 1600 one each of filter circuitry 1510, matching network 1515, and LNA circuitry 1525 for each band of operation (e.g., GSM, DCS, and PCS), as desired, similar to the tri-band transceiver shown in FIG. 8.

As noted above, matching network 1515 provides impedance matching between filter circuitry 1510 and LNA circuitry 1525. Generally speaking, the output impedance of filter circuitry 1510, $Z_{out,\ BPF}$, has a different magnitude than does the input impedance of LNA circuitry 1525, $Z_{in,\ LNA}$. Any mismatch between those two impedances has implications for the circuit's overall noise figure and for power and signal flow between filter circuitry 1510 and LNA circuitry 1525. Filter circuitry 1510, as mentioned above, rejects out-of-band interference (e.g., blockers). Typically the design of a particular filter circuitry 1510 contemplates impedance matching at both the input and output of filter circuitry 1510. In other words, a source with a specific impedance should drive filter circuitry 1510 and a load with a specific impedance should follow it.

Manufacturers or vendors of filter circuitry 1510 usually characterize it under matched impedance conditions (i.e., matched impedances at the input and output of filter circuitry 1510). The matched impedance conditions typically specify a conjugate-match. In other words, $$Z_S = Z_{in, BPF}^*,$$

and $$Z_L = Z_{out, BPF}^*,$$

where $Z_S$ and $Z_L$ represent the source and load impedances coupled to the input and output of filter circuitry 1510, respectively. The notation "*" represents a complex conjugate. For example, $Z^{in, BPF}*$ denotes the complex conjugate of $Z_{in, BPF}$.

In embodiments 1500 and 1600, $Z_S$ corresponds to the output impedance of antenna interface circuitry 202, and $Z_L$ corresponds to the input impedance of matching network 1515, $Z_{in, z}$, respectively. Matching network 1515 seeks to provide conjugate impedance matching between filter circuitry 1510 and LNA circuitry 1525. In other words, matching network 1515 transforms $Z_{in, LNA}$ to an impedance $Z_{in, z}$ (the input impedance seen when looking into the input of matching network 1515), such that $Z_{in, z}$ approximates (or equals) $Z_{out, BPF}^*$ as closely as practicable or possible.

As a figure of merit, designers typically analyze noise figures of the receive path circuitry (the path of a received RF signal, which includes antenna 130, antenna interface circuitry 202, filter circuitry 1510, matching network 1515, and receiver circuitry 1520) within RF apparatus, such as those shown in FIGS. 15–16. For either single-ended or differential receive path circuitry, the noise figure (NF) of the receive path circuitry, that is, the noise figure at antenna 130, depends on the noise figures for receiver circuitry 1520, matching network 1515, filter circuitry 1510, and antenna interface circuitry 202. Specifically, the noise figure at antenna 130 constitutes the sum of the noise figure of the antenna interface circuitry 202, the noise figure of the filter circuitry 1510, and the noise figure of the circuitry following the filter circuitry 1510 (the rest of the circuitry within the receive path of embodiment 1500, neglecting any input-referred noise contribution from baseband processor circuitry 120).

The noise figures of the antenna interface circuitry 202 and of the filter circuitry 1510 are equivalent to their respective insertion attenuations, where insertion attenuation is the inverse of power gain under conjugate-match conditions. Assuming that antenna interface circuitry 202 and filter circuitry 1510 have fixed insertion attenuations (limited by their filtering requirements and other factors), then the minimization of the overall receive path noise figure is equivalent to minimization of the noise figure of the circuitry following the filter circuitry 1510, referred to as $NF_{RX}$. The noise figure $NF_{RX}$ depends on the magnitude of the real part of $Z_{out, BPF}$. More specifically, $NF_{RX}$ depends on the magnitude of the shunt real part of $Z_{out, BPF}$. For a given LNA circuitry 1525, an optimum value of the input impedance of matching network 1515, $Z_{in, z, opt}$, exists that would minimize the noise figure of the receive path circuitry. The value of $Z_{in, z, opt}$ depends on the relative contributions of the noise sources within the receive path circuitry.

One may refer the noise within the circuitry following filter circuitry 1510 to the input of matching network 1515. As noted above, $NF_{RX}$ denotes the noise figure of the circuitry following filter circuitry 1510, such that $$NF_{RX} = 10 \log_{10}(F_{RX}),$$

where $F_{RX}$ represents the noise factor of the circuitry following filter circuitry 1510. Using the input-referred noise contributions, one may compute the noise figure $NF_{RX}$ of the circuitry following filter circuitry 1510 as:

$$F_{RX} = \frac{\frac{1}{4}[4kTR_o + (\overline{v_{nz}} + i_{nz}R_o)^2]}{kTr_o},$$

or, alternatively, $$F_{RX} = 1 + \frac{(\overline{v_{nz}} + i_{nz}R_o)^2}{4kTR_o}, \quad (Eq. 1)$$

where k, T, $R_o$, $v_{nz}$, and $i_{nz}$ represent, respectively, the Boltzmann constant ($1.38066 \times 10^{-23}$ J/K), the temperature in degrees Kelvin (° K.) (when defining noise factors and noise figures, designers typically refer to a standard 290° K. temperature), the noise equivalent shunt real part of the output impedance of filter circuitry 1510, and equivalent input-referred noise voltage and current sources at the input of matching network 1515 without the filter circuitry connected.

One may readily determine from examining Eq. 1 above that the noise factor $F_{RX}$ depends on the magnitude of $R_o$. Thus, choosing a value for $R_o$ directly affects the noise factor $F_{RX}$ (and, hence, the noise figure $NF_{RX}$). Put another way, one may optimize the noise factor $F_{RX}$ and noise figure $NF_{RX}$ by selecting an appropriate value of $R_o$. Note that, although Eq. 1 above assumes conjugate match conditions, one may derive a mathematical relationship that governs non-conjugate match conditions, as desired.

Often, the manufacturer or vendor of filter circuitry 1510 provides its product with a fixed $R_o$. Given a fixed $R_o$, and neglecting losses and noise in matching network 1515, minimizing $F_{RX}$ amounts to minimizing or optimizing the noise factor at the input of LNA circuitry 1525, or $F_{LNA}$ (note that $F_{LNA}$ represents the noise figure of the receive path circuitry beginning at the input of LNA circuitry 1525). Under those circumstances, and referring the noise within receiver circuitry 1520 (including LNA circuitry 1525) to the input of LNA circuitry 1525, one obtains:

$$F_{LNA} = 1 + \frac{(v_{n(LNA)} + i_{n(LNA)} \cdot Z_{out,Z})^2}{\frac{4kT}{R_{o,Z}} \cdot |Z_{out,Z}|^2}, \quad (Eq. 2)$$

where $V_n(LNA)$, $i_n(LNA)$, $R_{o, z}$, and $Z_{out, z}$ represent, respectively, the equivalent noise voltage and current sources at the input of LNA circuitry 1525 without matching network 1515 connected, the shunt noise equivalent real part of the output impedance of matching network 1515, and the output impedance of matching network 1515. Note that Eq. 2 places no restrictions on $Z_{in, LNA}$ with respect to $Z_{out, z}$, and makes no assumptions about relationship between $Z_{in, LNA}$ and $Z_{out, z}$.

By examining Eq. 2 above, one notes that the optimum value of $Z_{out, z}$ for minimum $F_{LNA}$ depends on the relative values of $v_{n(LNA)}$ and $i_{n(LNA)}$. Thus, for a known $Z_{out, BPF}$, there exists a matching network 1515 that transforms $Z_{out, BPF}$ to an optimum $Z_{out, z}$, or $Z_{out, opt}$, so as to minimize or optimize $F_{LNA}$. If one knows the noise sources $V_{n(LNA)}$ and $i_{n(LNA)}$, one may compute $Z_{out, opt}$ using Eq. 2 above.

Typically, manufacturers or vendors of filter circuitry 1510 design and specify their products for a standard 50 Ω impedance. For certain CMOS bipolar implementations of the receiver circuitry 1520 (e.g., CMOS implementation of LNA circuitry 1525 and follow-on circuitry, such as a mixer circuitry), noise equivalent models at a given frequency, say, 1 GHz, yield a $Z_{out,\ opt}$ with a relatively large magnitude in comparison to the standard 50 Ω impedance. Consequently, matching network 1515 would have to implement a relatively large transformation ratio, $n_z$, where $$n_z = \sqrt{\frac{Z_{out,opt}}{Z_{out,BPF}}}.$$

Thus, for $Z_{out,\ opt}$=400 Ω and $Z_{out,\ BPF}$=50 Ω, one obtains $n_z=\sqrt{8}$, or about 2.83. That value of $n_z$ implies that matching network 1515 has to transform $Z_{out,\ opt}$ by a relatively large amount in order to accomplish the impedance transformation.

The quality factor of matching network 1515, $Q_z$, varies in proportion to $n_z$. Furthermore, the sensitivity to the variations and tolerances of components within matching network 1515 or to circuit impedances (e.g., $Z_{out,\ BPF}$) is also proportional to $n_z$. Thus, a more selective matching network 1515 (i.e., a network with higher $Q_z$) also exhibits higher sensitivity. Higher sensitivity, however, increases the challenge of meeting robust manufacture and stable performance goals of matching network 1515. Thus, generally, one seeks to reduce the transformation ratio, $n_z$. in order to achieve robustness and stability. Put another way, for a given $Z_{out,\ opt}$, one desires a $Z_{out,\ BPF}$ as close to $Z_{out,\ opt}$ as possible or practicable, so that $n_z$ approaches unity. (Of course, using matching network 1515 at all implies that $n_z$ is not equal to unity.)

In the case of a relatively large $Z_{out,\ opt}$, say, 400 Ω, having a $Z_{out,\ BPF}$ larger than the standard 50 Ω impedance is beneficial because it yields a relatively small $n_z$. A small $n_z$, as noted above, results in improved robustness and stability due to reduced sensitivity. For a $Z_{out,\ BPF}$=200 Ω, one obtains an $n_z$ of $\sqrt{2}$, or about 1.41, compared to 2.83 for the standard 50 Ω impedance. For example, a CMOS implementation of the receiver circuitry 1520 (e.g., CMOS implementation of LNA circuitry 1525 and follow-on circuitry, such as a mixer circuitry) may have a $Z_{out,\ opt}$ of about 400 Ω. In such a case, one would prefer a filter circuitry 1510 with $Z_{out,\ BPF}$ larger than the standard 50 Ω, say, a $Z_{out,\ BPF}$ of 200 Ω or higher.

For a relatively small $Z_{out,\ opt}$, say, less than 50 Ω, increasing $Z_{out,\ BPF}$ above the standard 50 Ω impedance yields a $n_z$ less than unity, which implies increased sensitivity. As an example, a bipolar implementation of the receiver circuitry 1520 (e.g., bipolar implementation of LNA circuitry 1525 and follow-on circuitry, such as a mixer circuitry) may have a $Z_{out,\ opt}$ of about 25 Ω. In such an implementation, one would ordinarily not seek to increase $Z_{out,\ BPF}$ beyond the standard 50 Ω impedance.

Once one has chosen appropriate (or available or practicable) values for $Z_{out,\ BPF}$ and $Z_{out,\ opt}$, one may proceed to designing an appropriate matching network 1515 that performs the desired impedance transformation or matching. Exemplary embodiments of the invention use differential matching networks 1515, rather than the single-ended circuitry used in conventional matching networks. FIGS. 17–22 illustrate exemplary embodiments of matching networks 1515 according to the invention.

FIGS. 17A–17D depict several embodiments of matching networks according to the invention. The embodiments shown in FIGS. 17A–17D constitute differential-L matching networks. In practical implementations, the capacitors and inductors should have high quality factors so as to inject minimal noise into the signal path. Each of the four embodiments shown includes either two capacitors and an inductor, or two inductors and a capacitor. In particular, embodiments 1700A and 1700C in FIGS. 17A and 17C, respectively, each include two inductors and a capacitor. In contrast, embodiments 1700B and 1700D in FIGS. 17B and 17C, respectively, each include two capacitors and one inductor.

From a signal flow or electrical port characteristics point of view, one may, by choosing appropriate component values, use embodiments 1700A–1700D interchangeably. From a practical implementation point of view, however, capacitors tend generally to be less costly and physically smaller than inductors. Furthermore, inductors tend to have lower quality factors than do capacitors, and are consequently generally more noisy than capacitors.

One may choose component values for embodiments 1700A–1700D of matching network according to the invention in a variety of ways. As one alternative, one may use the well-known Smith chart. With respect to embodiments 1700A–1700D, one may accomplish a desired impedance transformation by using two trajectories or moves on the Smith chart. More particularly, one starts on the Smith chart at an initial impedance and, using two movements or trajectories on the chart, ends at a desired impedance.

Note that one may accomplish the impedance transformation in two moves or trajectories if one assumes ideal (or high quality-factor) inductors and capacitors in embodiments 1700A–1700D. One may still use the Smith chart to calculate component values for lossy or practical components by modifying the above steps as persons of ordinary skill in the art who have the benefit of the description of the invention understand.

Figure 18A:
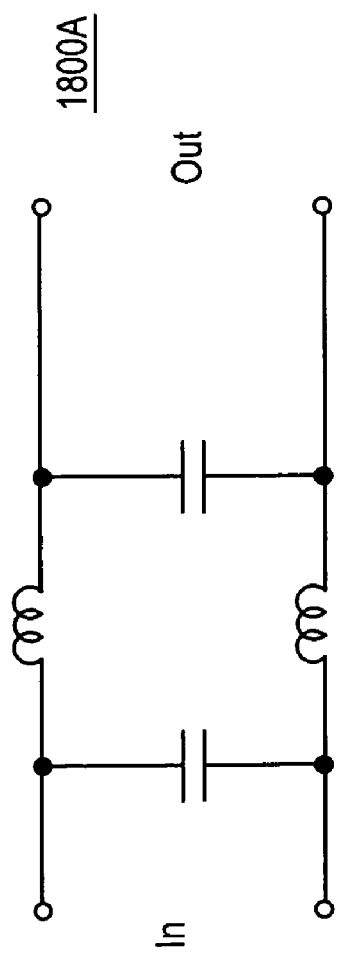
FIG. 18A illustrates a differential-Π impedance transformation network for use in matching networks according to the invention.
Figure 18B:
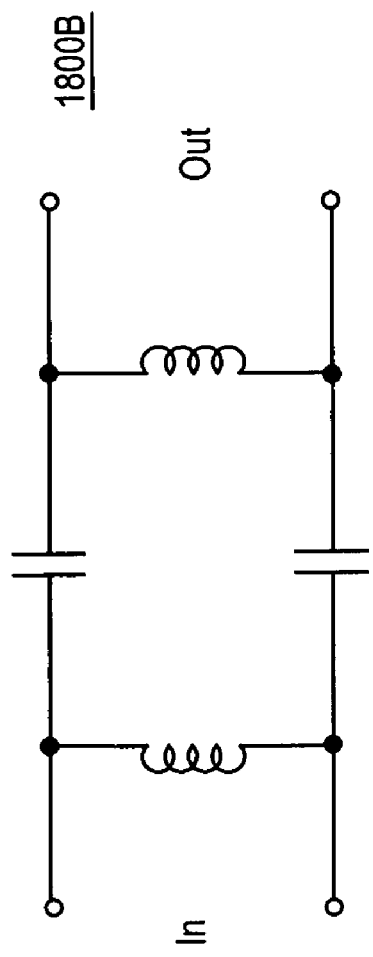
FIG. 18B depicts another differential-Π impedance transformation network for use in matching networks according to the invention.

FIGS. 18A–18B illustrate other exemplary embodiments according to the invention of matching network 1515. Embodiments 1800A and 1800B in FIGS. 18A and 18B, respectively, constitute differential-Π matching networks. Each of the two embodiments shown includes two capacitors and two inductors. More specifically, embodiment 1800A has two series inductors and two shunt capacitors, whereas embodiment 1800B includes two series capacitors and two shunt inductors.

As with embodiments 1700A–1700D, from a signal flow or electrical port characteristics point of view, by choosing appropriate component values one may use embodiments 1800A–1800B in an interchangeable manner. Also, from a practical implementation point of view, each of the two embodiments includes the same number of inductors and capacitors.

Also as with embodiments 1700A–1700D, one may choose component values for embodiments 1800A–1800B in a variety of ways. As one alternative, one may use the Smith chart to accomplish impedance transformation by making three moves or trajectories to traverse from an initial impedance to a final impedance. As noted above, one may use the Smith chart to take into account the lossy nature of practical inductors and capacitors by using techniques that persons of ordinary skill in the art who have the benefit of the description of the invention understand.

Compared to embodiments 1700A–1700D, embodiments 1800A–1800B offer one more degree of freedom in making impedance transformations and, consequently, provide more flexibility in implementing desired impedance transformations. On the other hand, embodiments 1800A–1800B use one more component than do embodiments 1700A–1700D. As a result, embodiments 1800A–1800B may have increased noise, bulk, and cost.

Figure 19A:
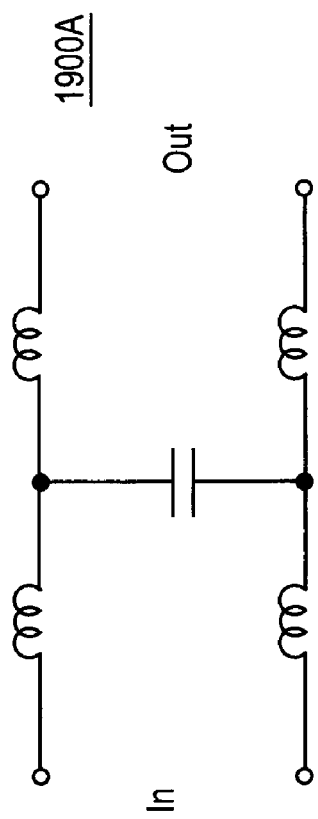
FIG. 19A shows a differential-T impedance transformation network for use in matching networks according to the invention.
Figure 19B:
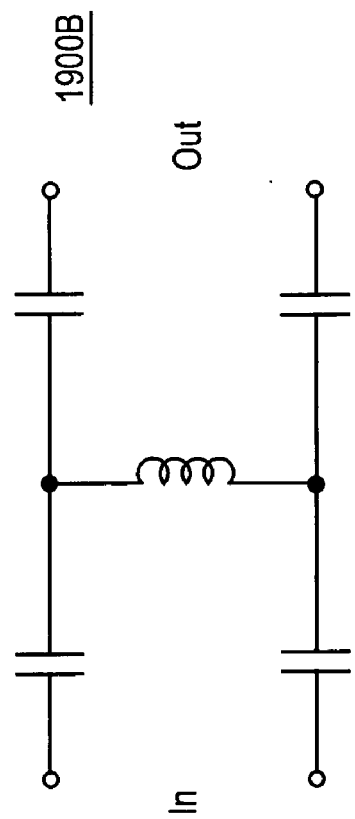
FIG. 19B illustrates another differential-T impedance transformation network for use in matching networks according to the invention.

FIGS. 19A–19B illustrate two other exemplary embodiments according to the invention of matching network 1515. Embodiments 1900A and 1900B in FIGS. 19A and 19B, respectively, constitute differential-T matching networks. Each of the two embodiments shown includes either four inductors and a capacitor, or four capacitors and an inductor. In particular, embodiment 1900A has four series inductors and a shunt capacitor, whereas embodiment 1900B includes four series capacitors and one shunt inductor.

As with the embodiments described above, from a signal flow or electrical port characteristics point of view, by choosing appropriate component values one may use embodiments 1900A–1900B interchangeably. From a practical implementation point of view, however, embodiment 1900A includes four inductors, whereas embodiment 1900B includes only a single inductor. As noted above, practical inductors tend to have more bulk, cost more, and have poorer noise performance than do capacitors. Consequently, embodiment 1900A tends to cost more, have physically larger dimensions, and have poorer noise characteristics than does embodiment 1900B.

As noted above with respect to other embodiments, one may choose component values for embodiments 1900A–1900B in a variety of ways. As one alternative, one may use the Smith chart to accomplish impedance transformation by making three moves or trajectories to traverse from an initial impedance to a final impedance. Also as noted above, one may use the Smith chart to take into account the lossy nature of practical inductors and capacitors by using techniques that persons of ordinary skill in the art who have the benefit of the description of the invention understand.

Compared to embodiments 1700A–1700D, embodiments 1900A–1900B offer two more degrees of freedom in making impedance transformations and, consequently, provide more flexibility in implementing desired impedance transformations. On the other hand, embodiments 1900A–1900B use two more components than do embodiments 1700A–1700D. As a result, embodiments 1900A–1900B may have increased noise, bulk, and cost, and have poorer noise performance.

Note that FIGS. 17–19 show individual impedance transformation networks for use in matching network 1515 according to the invention. As persons of ordinary skill in the art who have the benefit of the description of the invention understand, however, one may use combinations of two or more of the circuits shown in embodiments 1700A–1700D, 1800A–1800B, and 1900A–1900B. Put another way, one may cascade or combine desired numbers of differential-L networks (see embodiments 1700A–1700D), differential-Π networks (see embodiments 1800A–1800B), and/or differential-T networks (see embodiments 1900A–1900B) to synthesize an impedance transformation matching network. The following description provides some illustrative examples.

As one exemplary embodiment, one may combine a mixture or mixtures of differential-T networks to produce a matching network 1515. As another embodiment, one may combine a mixture or mixtures of differential-L networks to provide a matching network 1515. As yet another embodiment, one may combine a mixture or mixtures of differential-Π networks to provide a matching network 1515. Furthermore, one may combine a mixture of different differential networks according to embodiments 1700A–1700D, 1800A–1800B, and 1900A–1900B to synthesize a desired matching network 1515. As an example, FIG. 20 shows an embodiment 2000 of a matching network that includes a cascade of a differential-Π network according to embodiment 1800A with two differential-L networks, each according to embodiment 1700B.

Figure 20:
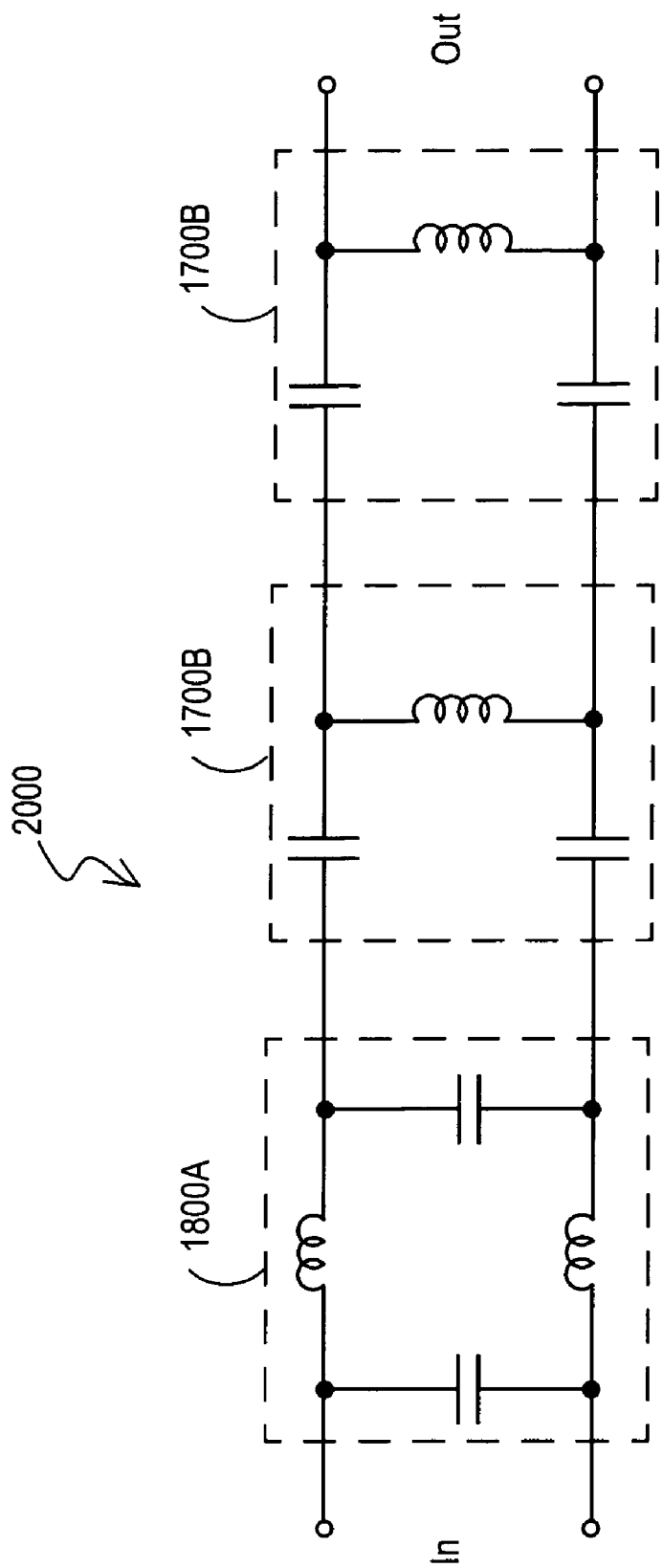
FIG. 20 depicts an embodiment according to the invention that includes a cascade of a differential-Π network and two differential-L networks.

Compared to embodiments 1700A–1700D, 1800A–1800B, and 1900A–1900B, matching networks that use cascades or combinations of various differential networks, such as embodiment 2000 in FIG. 20, use larger numbers of components. Consequently, they offer more degrees of freedom and flexibility, as they split or distribute the impedance transformation task among the cascaded differential networks. Splitting or distributing the impedance transformation task among the cascaded differential networks reduces the transformation ratio for each stage and results in less overall sensitivity and possibly more robust manufacture.

As noted above, however, matching networks that use cascades or combinations of various differential networks may also have increased bulk and degraded noise performance. In a particular implementation, one may arrive at a suitable matching network by balancing the various design and performance factors, e.g., performance, ease of design, ease of implementation and manufacture, stability, noise performance, sensitivity, cost, bulk, and the like. Furthermore, one may use a Smith chart to select component values for the cascaded differential networks, as persons skilled in the art who have the benefit of the disclosure of the invention understand.

As one increases the number of cascaded stages or differential networks in a matching network according to the invention, the overall structure begins to resemble a distributed circuit. In the limit, rather than (or in addition to) using discrete differential networks in matching networks, one may use distributed transmission lines to perform impedance transformation. In general, a differential distributed matching network may include one or more stages of transmission line or transmission lines, as desired.

Figure 21:
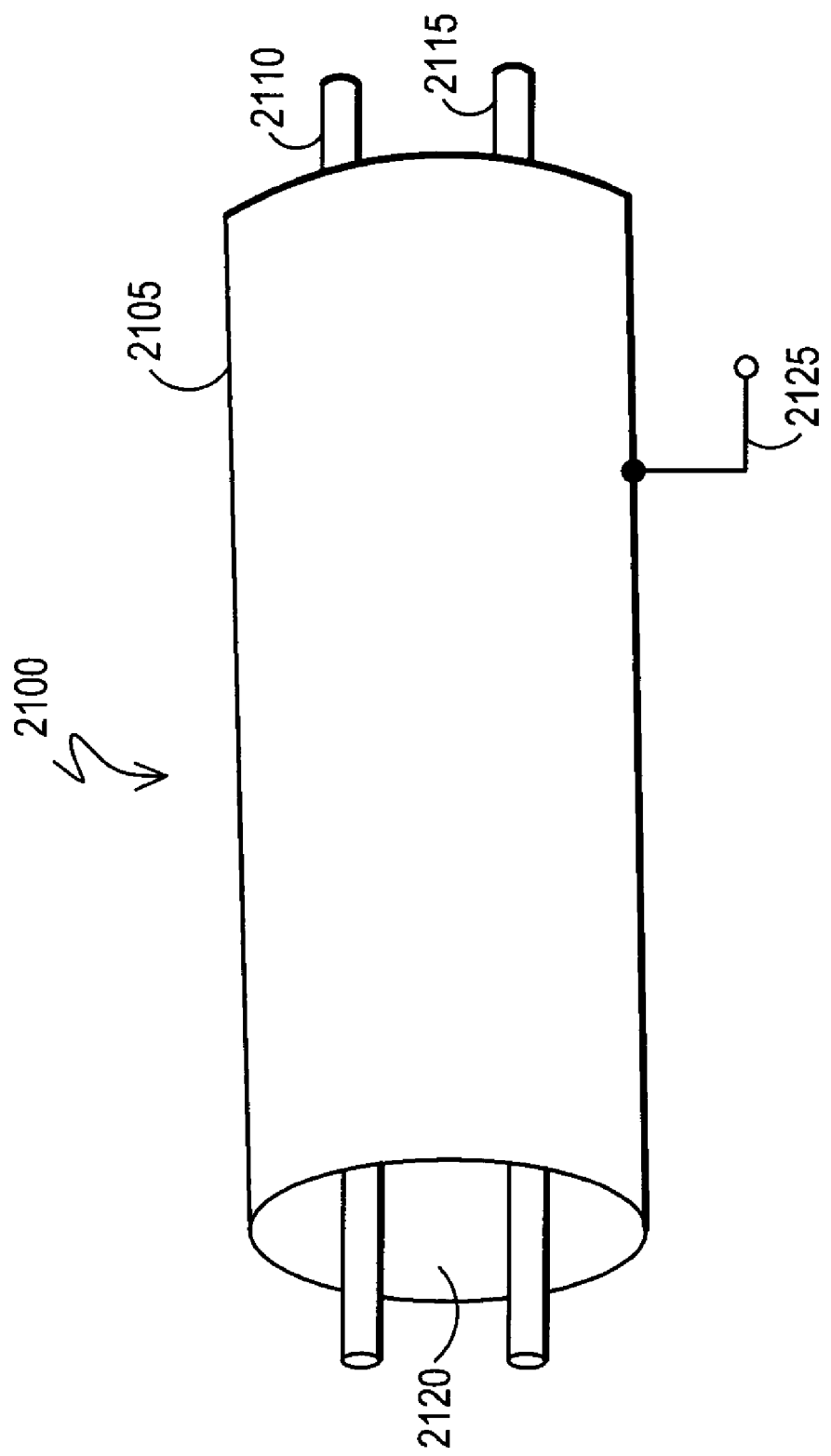
FIG. 21 shows an embodiment of a general differential transmission line for use in matching networks according to the invention.

FIG. 21 shows an embodiment 2100 of a general differential transmission line for use in matching networks according to the invention. The differential transmission line includes an outer shield or layer 2105 and two inner conductors or elements 2110 and 2115. The outer shield 2105 may couple to a reference potential 2125, such as circuit ground. The inner elements 2110 and 2115 conduct differential electrical signals through the transmission line. A dielectric 2120 may surround the inner conductors 2110 and 2115, as desired. The dielectric 2120 may constitute any suitable material that provides the desired electrical and physical characteristics of the differential transmission line.

One may characterize the differential transmission line in FIG. 21 according to its various attributes. Usually, the characteristics of the differential transmission line include the following:

(1) $Z_o$ (odd-mode), which represents the characteristic impedance for odd-mode excitation of the transmission line;

(2) $Z_o$ (even-mode), a quantity that denotes the characteristic impedance for even-mode excitation of the transmission line; and (3) θ, the electrical length of the differential transmission line. Note that, in general, the differential transmission line need not have equal even-mode and odd-mode phase velocities.

As persons skilled in the art who have the benefit of the description of the invention understand, one may use one or more sections of the differential transmission line in FIG. 21 to perform impedance matching or transformation within the front-end circuitry of an RF apparatus according to the invention. One may use a variety of techniques for selecting the various characteristics of the differential transmission line, such as its geometric attributes. For example, one may a Smith chart to design or select a suitable differential transmission line for a given impedance transformation application.

Note that embodiment 2100 provides a general structure of a differential transmission line. In addition to embodiment 2100, one may use other structures or types of differential transmission lines, as persons of ordinary skill who have the benefit of the description of the invention understand. For example, one may use micro-strip differential transmission lines, as desired. Furthermore, one may fully or partially implement any of the differential transmission lines described above using one or more of the following:

(1) a printed circuit board;
(2) the substrate of a silicon die (such as a silicon die that houses the receiver circuitry;
(3) the substrate of the package of an integrated circuit;
(4) the substrate of filter circuitry 1510; and
(5) the module or the substrate of the housing or enclosure for filter circuitry 1510.

Note that, at relatively higher operating frequencies, a differential transmission line becomes an attractive option for implementing matching networks according to the invention.

At such frequencies, parasitic effects may degrade the performance of discrete components, thus making their use less desirable. In other words, the discrete components may become lossy, noisy, and/or lack sufficient bandwidth.

As an alternative to, or in addition to, using matching networks that use discrete components or distributed transmission lines as described above, one may use a combination of the two. In other words, one realize a matching network that uses distributed transmission lines to implement one or more of the components within the matching network. For example, one may use a transmission line to implement an inductor. Such a distributed inductor may take the place of a discrete inductor, as desired.

Figure 22:
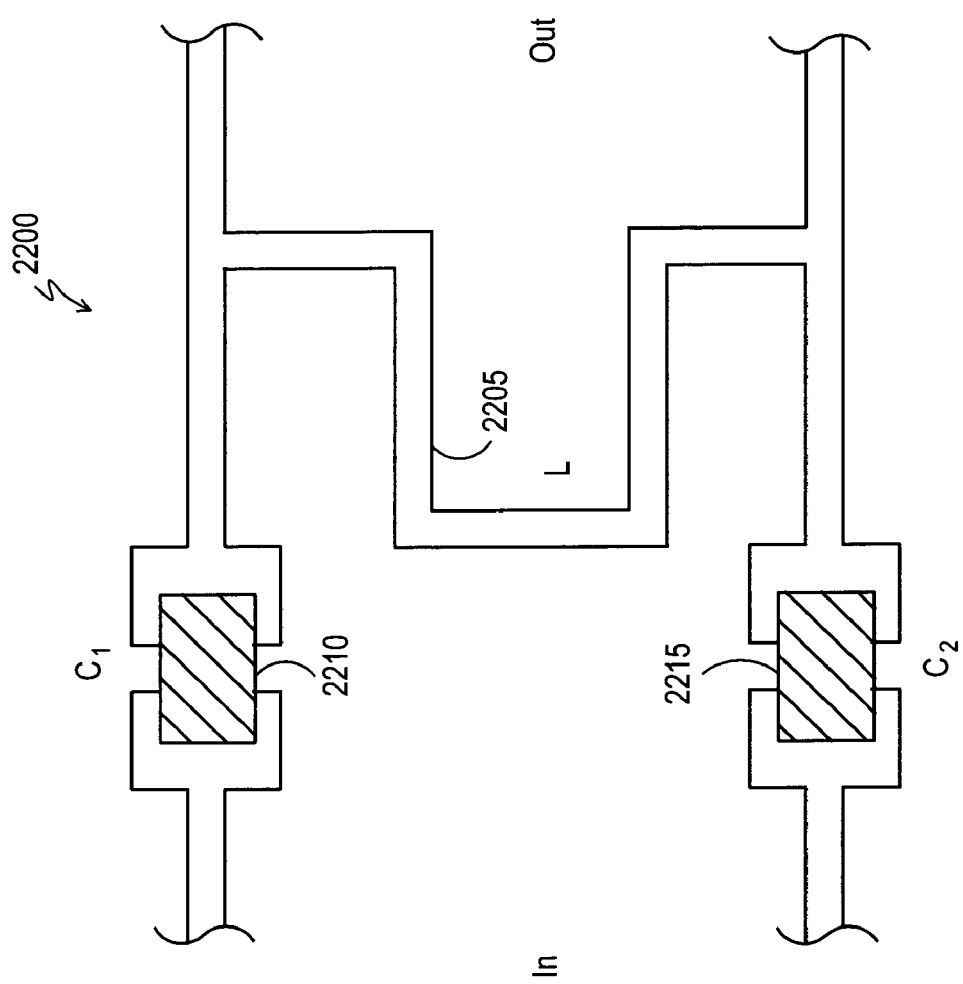
FIG. 22 depicts an embodiment of a matching network according to the invention that uses both discrete and distributed components.

FIG. 22 shows an embodiment 2200 of a matching network according to the invention that uses both discrete and distributed components, the latter realized using a transmission line. Embodiment 2200 constitutes an implementation of embodiment 1700B in FIG. 17. Thus, embodiment 2200 includes two series capacitors 2210 and 2215, and a shunt inductor 2205.

Capacitors 2210 and 2215 constitute discrete or lumped capacitors (for example, surface-mount capacitors soldered to a printed circuit board). Inductor 2205 constitutes an inductor implemented using a section of a transmission line. One may implement the transmission line in a variety of ways, as persons skilled in the art who have the benefit of the description of the invention understand. As an example, one may use one or more conductive traces of a printed circuit board to implement the distributed transmission line and, thus, inductor 2205, as desired.

Furthermore, one may use either a lumped (or discrete) and/or distributed matching network 1515 according to the invention to perform both an impedance transformation and a balun function. In other words, such a matching network performs a desired impedance transformation, as described above. In addition, the matching network acts as a balun by converting a single-ended output of filter circuitry 1510 to a differential output of the matching network, using circuitry known to persons skilled in the art who have the benefit of the description of the invention. Using such a matching network allows circuit implementation with a single-ended filter circuitry 1510, thus allowing increased flexibility in the design of the circuit and/or component selection and, perhaps, reduced size and/or cost of the design.

Figure 23:
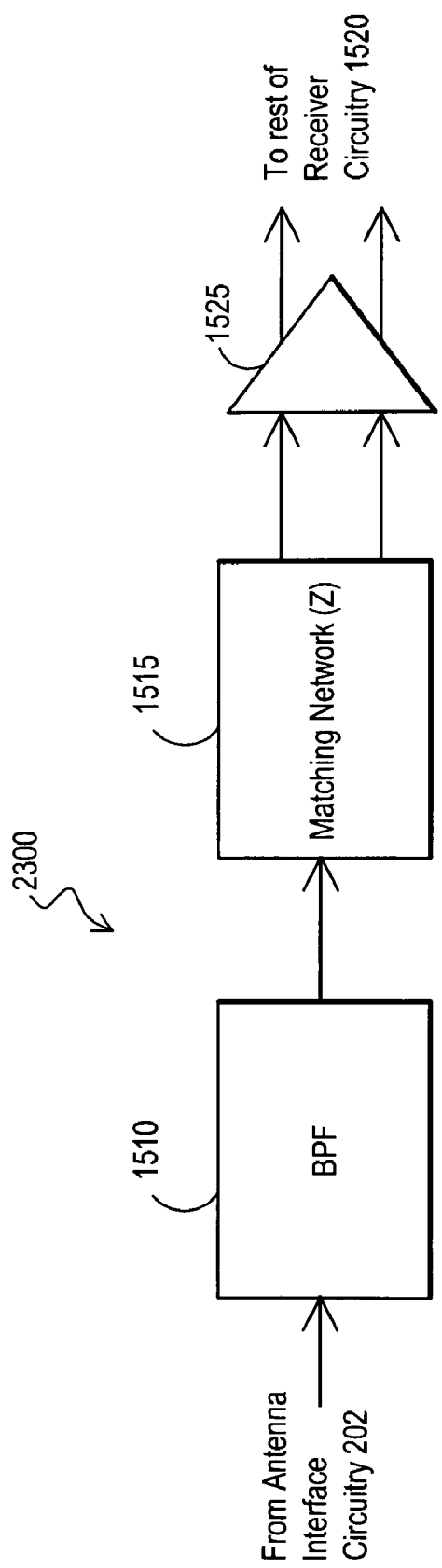
FIG. 23 illustrates an embodiment of a receive path circuitry of an RF apparatus that includes such a matching network that operates with a filter circuitry that has a single-ended output.

FIG. 23 illustrates an embodiment 2300 of a receive path circuitry of an RF apparatus that includes such a matching network. Embodiment 2300 includes a cascade of filter circuitry 1510, matching network 1515, and LNA circuitry 2525. Filter circuitry 1510 has both a single-ended input (driven by antenna interface circuitry 202), and a single-ended output (that drives matching network 1515). Matching network 1515 matches the output impedance of filter circuitry 1510 to the input impedance of LNA circuitry 2525. Furthermore, matching network 1515 converts the single-ended output of filter circuitry 1510 to a differential outputs that drive LNA 1525. LNA 1525 has differential inputs and may have single-ended or differential outputs, as desired.

Figure 24:
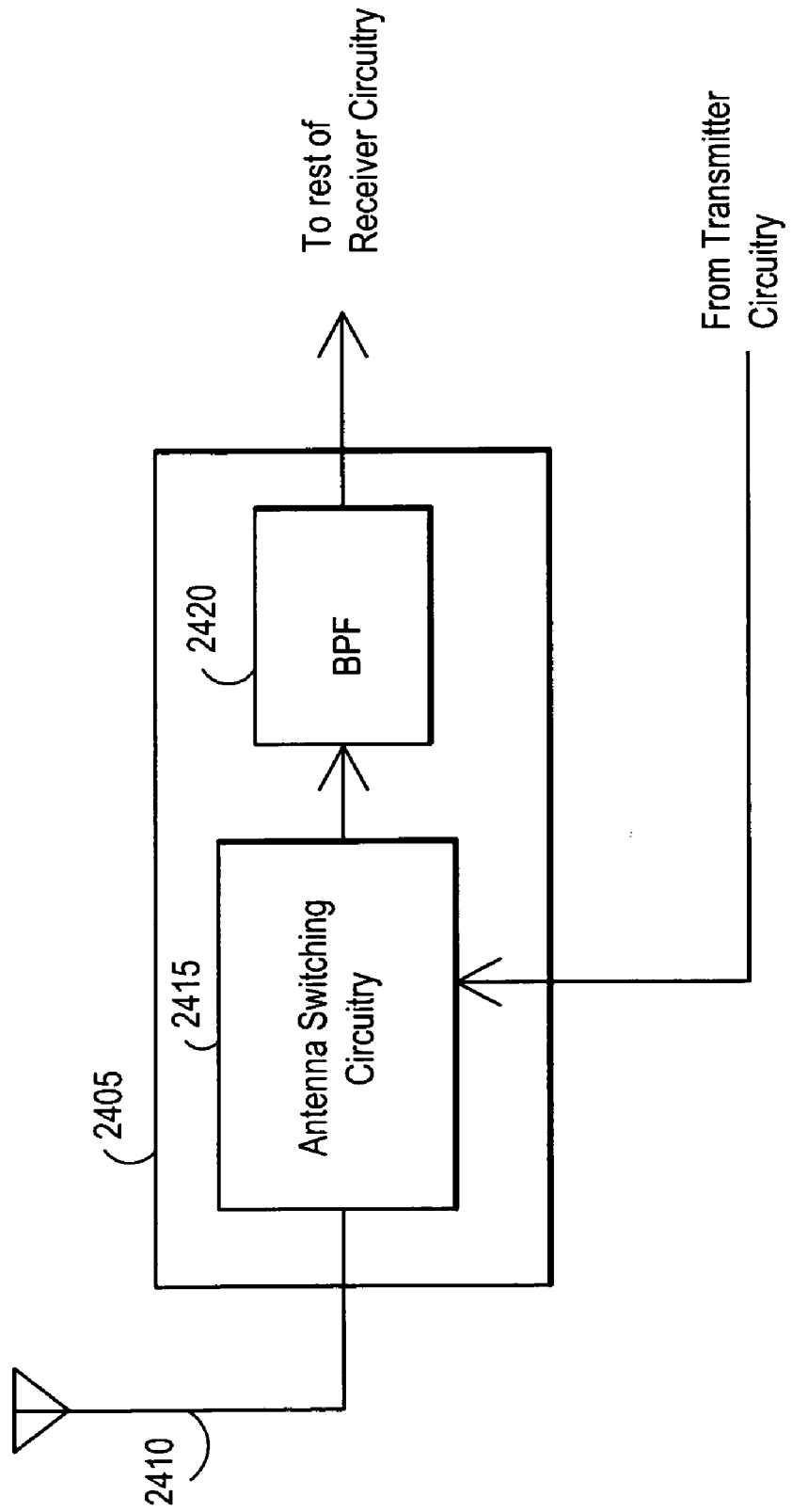
FIG. 24 shows a conventional front-end circuitry that includes a front-end module.

Another aspect of the invention relates to the partitioning and implementation of the front-end circuitry in an RF apparatus. FIG. 24 shows a conventional front-end circuitry. The conventional front-end circuitry includes a front-end module 2405 that houses antenna switching circuitry 2415 and filter circuitry 2420. Conventional front-end module 2405, however, does not include a matching network.

Figure 25:
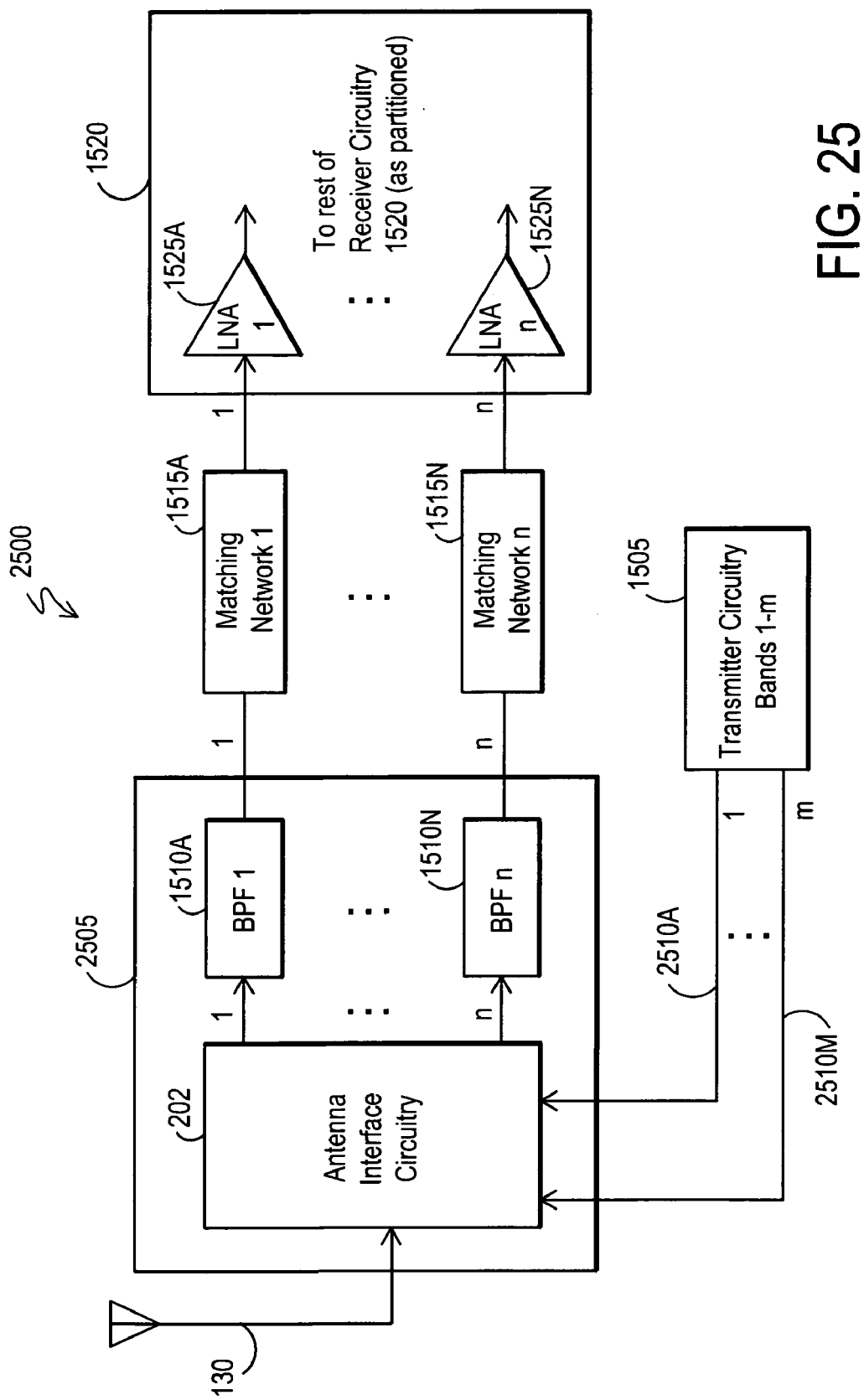
FIG. 25 depicts an embodiment of an RF transceiver partitioned according to the invention that includes a front-end module.

One may use a conventional front-end module with an RF apparatus partitioned according to the invention (as described above in detail). FIG. 25 illustrates an embodiment 2500 of an RF transceiver partitioned according to the invention. Embodiment 2500 includes front-end module 2505, which houses antenna interface circuitry 202 and n filter circuitries labeled as 1510A–1510N, where n≦1. Each of the n filter circuitries 1510A–1510N corresponds to one of the n bands of frequencies that the RF transceiver may receive.

Outputs of filter circuitries 1510A–1510N couple to respective inputs of a plurality (n) of matching networks labeled 1515A–1515N. Outputs of any of filter circuitries 1510A–1510N may be single-ended or differential, as desired. Matching networks 1515A–1515N may constitute any appropriate matching networks as described above. Outputs of matching networks 1515A–1515N drive respective inputs of LNA circuitries 1525A–1525N. Outputs of LNA circuitries 1525A–1525N couple to the rest of receiver circuitry 1520. Outputs of any of LNA circuitries may be single-ended or differential, as desired.

Transmitter circuitry 1505 provides m RF transmit signals labeled 2510A–2510M to antenna interface circuitry 202, either directly or through RF amplifier circuitries (not shown explicitly), where m≦1. One may partition receiver circuitry 1520 and/or transmitter circuitry 1505 as described above, for example, as shown in FIGS. 2, and 4–8. Furthermore, one may use front-end module 2505 with a variety of RF apparatus, such as RF transceivers and RF receivers of various types and architectures (see above for some examples), as desired.

Figure 26:
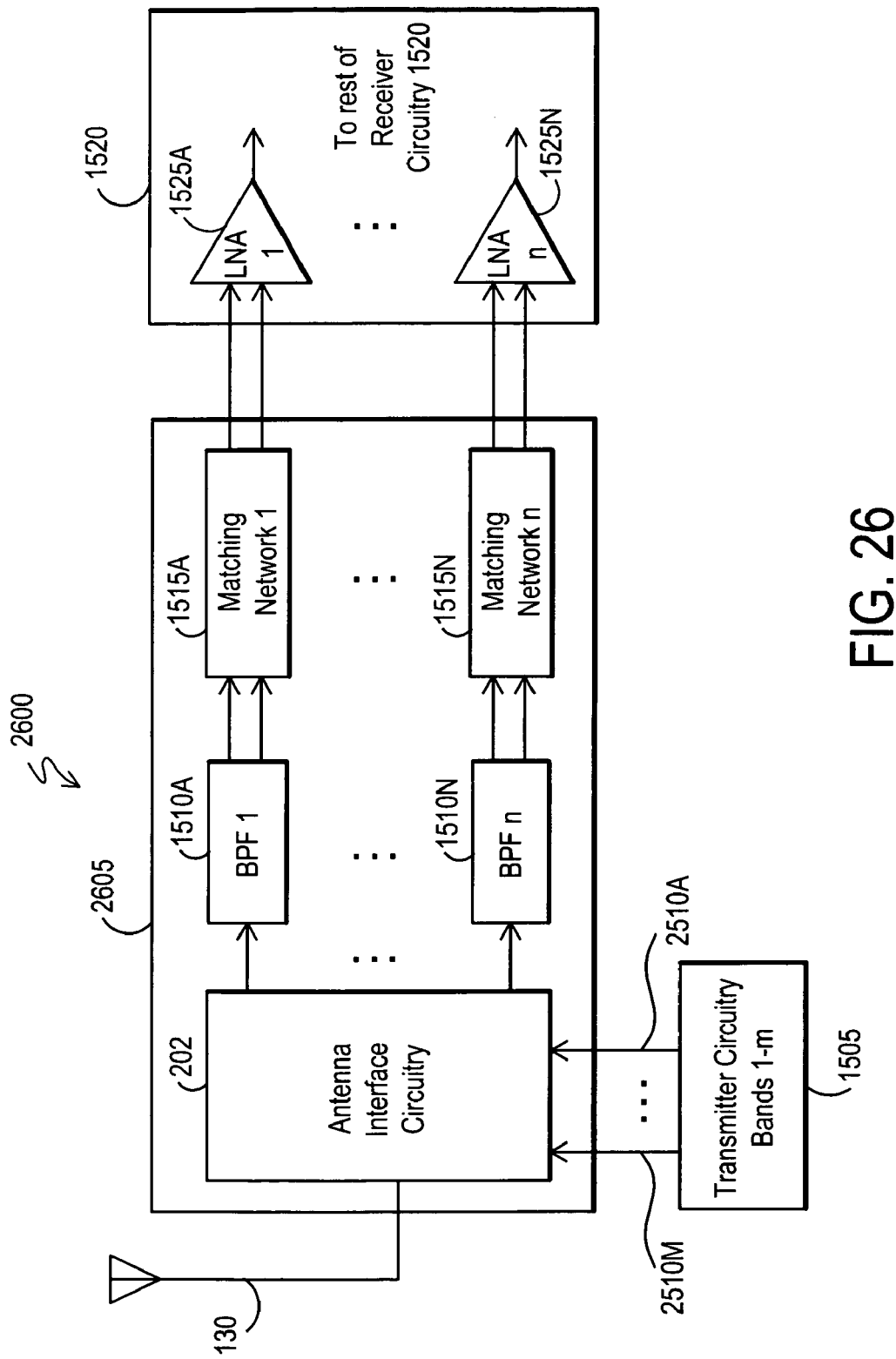
FIGS. 26 illustrates another embodiment of an RF transceiver partitioned according to the invention that includes a front-end module.

FIG. 26 illustrates another embodiment 2600 of an RF transceiver partitioned according to the invention. Embodiment 2600 includes front-end module 2605. Front-end module 2605 may constitute a wide variety of modules as desired (for example, modules used for conventional filter circuitries, such as SAW filter circuitries), as persons of ordinary skill in the art who have the benefit of the disclosure of the invention understand. Front-end module 2605 houses antenna interface circuitry 202 and n filter circuitries labeled as 1510A–1510N, where n≦1. Each of the n filter circuitries 1510A–1510N corresponds to one of the n bands of frequencies that the RF transceiver may receive.

Front-end module 2605 also includes a plurality n of matching networks labeled 1515A–1515N. Outputs of filter circuitries 1510A–1510N couple to respective inputs of the plurality of matching networks labeled 1515A–1515N. Outputs of any of filter circuitries 1510A–1510N may be single-ended or differential, as desired. Matching networks 1515A–1515N may constitute any appropriate matching networks as described above. Matching networks 1515A–1515N may be single-ended or differential, on their inputs and/or outputs, as desired. As shown, differential outputs of matching networks 1515A–1515N drive respective differential inputs of LNA circuitries 1525A–1525N. Outputs of LNA circuitries 1525A–1525N couple to the rest of receiver circuitry 1520. Inputs and outputs of any of LNA circuitries may be single-ended or differential, as desired.

Transmitter circuitry 1505 provides m RF transmit signals labeled 2510A–2510M to antenna interface circuitry 202, either directly or through RF amplifier circuitries (not shown explicitly), where m≦1. One may partition receiver circuitry 1520 and/or transmitter circuitry 1505 as described above, for example, as shown in FIGS. 2, and 4–8.

Note that embodiment 2600 provides increased integration by including matching networks 1515A–1515N within front-end module 2605. Increased integration provides several benefits and improvements, as described above, including:

(1) decreased part count;
(2) decreased cost;
(3) increased robustness;
(4) increased stability;
(5) reduced bulk;
(6) reduced printed circuit board area;
(7) higher quality factor and less parasitics;
(8) better noise performance;
(9) improved electromagnetic interference, and the like.

Note also that by using front-end module 2605, one may couple front-end module 2605 to an integrated circuit or module that includes the rest of the RF receive path circuitry, rather than using discrete components to implement matching networks 1515A–1515N.

Furthermore, one may use front-end module 2605 with a variety of RF apparatus, such as RF transceivers and RF receivers of various types and architectures (see above for some examples), as desired. In addition, the various RF apparatus may receive and/or transmit at a variety of frequencies or within a multitude of frequency bands of interest. Some examples include:

(1) a dual-band RF transceiver circuitry supporting two receive and two transmit bands for GSM900 and DCS1800;

(2) a dual-band RF transceiver circuitry supporting two receive and two transmit bands for GSM900 and PCS1900;

(3) a dual-band RF transceiver circuitry supporting two receive and two transmit bands for GSM850 and PCS1900;

(4) a dual-band RF transceiver circuitry supporting two receive and two transmit bands for DCS1800 and PCS1900;

(5) a tri-band RF transceiver circuitry supporting three receive and three transmit bands for GSM900, DCS1800, and PCS1900;

(6) a tri-band RF transceiver circuitry supporting three receive and three transmit bands for GSM850, GSM900, and PCS1900;

(7) a tri-band RF transceiver circuitry supporting three receive and three transmit bands for GSM850, GSM900, and DCS1800;

(8) a tri-band RF transceiver circuitry supporting three receive and three transmit bands for GSM850, DCS1800, and PCS1900; and (9) a quad-band RF transceiver circuitry supporting four receive and four transmit bands for GSM850, GSM900, DCS1800, and PCS1900.

Figure 27:
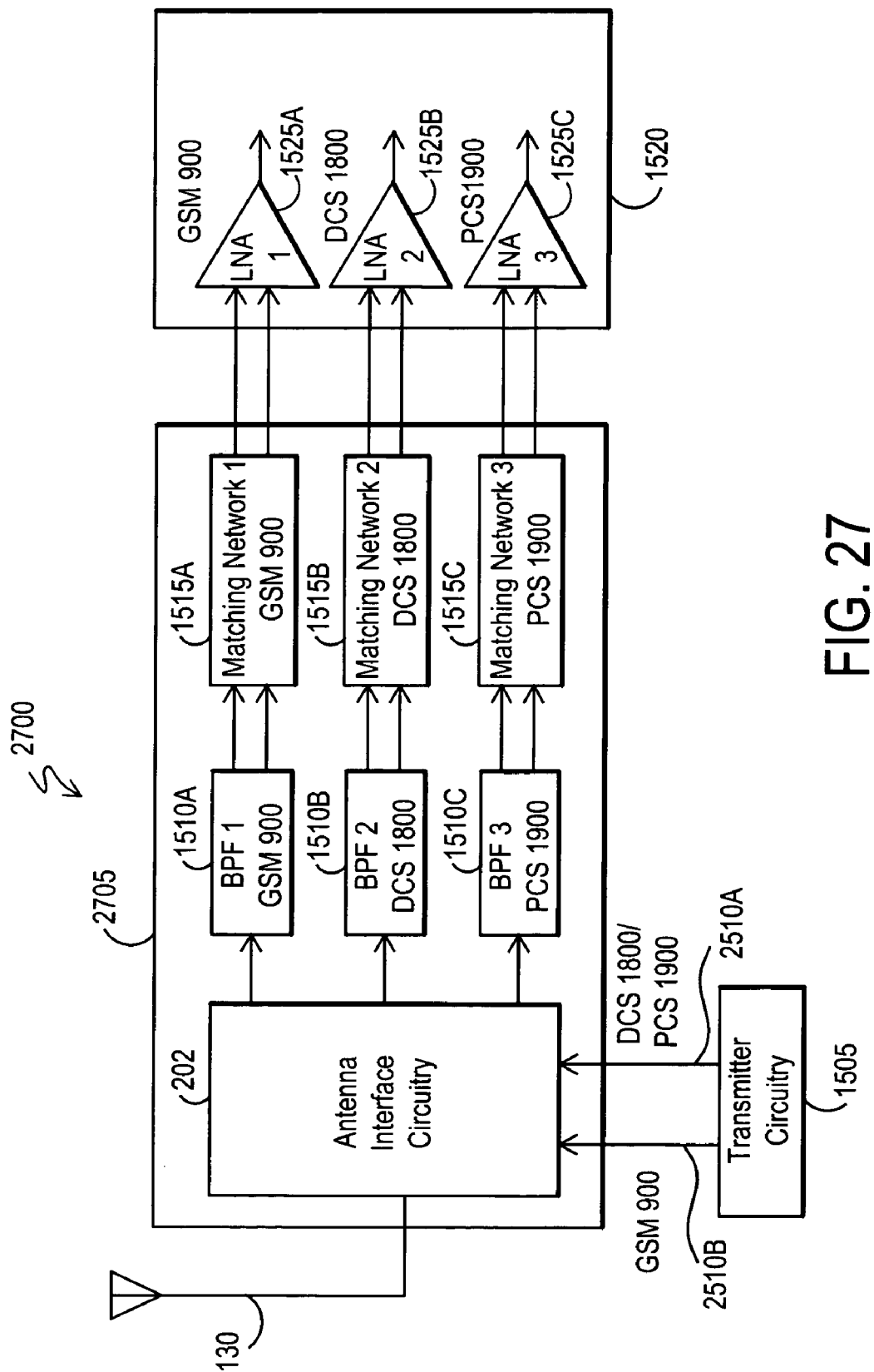
FIGS. 27 shows an embodiment according to the invention of a tri-band RF transceiver circuitry that supports three receive and three transmit bands for GSM900, DCS1800, and PCS1900.

FIG. 27 illustrates an embodiment 2700 according to the invention of a tri-band RF transceiver circuitry that supports three receive and three transmit bands for the GSM900, DCS1800, and PCS1900 bands. Embodiment 2700 is similar to, and operates similarly to, embodiment 2600 (see FIG. 26), with n=3. Thus, embodiment 2700 includes three filter circuitries 1510A–1510C, three matching networks 1515A–1515C, and three LNA circuitries Embodiment 2700 includes front-end module 2705, which is an implementation of front-end module 2605 in embodiment 2600 (see FIG. 26), with n=3. Front-end module 2705 is similar to, and operates similarly as, front-end module 2605. Front-end module 2705 includes three filter circuitries labeled as 1510A, 1510B, and 1510C. Filter circuitries 1510A, 1510B, and 1510C filter undesired signals in the GSM900, DCS1800, and PCS1900 bands, respectively. Similarly, each of the three matching networks 1515A–1515C provides impedance matching between a respective one of filter circuitries 1510A–1510C and a respective one of LNA circuitries 1525A–1525C.

Filter circuitries 1510A–1510N have differential outputs. Matching networks 1515A–1515C may constitute any appropriate matching networks as described above (e.g., embodiment 1700B in FIG. 17), and have differential inputs and differential outputs. Outputs of matching networks 1515A–1515C drive respective inputs of LNA circuitries 1525A–1525N. Outputs of LNA circuitries 1525A–1525C couple to the rest of receiver circuitry 1520. LNA circuitries 1525A–1525C have differential inputs and single-ended outputs, although one may use other circuit arrangements, as desired.

Transmitter circuitry 1505 provides RF transmit signal 2510A (for the DCS1800 and PCS1900 bands) and RF transmit signal 2510B (for the GSM900 band) to antenna interface circuitry 202, either directly or through RF amplifier circuitries (not shown explicitly). One may partition receiver circuitry 1520 and/or transmitter circuitry 1505 as described above, for example, as shown in FIG. 8. The rest of the circuitry in embodiment 2700 may be similar to the circuitry shown in FIG. 8, as desired.

Note that embodiment 2700 provides increased integration by including matching networks 1515A–1515N within front-end module 2705. Increased integration provides several benefits and improvements, as described above in connection with embodiment 2605. Note also that by using front-end module 2705, one may couple front-end module 2705 to an integrated circuit or module that includes the rest of the RF receive path circuitry, rather than using discrete components to implement intervening matching networks 1515A–1515N.

Note that, rather than or in addition to using the embodiments provided here, one may use many other embodiments of the various circuit blocks and arrangement of circuitry. As persons of ordinary skill in the art who have read the description of the invention will understand, one may use a variety of implementations of the invention, depending on factors such as design and performance specifications. For example, although FIGS. 15 and 25–27 show one transmitter circuitry, one may include more than one transmitter circuitry (for example, one for each frequency band of operation), as desired. Furthermore, a given transmitter circuitry may provide RF transmit signals for one or more frequency bands of operation, as desired.

As another example, the description and figures presented refer to matching networks that drive LNA circuitries within the succeeding receiver circuitry. One, however, may generally drive the input stages of the succeeding receiver circuitry, as desired. In such a scenario, matching networks according to the invention match the output impedance of filter circuitries to the input impedance of the input stages of the succeeding receiver circuitry or, more generally, the input impedance of the succeeding circuitry.

Referring to the figures, for example, FIGS. 4–8, 10–11, 15, and 25–27, the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and specifications for a given implementation, as persons of ordinary skill in the art who have read the disclosure of the invention will understand.

Further modifications and alternative embodiments of the invention will be apparent to persons skilled in the art in view of the description of the invention. Accordingly, this description teaches persons of ordinary skill in the art the manner of carrying out the invention and the embodiments described are to be construed as illustrative only.

The forms of the invention shown and described should be taken as exemplary embodiments. Persons of ordinary skill in the art may make various changes in the shape, size and arrangement of parts without departing from the scope of the invention described in this document. For example, persons skilled in the art may substitute equivalent elements for the elements illustrated and described here. Moreover, persons of ordinary skill in the art who have the benefit of the description of the invention may use certain features of the invention independently of the use of other features, without departing from the scope of the invention.

We claim:

1. A front-end circuitry in a radio-frequency (RF) apparatus, comprising:
    a filter circuitry with a differential output, having an output impedance, the filter circuitry configured to filter signals outside a signal band of interest, the filter circuitry configured to receive and filter a radio-frequency (RF) signal; and
    an impedance matching network, with a differential input coupled to the output of the filter circuitry the differential input having symmetrical impedances from input signal lines to a reference node, the impedance matching network further having a differential output coupled to a signal processing circuitry having an input impedance the differential output having symmetrical impedances from output signal lines to the reference node,
    wherein the impedance matching network matches the input impedance of the signal processing circuitry to the output impedance of the filter circuitry.

2. The front-end circuitry according to claim 1, wherein the signal processing circuitry comprises an amplifier circuitry.

3. The front-end circuitry according to claim 2, wherein signal processing circuitry comprises a low-noise amplifier circuitry.

4. The front-end circuitry according to claim 3, wherein the impedance matching network comprises a differential L-network.

5. The front-end circuitry according to claim 4, wherein the signal processing circuitry comprises a single-ended output.

6. The front-end circuitry according to claim 4, wherein the signal processing circuitry comprises a differential output.

7. The front-end circuitry according to claim 4, wherein the differential L-network comprises two inductors and a capacitor.

8. The front-end circuitry according to claim 4, wherein the differential L-network comprises two capacitors and an inductor.

9. The front-end circuitry according to claim 3, wherein the impedance matching network comprises a plurality of differential L-networks.

10. The front-end circuitry according to claim 9, wherein the signal processing circuitry comprises a single-ended output.

11. The front-end circuitry according to claim 9, wherein the signal processing circuitry comprises a differential output.

12. The front-end circuitry according to claim 3, wherein the impedance matching network comprises a differential Π-network.

13. The front-end circuitry according to claim 12, wherein the signal processing circuitry comprises a single-ended output.

14. The front-end circuitry according to claim 12, wherein the signal processing circuitry comprises a differential output.

15. The front-end circuitry according to claim 12, wherein the differential Π-network comprises two inductors and two capacitors.

16. The front-end circuitry according to claim 3, wherein the impedance matching network comprises a plurality of differential Π-networks.

17. The front-end circuitry according to claim 16, wherein the signal processing circuitry comprises a single-ended output.

18. The front-end circuitry according to claim 16, wherein the signal processing circuitry comprises a differential output.

19. The front-end circuitry according to claim 3, wherein the impedance matching network comprises a differential T-network.

20. The front-end circuitry according to claim 19, wherein the signal processing circuitry comprises a single-ended output.

21. The front-end circuitry according to claim 19, wherein the signal processing circuitry comprises a differential output.

22. The front-end circuitry according to claim 19, wherein the differential T-network comprises four inductors and one capacitor.

23. The front-end circuitry according to claim 19, wherein the differential T-network comprises four capacitors and one inductor.

24. The front-end circuitry according to claim 3, wherein the impedance matching network comprises a plurality of differential T-networks.

25. The front-end circuitry according to claim 24, wherein the signal processing circuitry comprises a single-ended output.

26. The front-end circuitry according to claim 24, wherein the signal processing circuitry comprises a differential output.

27. The front-end circuitry according to claim 3, wherein the impedance matching network comprises at least one of a differential L-network, a differential Π-network, a differential T-network, or a combination thereof coupled in cascade.

28. The front-end circuitry according to claim 27, wherein the signal processing circuitry comprises a single-ended output.

29. The front-end circuitry according to claim 27, wherein the signal processing circuitry comprises a differential output.

30. The front-end circuitry according to claim 3, wherein the impedance matching network comprises a differential transmission line.

31. The front-end circuitry according to claim 30, wherein the signal processing circuitry comprises a single-ended output.

32. The front-end circuitry according to claim 30, wherein the signal processing circuitry comprises a differential output.

33. A radio-frequency (RF) apparatus, comprising:
an impedance matching network, having a differential input having symmetrical impedances from input signal lines to a reference node, and a differential output having symmetrical impedances from output signal lines to the reference node; and
a filter configured to receive a radio-frequency input signal, the filter having a differential output configured to provide a filtered radio-frequency (RF) signal to the impedance matching network.

34. The radio-frequency apparatus of claim 33, further comprising a signal-processing circuit having a differential input, the signal-processing circuit configured to accept a signal from the differential output of the impedance matching network.

35. The radio-frequency apparatus of claim 34, wherein the impedance matching network matches an output impedance of the filter to an input impedance of the signal-processing circuit.

36. The radio-frequency apparatus of claim 35, wherein the impedance matching network comprises at least one differential L-network.

37. The radio-frequency apparatus of claim 36, wherein the signal-processing circuit comprises a low-noise amplifier.

38. The radio-frequency apparatus of claim 37, further comprising a first integrated circuit, wherein the low-noise amplifier resides within the first integrated circuit.

39. The radio-frequency apparatus of claim 38, wherein the first integrated circuit further comprises radio-frequency receiver circuitry.

40. The radio-frequency apparatus of claim 39, further comprising a second integrated comprising digital signal-processing circuitry, the second integrated circuit coupled to the first integrated circuit and configured to accept a digital output signal of the first integrated circuit.

41. The radio-frequency apparatus of claim 35, wherein the impedance matching network comprises at least one differential Π-network.

42. The radio-frequency apparatus of claim 41, wherein the signal-processing circuit comprises a low-noise amplifier.

43. The radio-frequency apparatus of claim 42, further comprising a first integrated circuit, wherein the low-noise amplifier resides within the first integrated circuit.

44. The radio-frequency apparatus of claim 43, wherein the first integrated circuit further comprises radio-frequency receiver circuitry.

45. The radio-frequency apparatus of claim 44, further comprising a second integrated comprising digital signal-processing circuitry, the second integrated circuit coupled to the first integrated circuit and configured to accept a digital output signal of the first integrated circuit.

46. The radio-frequency apparatus of claim 35, wherein the impedance matching network comprises at least one differential T-network.

47. The radio-frequency apparatus of claim 46, wherein the signal-processing circuit comprises a low-noise amplifier.

48. The radio-frequency apparatus of claim 47, further comprising a first integrated circuit, wherein the low-noise amplifier resides within the first integrated circuit.

49. The radio-frequency apparatus of claim 48, wherein the first integrated circuit further comprises radio-frequency receiver circuitry.

50. The radio-frequency apparatus of claim 49, further comprising a second integrated comprising digital signal-processing circuitry, the second integrated circuit coupled to the first integrated circuit and configured to accept a digital output signal of the first integrated circuit.

51. The radio-frequency apparatus of claim 35, wherein the impedance matching network comprises a cascade coupling of at least one differential L-network, at least one differential Π-network, at least one differential T-network, or a combination thereof.

52. The radio-frequency apparatus of claim 51, wherein the signal-processing circuit comprises a low-noise amplifier.

53. The radio-frequency apparatus of claim 52, further comprising a first integrated circuit, wherein the low-noise amplifier resides within the first integrated circuit.

54. The radio-frequency apparatus of claim 53, wherein the first integrated circuit further comprises radio-frequency receiver circuitry.

55. The radio-frequency apparatus of claim 54, further comprising a second integrated comprising digital signal-processing circuitry, the second integrated circuit coupled to the first integrated circuit and configured to accept a digital output signal of the first integrated circuit.

56. The radio-frequency apparatus of claim 35, wherein the impedance matching network comprises a differential transmission line.

57. The radio-frequency apparatus of claim 56, wherein the signal-processing circuit comprises a low-noise amplifier.

58. The radio-frequency apparatus of claim 57, further comprising a first integrated circuit, wherein the low-noise amplifier resides within the first integrated circuit.

59. The radio-frequency apparatus of claim 58, wherein the first integrated circuit further comprises radio-frequency receiver circuitry.

60. The radio-frequency apparatus of claim 59, further comprising a second integrated comprising digital signal-processing circuitry, the second integrated circuit coupled to the first integrated circuit and configured to accept a digital output signal of the first integrated circuit.

61. A method of processing signals in a radio-frequency (RF) apparatus, comprising:
  filtering an input radio-frequency signal in a filter that has a differential output configured to provide a filtered radio-frequency (RF) signal; and
  receiving and processing the filtered signal in an impedance matching network that has a differential input having symmetrical impedances from input signal lines to a reference node, the impedance matching network configured to generate an output signal at a differential output of the impedance matching network, the differential output having symmetrical impedances from output signal lines to a reference node.

62. The method of claim 61, wherein the impedance matching network is configured to match an output impedance of the filter to an input impedance of the signal-processing circuit.

63. The method of claim 62, further comprising processing the output signal in a radio-frequency receiver circuitry.

64. The method of claim 63, wherein processing the output signal in a radio-frequency receiver circuitry comprises processing the output signal in a low-noise amplifier.

65. The method of claim 64, wherein the impedance matching network for receiving and processing the filtered signal comprises at least one differential L-network.

66. The method of claim 64, wherein the impedance matching network for receiving and processing the filtered signal comprises at least one differential Π-network.

67. The method of claim 64, wherein the impedance matching network for receiving and processing the filtered signal comprises at least one differential T-network.

68. The method of claim 64, wherein the impedance matching network for receiving and processing the filtered signal comprises a cascade coupling of at least one differential L-network, at least one differential Π-network, at least one differential T-network, or a combination thereof.

69. The method of claim 64, wherein the impedance matching network for receiving and processing the filtered signal comprises a differential transmission line.

70. The method of claim 64, wherein the impedance matching network for receiving and processing the filtered signal comprises at least one of a differential L-network, a differential P-network, and a differential T-network.

71. The method of claim 70, wherein the low-noise amplifier for processing the output signal resides in a first integrated circuit that includes the radio-frequency receiver circuitry.

72. The method of claim 71, further comprising:
  receiving in a second integrated circuit a digital output signal of the radio-frequency receiver circuitry; and
  processing digitally the digital output signal of the radio-frequency receiver circuitry.

* * * * *